US00RE37654E

(19) United States
(12) Reissued Patent
Longo

(10) Patent Number: US RE37,654 E
(45) Date of Reissued Patent: Apr. 16, 2002

(54) GESTURE SYNTHESIZER FOR ELECTRONIC SOUND DEVICE

(76) Inventor: Nicholas Longo, 2315 Grant St. #2, Berkeley, CA (US) 94703

(21) Appl. No.: 09/594,741

(22) Filed: Jun. 13, 2000

Related U.S. Patent Documents

Reissue of:
(64) Patent No.: 6,066,794
Issued: May 23, 2000
Appl. No.: 09/135,661
Filed: Aug. 18, 1998

U.S. Applications:
(63) Continuation-in-part of application No. 08/786,150, filed on Jan. 21, 1997, now abandoned.
(60) Provisional application No. 60/010,324, filed on Jan. 22, 1996.

(51) Int. Cl.[7] ..... G10H 1/00; G10H 3/00
(52) U.S. Cl. ..... 84/626; 84/600; 84/622; 84/625; 84/645; 84/659
(58) Field of Search ..... 84/622–630, 633–634, 84/637–638, 645, 659–663, 665, 600

(56) References Cited

U.S. PATENT DOCUMENTS

| | | | | |
|---|---|---|---|---|
| 5,074,184 A | * | 12/1991 | Kikumoto | 84/626 |
| 5,097,741 A | * | 3/1992 | Kikumoto | 84/626 |
| 5,200,568 A | * | 4/1993 | Fukushima et al. | 84/662 |
| 5,216,189 A | * | 6/1993 | Kato | 84/662 |
| 5,241,126 A | * | 8/1993 | Usa et al. | 84/626 |
| 5,260,507 A | * | 11/1993 | Hagino et al. | 84/622 |
| 5,498,836 A | * | 3/1996 | Okamoto et al. | 84/659 |
| 5,726,374 A | * | 3/1998 | Vandervoort | 84/638 |

OTHER PUBLICATIONS

Nicholas Long, Flex Processor 1.0 or Macintosh, Jan. 1, 1997 Compuserve.*

Nicholas Long, Flex Processor 1.0 Manual Jan. 1, 1997, COmpuserve.*

Nicholas Long, Information Sheet for Flex Processor 1.0, Jan. 1, 1997, Compuserve.*

Nicholas Long, Flex Processor 1.2 for Macintosh, Jun. 6, 1997, Compuserve.*

Nicholas Long, Manual for Flex Processor 1.2, Jun. 6, 1997, Compuserve.*

Mark Vail Muscling up on MIDI Keyboard, Jul. 1997.*

David Kaplowitz, Flex Your Muscles and Express Yourself, Electronic Musician, Mar. '98.*

Ensonia SD–1 Manual pp. 8–36, 8–38, 1991 Ensonia Corp., Malvern, PA.*

(List continued on next page.)

*Primary Examiner*—Marlon T. Fletcher

(57) ABSTRACT

A MIDI-compatible gesture synthesizer is provided for use with a conventional music synthesizer to create musically realistic[ally] sounding gestures. The gesture synthesizer is responsive to one or more user controllable input signals, and includes several transfer function models that may be user-selected. One transfer function models properties of muscles using Hill's force-velocity equation to describe the non-linearity of muscle activation. A second transfer function models the cyclic oscillation produced by opposing effects of two force sources representing the cyclic oppositional action of muscle systems. A third transfer function emulates the response of muscles to internal electrical impulses. A fourth transfer function provides a model representing and altering virtual trajectory of gestures. A fifth transfer function models visco-elastic properties of muscle response to simulated loads. The gesture synthesizer outputs [MIDI-compatible] continuous pitch data, tone volume and tone timbre information. The continuous pitch data is combined with discrete pitch data provided by the discrete pitch generator within the conventional synthesizer, and the combined signal is input to a tone generator, along with the tone volume and tone timbre information. The tone generator outputs tones that are user-controllable in real time during performance of a musical gesture.

62 Claims, 23 Drawing Sheets

U.S. PATENT DOCUMENTS

Kurzueil Music Systems K2000 manual pp. 16–7, 16–8, 1992, Young Chang Aikki Co.*
Zoltan jarosy, Proceedings of the International Computer Music Conference 1994 pp. 402–406 ICMA.*
Eric Singer, Hysteresis Patch, Max Include 1996 Opcode Music Systems.*
Nicholas Long, Actuality CD 1994 Cesium Soundl.*
Manfred Clynes, General Principles of Musical Thought Journal for the Integrated Study of Artificial Intelligence, Cognitive Science, and Applied Episterology 1986 vol. 3 No. 3 pp. 185–223.*
Max Mathews, Computer Music Journal vol. 17 No. 3, Fall 1993 p. 40.*
Scott Wilkinson, Nonlinear Modeling, Electronic Musician Feb. 1994 p. 166.*
Sylvie Gibet, Jean–Loup, Florens, Instrumental Gestrue Modeling by Indentification with Time–Varying Mechanical Models, ICMC Proceedings 1988 pp. 28–40.*

* cited by examiner

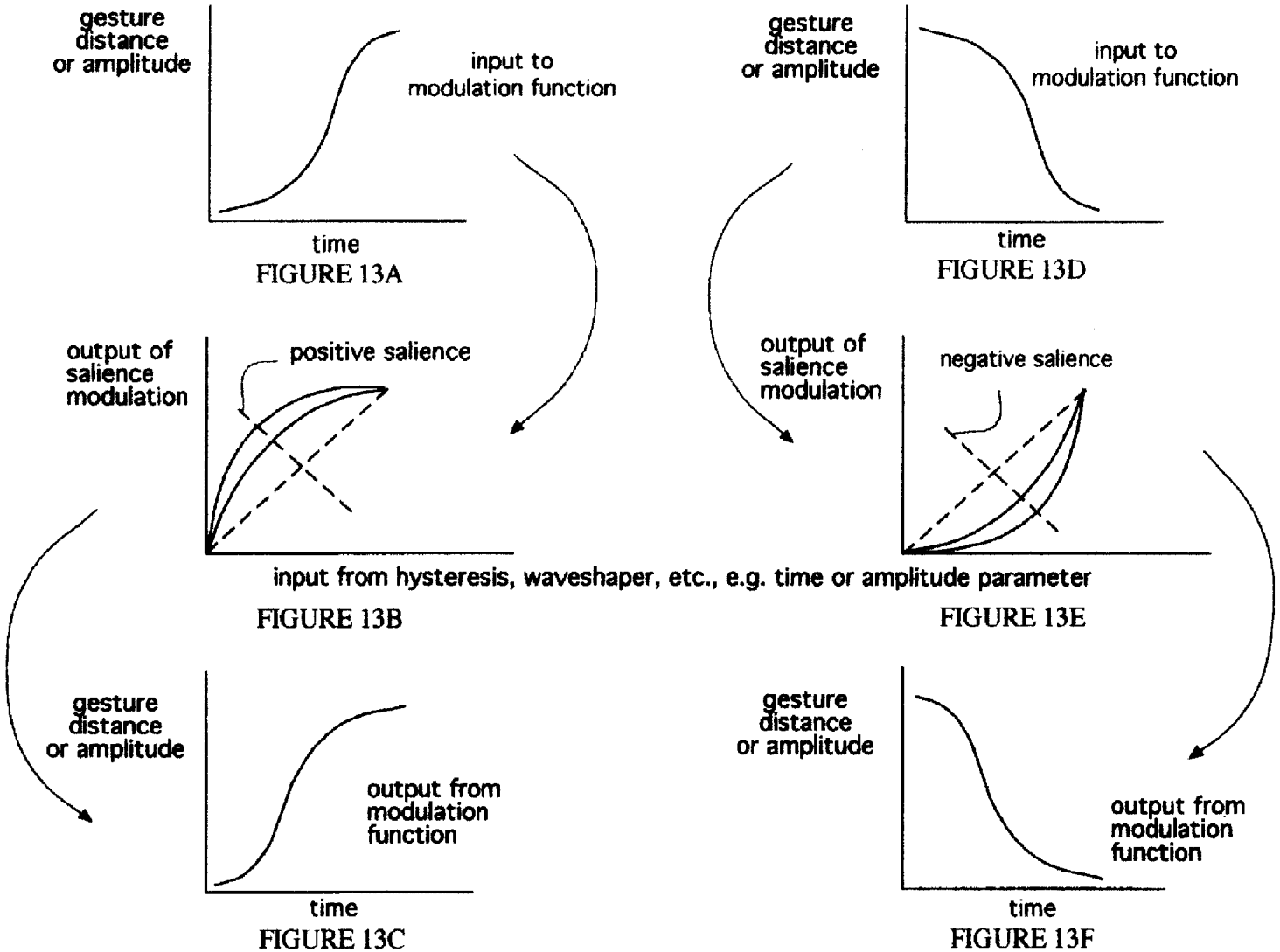
input to modulation function
gesture distance or amplitude
time
FIGURE 13A
positive salience
output of salience modulation
input from hysteresis, waveshaper, etc., e.g. time or amplitude parameter
FIGURE 13B
output from modulation function
gesture distance or amplitude
time
FIGURE 13C
input to modulation function
gesture distance or amplitude
time
FIGURE 13D
negative salience
output of salience modulation
FIGURE 13E
output from modulation function
gesture distance or amplitude
time
FIGURE 13F

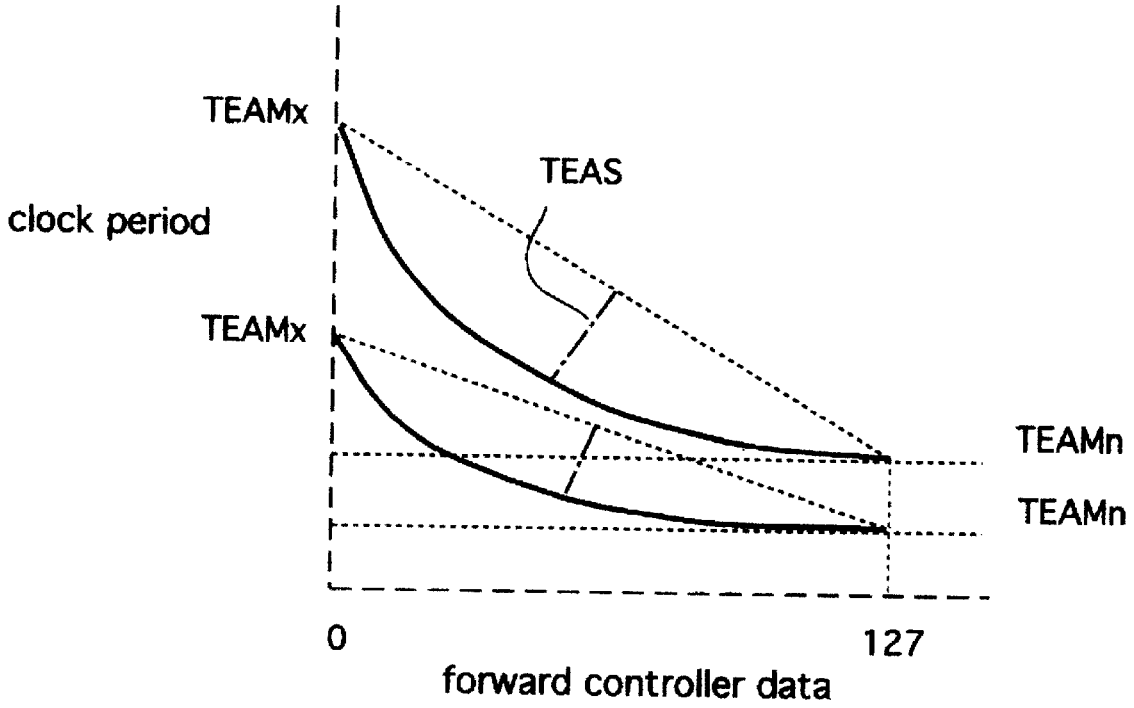
FIGURE 16A
FIGURE 16B
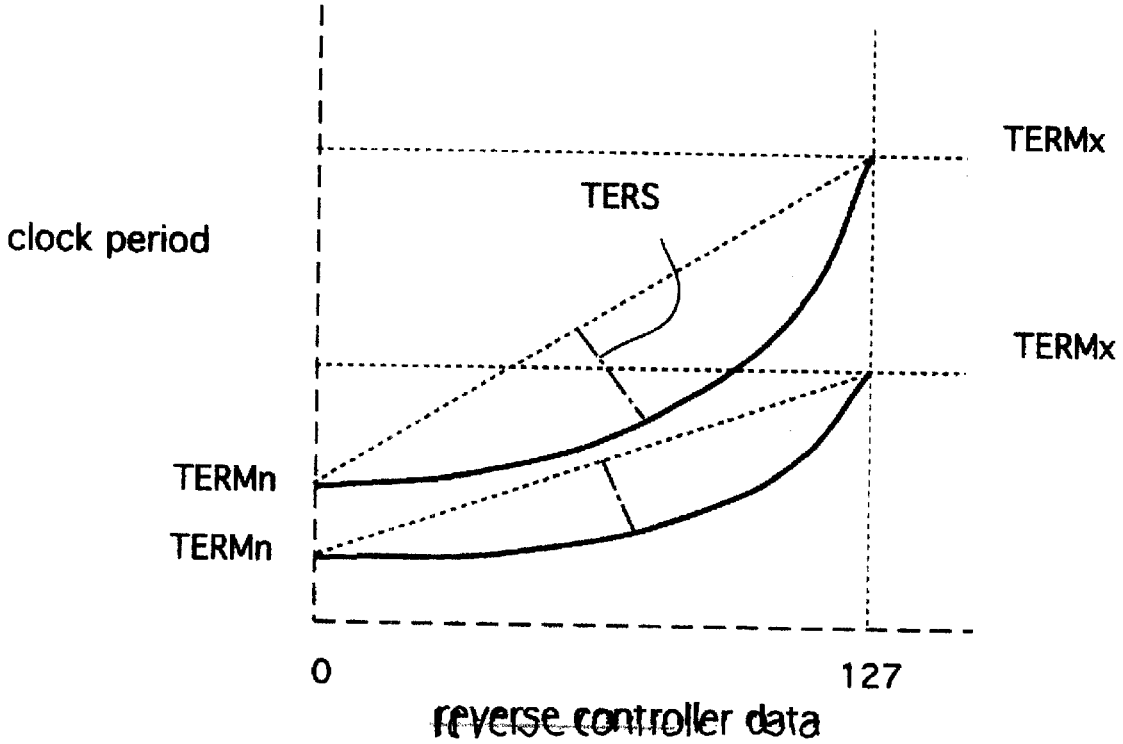

GESTURE SYNTHESIZER FOR ELECTRONIC SOUND DEVICE

Matter enclosed in heavy brackets [ ] appears in the original patent but forms no part of this reissue specification; matter printed in italics indicates the additions made by reissue.

This application is a Continuation in Part of application Ser. No. 08/786,150 filed Jan. 21, 1997, now abandoned all parts of which are herein incorporated by reference*, which claims the benefit of Provisional Application 60/010,324 filed Jan. 22, 1996*. The invention relates generally to modifying sound produced by electronic sound devices, and more specifically to providing a gesture synthesizer for an electronic music synthesizer.

FIELD OF THE INVENTION

BACKGROUND OF THE INVENTION

Musical instruments are manipulated by a musician-user to articulate and produce notes of discrete tones having constant pitch. For example, a guitar has strings and a finger board with frets that divide the guitar strings into discrete lengths. By pressing a string against a fret with a finger, a musician can select equally spaced pitches. Each musical note need not be articulated separately. Some notes may be played merely by changing the pitch of a previously articulated note, and pitch may frequently be altered to glide continuously between notes.

To more fully appreciate the present invention, it is helpful to define several terms commonly used by professional musicians. "Pitch" is the subjective sensation produced by a periodic vibration having constant frequency, e.g., what may be produced by a picked (or plucked) guitar string that is under tension. The sensation of pitch is logarithmically related to the frequency of vibration. In music, discrete pitches are referred to as "notes".

The "tone" or "timbre" of a musical note includes several components, and gives the note a distinctive character. The same note played on [a] *an* organ will have a different timbre than if played on a piano. Indeed, the same note played on two pianos can exhibit different nuances of timbre, and will sound different. The timbre of an instrument playing a note is closely related to the shape of the periodic wave creating the note, which is referred to as waveshape. As such, one aspect of timbre is the manner in which the note waveshape changes with time. Timbre is often analyzed in terms of the instantaneous Fourier series components of a tone. Ordinarily these components change over time, corresponding to the change in waveshape. There are also non-harmonic components of timbre including, for example, breath noise admixed with the simple, round tone of a flute.

A listener can distinguish different instrumental timbres, such as a note from an oboe and a note from a violin. A critical aspect enabling the differentiation is the complex change that occurs within the first few milliseconds of the onset of the note (known as the "attack" time). This aspect is related to how notes are produced (or "articulated") on different instruments. For example, a violinist articulates notes by bowing, to produce a scraping sound and a sense of the note growing from nothing, whereas a saxophonist tongues notes.

Tone synthesizers use control envelopes to simulate the interactions of pitch, volume and timbre. Control envelopes may be characterized by four associated parameters, namely attack, decay, sustain and release.

The "distance" in pitch between two notes is termed the musical "interval". In the familiar "do-re-mi" scale, each syllable represents an interval or distance from the first note of the scale. The creation of many musical effects involves altering the pitch of a previously articulated note, and may require production in a manner different than the articulation of musical notes. Musical effects can include slurs, hammer-ons, pull-offs, blues inflections, glissandos, portamento, and vibrato. Such gestures are usually performed to move from one note of a scale to an adjacent note, or in between, the movement being referred to as the distance of a gesture.

"Blues inflection" is the musical term for a voice-like pitch bend gesture, and usually includes "blue note" pitches that are located between pitches found in standard musical scales. Most popular American music incorporates blues-type note inflections in some way, and thus a mechanism for bending notes is necessary for an electronic synthesizer used to play such music.

Professional grade musical synthesizers routinely provide some sort of pitch bend mechanism for performing continuous pitch changes, such as over a major second interval as might be produced by a guitar player by bending strings. The most common type of pitch altering device is the pitch wheel. The pitch wheel may be a user-operated biased rotary wheel with a center detente, or a rotary wheel with a dead zone in the middle. Other control mechanisms for altering pitch include spring-biased levers and joysticks. Unfortunately, such mechanisms do not generally produce lifelike pitch inflections.

On a guitar, blues inflection is performed by deflecting a guitar string sideways (laterally) along the fret after the string has been picked (e.g., caused to vibrate) by the musician. This lateral movement increases the tension on the vibrating string, and hence increases the pitch. Similarly, a skilled saxophonist may bend pitch using air pressure or lip pressure on the playing reed.

A "slide" is performed on a guitar by sliding the finger up or down the finger-board (longitudinally), after an initial note is picked. A similar effect, referred to as "glissando", may be produced on a piano by dragging a thumb back and forth across the keys while pressing down, to cause each key to sound quickly in succession. The result is a series of additional discrete sound pitches. On a harp, such a glissando may be performed by dragging the hand across the strings, so that each sounds in succession. A similar gesture on a guitar is called a "strum", one difference being that the notes which sound on a guitar are each spaced by several semitones, making a chord. On a harp, chords may be produced by using pedals to retune the strings.

When the hand is then dragged across the strings as when performing a glissando, the result is called an "arpeggio". Apreggios usually traverse a wide range of dozens of notes, while a guitar strum is always six notes or less. A guitar chord may also be "plucked" as may a chord on a harp, while a chord on a piano is "struck". Arpeggios may also be played on a piano by striking the notes of a chord in succession while alternately displacing each hand to cover a wide range of notes. However, this produces a significantly different effect than a harp arpeggio because it requires discrete motions of the fingers used to strike each note.

Some musical notes may be played by slurring a previously articulated note. "Slurring" means a musician does not produce every note anew but may instead continue from one note to the next without re-attacking, thus changing only the pitch. For example, on a saxophone, notes are slurred by opening or closing additional valves on the body of the instrument, while continuously blowing. This changes the pitch and creates a different note, but without a tongued articulation. On a violin, slurring involves placing fingers in front of or behind other fingers on the fingerboard while continuing to bow, to shorten or lengthen the effective vibrating length of the string. This changes the pitch and creates a different note, but without a bowed articulation. Guitarists slur notes similarly as violinists, but the gesture of placing a first finger on a fret in front of a second finger is called a "hammer-on". The gesture of placing a second finger behind the first and then releasing the first is called a "pull-off". Playing whole phrases by articulating only the first note and slurring the remaining notes is called "legato".

In real life, gestures may be combined, either sequentially or simultaneously. Thus a skilled guitarist can perform a hammer-on followed by a glissando, or simultaneously achieve blues inflection and vibrato. A number of hammer-ons in quick succession produces a "trill". A series of connected gestures traversing a large interval in a single direction is called a "run". A combination of gestures involving one or more changes of direction may be referred to as a "lick" or a "riff". These gestures are so named because each is perceivable as an individual musical event. Their separate elements become fused because there is an overarching time shape to them. This time shape or trajectory may result from a continuous change in the times between expected onset of the component gestures.

In addition, guitarists and other musicians may perform gestures within gestures. That is, they may alter the apparent course of a gesture as it is performed by making slight variations. Such subtleties may distinguish one player's style from another, or even a great performance from a poor one.

Electronic musical instruments such as synthesizers are known in the art, and often include various sound generating routines that are executed by a digital signal processor, or the like. Such synthesizers are realized using digital oscillators to produce tones using cyclic time vectors and wavetables. Typically a mechanism is provided for selecting discrete pitches, such as a piano-like keyboard, and at least one mechanism for altering pitch continuously. Historically, such pitch altering or bending mechanisms have been primarily mechanical in nature, and in addition to pitch wheels and joysticks mentioned above, included levers, ribbons, and various modifications to piano keyboards. But such prior art pitch altering mechanisms permit only a single type of gesture, and the sounds they produce do not include very expressive gestures. In general, they do not permit combining gestures, or alteration of the gesture as it is performed.

In addition, no means of strumming chords is provided. A strum may be simulated on a piano-like keyboard by staggering the notes of a chord as they are struck. However, this does not produce a realistic sounding strum because it requires coordinating several discrete gestures by the player's fingers. A guitar strum, or harp glissando is executed by a single motion with the arm.

Gesture mapping gloves and touch responsive membranes have been used to try to provide more flexible pitch alteration. But even these more complex mechanisms produce sounds that are less expressive than desired because acoustic instruments (and the human voice) require some exertion to produce musically useful results. It is known to also provide exertion-requiring mechanism using force-feedback based on linear motors or high-tension springs. But such mechanisms are expensive, bulky, and difficult to use, and require special circuitry to interface with electronic sound-production systems. They also suffer from the same limitations as standard mechanical operators.

At best, the prior art has attempted to bend pitch in a single direction. Thus with respect to producing the sound of a plucked guitar string, one can attempt to emulate a guitarist's [transverse] *lateral* deflection (blues inflection) of a plucked string, or perhaps a [lateral] *longitudinal* deflection (glissando), but not both [transverse] *lateral* and [lateral] *longitudinal* gestures. Interestingly, the prior art sometimes suggests that pitch is a non-critical parameter with which to impart expression in one direction. By implication, the prior art would regard as futile attempts to bend pitch in more than one direction.

It is known in the prior art to assist the simulation of gestures using electronics. Thus, some synthesizers create slurs using a so-called "mono mode" operating state in which only one note may be played at a time. If a second note is played before releasing the previous note, the second note continues the first note with only a change in pitch. Further, the envelopes used to create the first note continue rather than beginning anew from the attack. If a note is played after all previous notes have been released, the new note is re-attacked. Unfortunately, mono mode does not create effective slurs because on real musical instruments pitch changes that create slurs do not occur suddenly, but have a characteristic pitch change curve. In U.S. Pat. No. 5,216,189, to Kato (1993), this problem was somewhat addressed using preset curves to create the slur, where the above-described fingering scheme was retained.

"Portamento" or "pitch glide" is another gesture, in which a continuous gliding movement from one musical tone to another is produced without rearticulation. For example, a trombonist moves the trombone slide in and out while continuing to blow; a violinist slides one finger up or down the fingerboard while continuing to bow. (Technically, the gesture that creates portamento on a violin creates a glissando on a guitar because a guitar has frets that cause discrete pitches to be produced as each fret is crossed, whereas pitch varies continuously for a violin.)

Many attempts have been made in the prior art to create portamento on electronic sound synthesizers, typically using a pre-programmed function. In some synthesizers, portamento effect circuitry is activated to automatically cause each note to slide to the next note over a period of time. In some implementations, so-called fingered portamento is created by playing the second note before releasing the first, analogously to slurring. Functions used to create such synthesized portamento or pitch glide typically are characterized by an exponential curve. While such curves produce a recognizable effect peculiar to synthesizers, they do not realistically duplicate natural sounding portamentos performed on actual musical instruments.

One device called the Oberheim Strummer was designed to produce realistic guitar strums for use with electronic instruments. This device had prerecorded strum templates activated by pressing a button. While such an implementation produces realistic single strums, they always sound the same. The speed of the strum can not be altered, nor varied as it is performed.

Another device known in the art is referred to as an arpeggiator. This works, as the name suggests, by activating the notes of a chord held down on a piano-like keyboard rapidly in [succesion] *succession*. The notes are evenly spaced and therefore do not have the overarching time characteristic that gives real arpeggios their lifelike perceptual quality. The result is an automated computer music effect.

Some synthesizers produce portamento by actually performing the gesture using a ribbon controller comprising a position-sensing membrane whose length may be a few inches to three feet or so. While such configurations can produce relatively realistic portamentos, the portamento is of a single characteristic type. U.S. Pat. No. 5,241,126 to Usa et al. (1993) discloses the use of transfer functions transitioning from ribbon position to pitch, to try to produce a higher quality portamento. Often the transfer function has a stair-like step characteristic, that upon performance seeks to produce a glissando-like gesture.

"Vibrato" is the undulating variation that creates tension when sustaining a single tone for a period of time, and may be produced by most bowed-string and woodwind classical instruments. On prior art synthesizers, vibrato may be implemented using a cyclic low frequency waveform that automatically varies (or frequency modulates) the pitch of a note. The amount of frequency modulation produced may be controlled with a continuous modulation wheel, and may be developed gradually using a control envelope or some other mechanism, such as a pedal or a pressure pad. Unfortunately the vibrato effect produced inevitably sounds automatic, and not lifelike.

Some prior art synthesizers include tables of pre-drawn transfer function curves, but do not provide a means of altering the predrawn-curves during performance. For instance, U.S. Pat. No. 5,241,126 to Usa et al.(1993), referred to above, seeks to bridge the gap between mechanical operators and electronic tone generation with a mechanism that uses a continuous operator along which gestures can be mapped. Unfortunately, Usa's disclosed mechanical operator is sophisticated mechanically and thus expensive to manufacture. Significantly, Usa fails to adequately specify means of simulating a variety of realistic gesture performance techniques. The few gesture maps specified are simplistic and representative of easily modeled gestures, e.g. using step functions to perform scales, arpeggios, or glissandos. Unfortunately, the output from Usa's device is not MIDI-compatible, and cannot be exported for use by other MIDI-compatible systems.

MIDI refers to a standard data communications protocol for electronic music equipment. In the MIDI specification, bytes of data are coded to be recognized as representing musical functions such as note on and note off of specific keys on a piano keyboard. Certain bytes are coded and specified to represent ranges of digital numbers for use modifying continuously variable parameters of musical tones. Ranges of numbers are specified for pitch bend and overall volume. All MIDI synthesizers recognize these numbers, and most recognize additional numbers specified for general use, that may be used to modify synthesizer functions controlling various aspects of timbre.

Having discussed the nature of various musical effects that are desired from a musical synthesizer, it is now useful to examine how such synthesizers are configured. FIG. 1 is a generic block diagram of a prior art musical synthesizer 10, and is similar to the commercially available Ensoniq model SD-1. Synthesizer 10 includes a discrete pitch generator 20 that outputs chosen discrete pitches in response to the output from a user input signal, typically provided by a piano keyboard 30. Each discrete pitch is presented by generator 20 as a digital number.

Synthesizer 10 further includes an interface module 40 that contains menu-selectable programming parameters, and is responsive to user-input values from controls 50, 50' (respectively "OP1" and "OP2"), which may include wheels, foot pedals, a pressure pad, or the like. It is a function of module 40 to modify tone synthesis parameters for use by tone synthesizer 60. At best, however, what result is an unrealistic pitch bend sound that is quite unlike the pitch inflection actually produced by a musician using a traditional musical instrument.

Module 40 further includes a scaler 70 whose output is a scaled digital number proportional to the output from the first operator control 50. This user-determined digital [ouput] number is then input to a look-up table 80 that typically performs a waveshaping and amplitude normalizing function. The result from look-up table 80 is then combined by [a] *an* adder 90 with a digital number representing the output from the second user control 50'.

Summer 90 outputs a digital number representing the combined effects of operator controls 50 and 50'. The partial sum output by summer 90 is then combined by a second adder 100 with the digital number representing the output of the discrete pitch generator 20. It will be appreciated that adder 100 may represent any means of combining discrete pitch data from discrete pitch generator 20, and continuous pitch data from adder 90, including merging of MIDI data within tone generator 60. The grand output provided by adder 100 is a digital number or numbers that can control the output of tone generator 60. As shown in FIG. 1, synthesizer system 10 may instead provide the output from the first adder 90 as an input to the tone generator 60, without digital summation using adder 100. In either embodiment, the output from tone synthesizer 60 is input to an audio reproduction system, e.g., loudspeaker 110.

Unfortunately the musical effects provided by prior art synthesizer 10 are not especially realistic. At best there is a crude attempt to bend pitch. For example the scaler 70 cannot effectively control musical intervals because the parameters specified are not scale-tone divisions. Further, synthesizer 10 cannot provide effectively controlled musical intervals because scaler 70 precedes (rather than follows) look-up table 80. At best, scaler 70 can affect, but in an unpredictable fashion, the extent of waveshaping by the lookup table 80. Further, there is no means provided of modifying gesture trajectory in real time.

There is a need for a gesture synthesizer permitting realistic simulations of various musical gestures in any sequence for an electronic musical instrument, including digital synthesizers. Preferably such a gesture synthesizer should realistically alter pitch, tone volume, and tone timbre. Further, such a gesture synthesizer should be modular in use and in fabrication, and should be implemented using conventional components and techniques. Finally, pitch bend and other gestures provided by such a gesture synthesizer should be MIDI-compatible and MIDI-exportable.

The present invention discloses such a gesture synthesizer.

SUMMARY OF THE INVENTION

The present invention provides a musical synthesizer with a gesture synthesizer that modifies musical gestures. Applicant has recognized that conventional tone synthesizers reproduce the sensation of tone created by an acoustic instrument by modeling human aural perception processes, and representing these processes parametrically. In contrast to the prior art however, the present invention recognizes that a missing musical parameter or parameters may be defined, representing a perceptual quality or qualities, related to the trajectory of a gesture and to the continuous variation of its trajectory. Gestures are controlled using feedback loops between the eyes and ears of a performer and their muscles. Additionally receptors in muscles transmit information about position, speed, and acceleration of gestures back to the higher brain centers involved in muscle activation and control. Such processes allow performers to formulate and continuously modify gesture trajectories in very precise ways.

Expressive real time performance involves microstructural gesture variations. Musical events occur in time sequentially as rhythm and meter, and simultaneously as chords, and harmonies. As music is traditionally notated, these aspects of time are represented graphically in two corresponding dimensions. Sequential events are represented horizontally, while simultaneous events are represented vertically. In traditional music notation, emotional expression is suggested with conventional terms and graphic symbols, but is for the most part left to the performer's interpretation. Such interpretation may be said to represent a third aspect of time, involving perceived possible outcomes of the various gesture trajectories used to perform the music. That is, each gesture follows a more or less predictable course, as does, for example, a fly ball. However gestures are not limited to a single path, but are typically modified continuously. This creates a plane of possible future trajectories, subject to the physical limitations of the instrument and the musician's muscles. To create interest in the music the musician manipulates these possibilities. The listener's expectations are continuously resolved, modified, or denied, conveying various sensibilities, such as repose or surprise.

A musician using an actual musical instrument mentally conceives a gesture that may be said to have a "virtual trajectory". Virtual trajectory includes a preplanned distance, time, and curvature, or acceleration-deceleration characteristic. It also includes time dependent variables that affect the final position of a projected motion. Virtual trajectory may be overcome by external forces, so the final outcome may be different.

To thus effect the performance of gestures, a musician flexes his or her muscles in a continuously controlled manner. Consequently, applicant has discovered that more realistic sound may be produced by providing the synthesizer with a perceptual model of muscles and their activation. Such models allow for continuous modification within a parametrically defined space. They may include static elements of muscles and their loads, such as friction and elasticity, as well as time dependent elements such as viscosity and inertia. Also included may be a controlling element as well as an activating one, representative of the roles of activation and control played by muscle pairs, and an additional direction dependent element likewise representative of the bifurcation of muscle pairs.

For instance, analogous to the manner in which a guitarist exerts muscular force against a tensioned string load, the gesture synthesizer models human muscle movements including visco-elastic properties of muscle pairs and the elasticity a simulated load. A keyboard input device selects discrete pitches in conventional fashion and may be operated with one hand, while the additional user control operator devices permit user-activation and control of desired gestures with the other hand. The controllers or operators activate simulated gestures used to modify pitch and other aspects of musical tones.

In a first embodiment, the gesture synthesizer provides a dynamic model of human muscles based upon Hill's velocity-force equation to describe the non-linear properties of muscle motion when interacting with loads. A second embodiment models the cyclic oscillation produced by opposing effects of two force sources representing the cyclic oppositional action of muscle systems. A third embodiment provides the gesture synthesizer with an emulation of the response of muscles to internal electrical impulses. A fourth embodiment provides a mechanism representing and altering the virtual trajectory of gestures that appear to originate with the higher brain functions governing muscle control. A fifth embodiment provides a mechanism modelling visco-elastic properties of muscle pairs as well as frictional, inertial and elastic properties of simulated loads.

A gesture synthesizer according to the present invention permits performance of several gestures simultaneously or sequentially in any order, and permits at least one gesture simulation parameter to be modified in real time during performance. Preferably a parametric menu-driven interface permits user-specification of gesture types by selection of synthesis functions and non-real time modification of programming arguments.

The gesture synthesizer according to the present invention preferably is implemented with a modular architecture in which data from user controllers or independent time operators (e.g., clock sources) is specified as control data or modulation data. Control data is processed by a series of gesture synthesis modules, whereas modulation data from user modulation operators may interact with and modify control data in real-time. Data from one gesture synthesis module may be used as modulation data, and as such may interact with and modify control data in another module. In another embodiment, a generalized architecture may be implemented incorporating the functions of several modules.

User controller output values provided to the gesture synthesizer may be delayed, scaled, and/or subjected to hysteresis and/or be subjected to salience (e.g. curvature) modulation, be used to generate and modify data from a clock, be subjected to filtering, or any combination [therof] *thereof*, before being input to variable shape look-up tables. The look-up table outputs may themselves be subjected to filtering, used to generate and modify clock data, be subject to salience modulation, hysteresis, scaling, delay, or any combination thereof before being combined in an output adder. The output from another user controller can vary the first and/or second scaling, delay, modulation, clock data generation, filtering or shaping in real-time to vary the effect of the gesture. A synthesizer according to the present invention provides controller values suitable to activate notes, or modify tone pitch, volume, timbre, or any combination thereof, and that are MIDI-compatible and MIDI-exportable.

Data generated by such a gesture synthesizer may also be used to control and vary parameters of a digitally represented physical instrument model. Such physical modeling parameters will naturally also control the tone pitch, volume, and timbre of a resulting musical note, since these are perceptual attributes independent of the method used to generate a tone. However, the parameters of a physical model may not be specified to control these attributes in the same way as they are traditionally represented in an electronic music synthesizer.

In addition to natural sounding strums, data generated by such a gesture synthesizer may be used to control the tempo of an [arpgeggiator] *arpeggiator* or note sequencer, thus imparting an overarching time modification that has a natural sounding effect, like rubato. Such modifications may be performed in real time to fit the musical context. Likewise overall volume effects may be imparted to sequences and arpeggios by performing them with the gesture synthesizer.

Combinations of gestures may also be performed. For example, a violin bow is used to excite the string into vibration and also to [controls] *control* it's volume and timbre. Similarly, the gesture synthesizer may be used to both trigger a note and vary it's volume and/or timbre, after it is first selected using a keyboard input device.

Other features and advantages of the invention will appear from the following description in which the preferred embodiments have been set forth in detail, in conjunction with the accompanying drawings.

BRIEF DESCRIPTION OF THE DRAWINGS

FIGS. 13A–F depict transfer functions showing the effect of a salience modulation module upon gestural curves, according to the present invention;

FIGS. 16A and 16B graphically depict forward and reverse time envelopes generated by a time oscillator module, according to the present invention;

DETAILED DESCRIPTION

Figure 1:
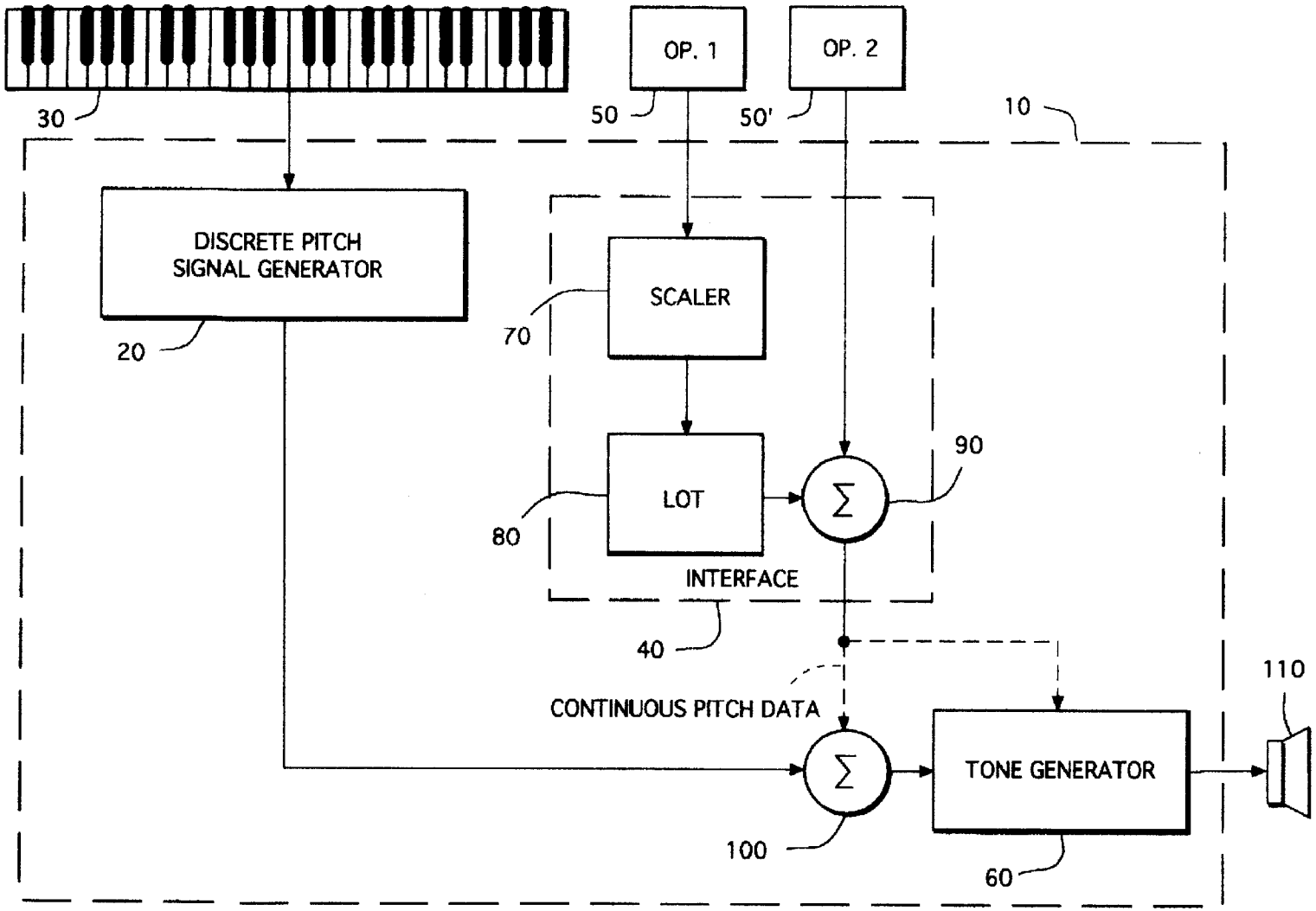
FIGURE 1 (PRIOR ART)
FIG. 1 depicts a musical synthesizer with pitch modulation, according to the prior art.

TABLE 1 contains various equations which may be used to implement the present invention, as depicted in the drawings and referred to in the following descriptions. Applicant has discovered that realistic [sound] *sounding* gestures can be produced on an electronic synthesizer by including a gesture synthesizer. A gesture synthesizer according to the present invention synthesizes gestures using techniques including dynamic transfer functions, clock-generation, filtering, time delay and approaches that represent the cyclic opposing forces of muscles (which operate in pairs) against a resistive load (e.g., a guitar string under tension). Gestures so produced sound extremely realistic to trained musicians, are substantially more lifelike than what may be produced by prior art synthesizers, and are MIDI-compatible and MIDI-exportable.

The present invention permits user-selection of discrete pitches with one hand, using a keyboard or similar control device, and permits user-controllable activation of simulated gestures with various controllers or operators that are controlled using the other hand, and/or at least one foot. Several gestures can be performed and modified sequentially or simultaneously in any order, e.g., glissando, pitch bend, vibrato, as would be the case with an actual musical instrument. Further, gesture simulation parameters may be user-modified during performance by activating an appropriate operator. Such configurations and operations realistically approximate methods used to select and modify pitch on most musical instruments, and thus may be used to electronically simulate a variety of instrumental techniques.

Preferably, the present invention would be embodied in a black box style accessory for MIDI keyboard instruments. In such an embodiment, a variety of user operated controllers are provided. A user interface contains menu selectable programming parameters, as in prior art synthesizer 10. A central processing unit with associated memory circuitry is provided to execute gesture synthesis functions. In another embodiment, the gesture synthesis architecture itself may be implemented as a central processor. As such it would be embodied on a silicon substrate and would contain a crystal oscillator clock or the like, and integrated circuitry made of silicon doped with impurities, for executing the specified functions. MIDI note data is input from a MIDI keyboard, and combined with synthesized control data. The combined data is output to a MIDI tone generator or returned to the MIDI keyboard to activate its internal tone synthesizer. In any embodiment, a source of clock pulse data is required, as would ordinarily be found in a microcomputer or microprocessor based device.

The present embodiment is a prototype implemented on a Macintosh computer. The Macintosh has volatile memory storage in the form of RAM, as well as permanent memory storage in the form of a hard disk. There are also hardware ports for connection to serial communications devices such as modems or a printer. Connected to one or both of these is an interface for transmitting and receiving MIDI protocol messages to and from the Macintosh. Connected to the MIDI interface is a commercially available KORG 01/W MIDI keyboard. The 01/W has a joystick which can generate MIDI controller data corresponding to three directions of motion. There are also inputs for up to two pedals. Digital numbers in the MIDI protocol format representing both discrete pitch and controller displacement is transmitted from the 01/W to the Macintosh, via the interface.

The controller displacement values from the KORG 01/W are input via the MIDI interface to the gesture synthesizer, which is resident in volatile memory (RAM) in the Macintosh. The discrete pitch information is passed through the gesture synthesizer and is returned via the MIDI interface to a MIDI compatible tone synthesizer such as a Roland JD-990. Digital numbers in the MIDI protocol format representing note-on and note-off, and/or continuous pitch bend, and/or tone volume, and/or tone timbre, are output from the gesture synthesizer to The Roland JD-990 via the MIDI interface. The JD-990 combines discrete pitch information with continuous pitch bend information and produces musical tones in accordance with this data and/or with the data representing tone volume and/or tone timbre. The output of the JD-990 is connected to any professional sound reproduction system or a home stereo system.

The JD-990 must be set to interpret pitch bend data to represent pitch bend of plus and minus twelve semitones. The gesture synthesis functions for the gesture synthesizer have been specified to take advantage of this setting, since this is the maximum amount of pitch bend that can be effected by most MIDI synthesizers. Of course, it is also possible to utilize the gesture synthesizer at other pitch bend settings, such as plus and minus four semitones. In this case the gesture amplitudes must be scaled accordingly.

In the MIDI specification, pitch bend has 128 increments of 0–127. Neutral pitch is 64. Pitch bend data from 64–127 causes pitch bend up while 63-0 causes pitch bend down. The gesture synthesizer uses 128 increments of 0–127 for a bend up of 12 [semitiones] *semitones* and negative numbers 1–127 for a bend down of twelve semitones. Thus the outputted gesture synthesis values must be halved and offset by 64 increments before being input to the tone synthesizer as pitch bend data. The MIDI specification also provides a high resolution pitch bend, which could be used in another embodiment of the gesture synthesizer. However, most MIDI tone synthesizers do not support high resolution pitch bend. Control data used to modify volume and timbre in the MIDI specification has an increment range of 0–127, so gesture synthesis data may only need an offset amount, or may be additionally scaled to within an appropriate range for volume or timbre modification. Note-on and note-off data is also represented by numbers 0–127 corresponding to G-2 through C8 of an extended piano-type keyboard.

Gesture synthesis modules are represented graphically in a window on the monitor of the Macintosh. The modules have pull-down menus that permit selection of input and output connections. They may be connected in series or in parallel, or may be selected as modulation data for use by another module. The controller deflection data passes through each gesture synthesis module, or may be used to generate and modify data from a clock source within the module. Data from one controller may also be used to modify data from another controller via a module. Thus data from several sources is available as input to the modules via internal modulation data objects.

There are also menus and number boxes for entering programming arguments in non-real time using the mouse or other pointing device and/or Macintosh keyboard. Most programming arguments are numbers that govern the operation of the synthesis function performed by the module. An example of a menu selection is a list of names of lookup tables containing arrays of values. When a table is selected, the values are loaded from the Macintosh hard disk and stored in specified RAM memory locations. Another example of a menu selection is to enable operation of a module or bypass its operation. It is possible to create other embodiments than that to be described presently, by rearranging the order of the modules.

Figure 2:
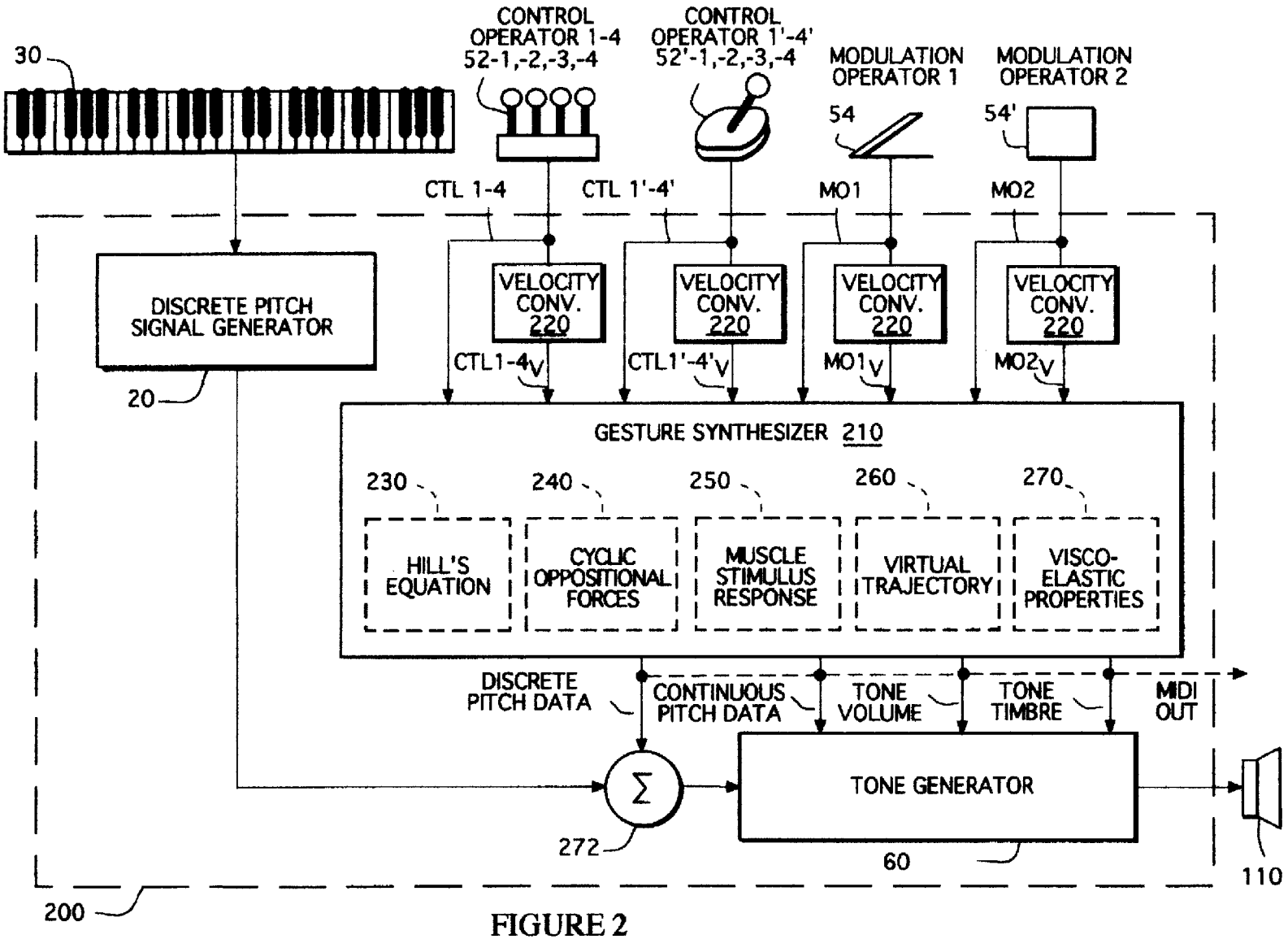
FIG. 2 is a block diagram of a musical synthesizer that includes a gesture synthesizer 210, according to the present invention.

FIG. 2 is a generalized block diagram of a synthesizer system 200 that includes a gesture synthesizer 210 according to the present invention. Elements in system 200 bearing like element numbers to elements present in the prior art synthesizer of FIG. 1 may be identical. For example, system 200 receives from a piano keyboard 30 (or the like) digital numbers representing user-selected discrete tones, to be played (in addition to other musical effects) through a sound system 110. System 200 includes a discrete pitch generator 20, and a tone synthesizer 60, similar to what was found in prior art system 10 shown in FIG. 1. In stark contrast to prior art system 10, system 200 includes a gesture synthesizer 210.

Referring again to FIG. 2, gesture synthesizer 210 receives control signals from user-controlled operators or controls, shown as 52-1, 52-2, 52-3, 52-4, 52'-1, 52'-2, 52'-3, 52'-4, which are also noted respectively as "CTL" 1–4, "CTL 1'–4' for control operator. Gesture synthesizer 210 also receives control signals from user-controlled modulation operators 54 and 54', which are denoted "MO1" and "MO2", for modulation operator. It will be appreciated that a greater or smaller number or operators could be provided beyond what is shown in FIG. 2.

The operators per se may vary in construction, and thus operator 52-N is preferably a bank of individually operable levers that are mechanically biased to return to a "home" position after displacement by the user of system 200. An independent operator 52'-N preferably is a four-way joystick that is mechanically biased to return to a neutral position after displacement along one of its four axes by the user of system 200. Another arrangement of operators might be a series of plungers arranged in a similar manner to the valves on a trumpet, that may depressed by the user's fingers. Conventional input devices such as wheels, a ribbon, a trackball or slide potentiometers might also be used. Because controls 52-N, 52'-N will typically occupy the hands of the user, control 54 may be a foot pedal, while control 54' may be another pedal, perhaps a thumb-operable button on a lever 52-N or on a joystick 52'-N, a pressure pad, position sensing membrane, depressable keys, a computer mouse, or other mechanism provided for the user of system 200.

Preferably each operator, e.g., 52-N, 52'-N, 54, 54' outputs a digital number as the operator is physically displaced by a user. As such, the operators may include interface circuitry converting physical displacement to digital numbers.

The displacement data from each operator is coupled to gesture synthesizer 210, and is denoted in FIG. 2 as CTL1 (for "control 1"), CTL2, etc., and MO1 (for "modulation operator 1"), and MO2. The rate of displacement of given control (or operator) by a user with respect to time is ascertained by individual displacement-to-velocity converters 220. For example, if a four lever operator control is used for 52-N, the digital output from each of the levers will go to a separate velocity converter 220. The velocity converters essentially take the time derivative of the displacement data and output digital numbers representing velocity, denoted CTL1v, CTL2v, etc. and MO1v and MO2v. The velocity data for each operator is also input to the gesture synthesizer 210. If desired, acceleration converters can be provided for some or all of the operators. Such converters would receive as input the velocity signals (which signals would still go to gesture synthesizer 210), and would output to synthesizer 210 acceleration signals proportional to the time derivative of the velocity signals.

As indicated by FIG. 2, gesture synthesizer 210 preferably can implement up to five separate functions or embodiments, and/or combinations of these functions or embodiments. As will be described, one embodiment provides a perceptual model 230 of muscles based upon Hill's velocity-force equation to describe non-linearity of muscle motion when interacting with loads. A second embodiment includes a model 240 that emulates the cyclic oppositional effects of two force sources that represent the cyclic oppositional action of muscles systems. A third embodiment provides the gesture synthesizer with a model 250 that emulates muscular action by representing the stimulus response of muscles to internal electrical impulses. The fourth embodiment provides a mechanism 260 representing and altering the virtual trajectory of gestures that appear to originate with the higher brain functions that govern muscle control and may be varied during performance of a gesture, in order to alter the trajectory of the gesture. The fifth embodiment provides a model 270 that emulates the visco-elastic properties of muscles under tension. As noted, in real life and as provided for by the present invention, these functions may be altered in real-time during performance of a gesture to alter the virtual trajectory. This capability is simply not found in prior art synthesizers, and such synthesizers cannot provide the necessary subtlety of expression of performance gestures.

As noted, prior art modular tone synthesizers use digital oscillators to produce tones using cyclic time vectors and wavetables. In a similar fashion, gesture synthesizer 210 generates gestures as wave-like cyclic phenomena. The result is very realistic gestures that, like real gestures, involve a starting point, a change in direction, and a return to the starting point, apparently due to a polarity change in biochemical reactions that activate muscles. As will be described, a general modular design is used for gesture synthesizer 210 in specifying gesture parameters. As shown in FIG. 2, gesture synthesizer 210 outputs digital numbers representing note-on and note-off which are input to an adder 272, and also outputs digital numbers representing continuous pitch data (pitch bend), tone volume and tone timbre signals as inputs to tone generator (or tone synthesizer) 60. The note data, pitch bend, tone volume, and tone timbre signals are also output as MIDI-compatible and MIDI-exportable signals for use by other equipment, as desired.

Adder 272 outputs a digital number or numbers representing discrete pitch information from discrete pitch generator (or other device) 20, as well as additional discrete pitch information from gesture synthesizer 210. It will be appreciated that adder 272 may represent other means of combining discrete pitch data from discrete pitch generator 20, and discrete pitch data from gesture synthesizer 210, including merging of MIDI data. In one embodiment, a note number from discrete pitch generator 20 may be used to represent the base note for a chord, with data representing the relative note values of the chord input from gesture synthesizer 210. The combined digital number or numbers representing note data is input to the tone synthesizer 60, and may also be output as MIDI compatible and MIDI-exportable digital numbers. The output of tone synthesizer 60 is presented to an audio system 110 for listening, recording, or the like. The pitch bend, tone volume, and tone timbre signals are used to modify the tone produced by tone synthesizer 60, and are also output as MIDI-compatible and MIDI-exportable digital numbers. In contrast to what can be produced by a prior art synthesizer, the sound produced by system 210 in FIG. 2 includes realistic strum, pitch bend, volume and timbre effects.

Figure 3:
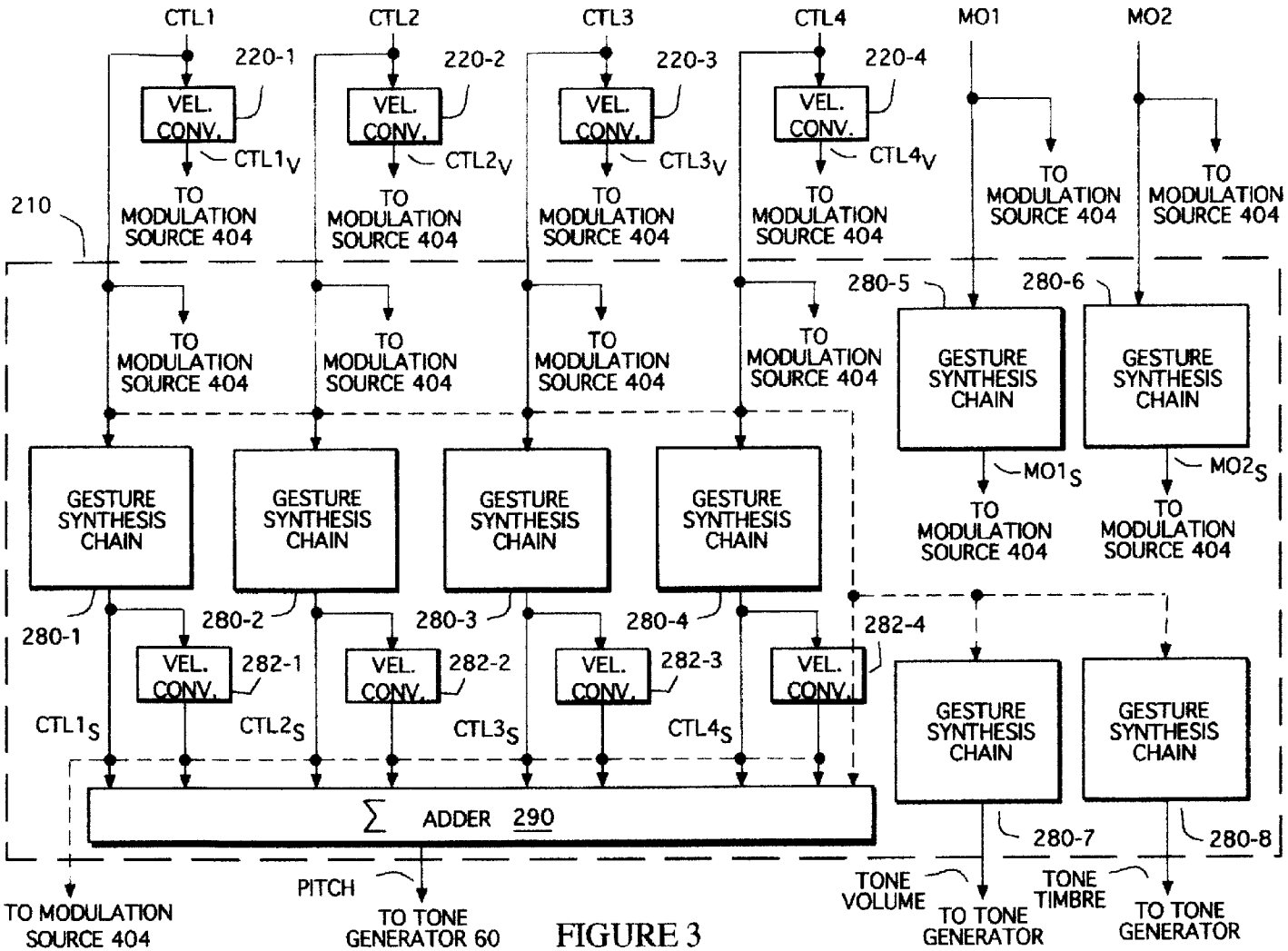
FIG. 3 is a generalized block diagram of the gesture synthesizer 210 of FIG. 2, depicting control data flow through blocks representing chains of gesture synthesis modules, and depicting modulation data sources, according to the present invention.
Figure 4:
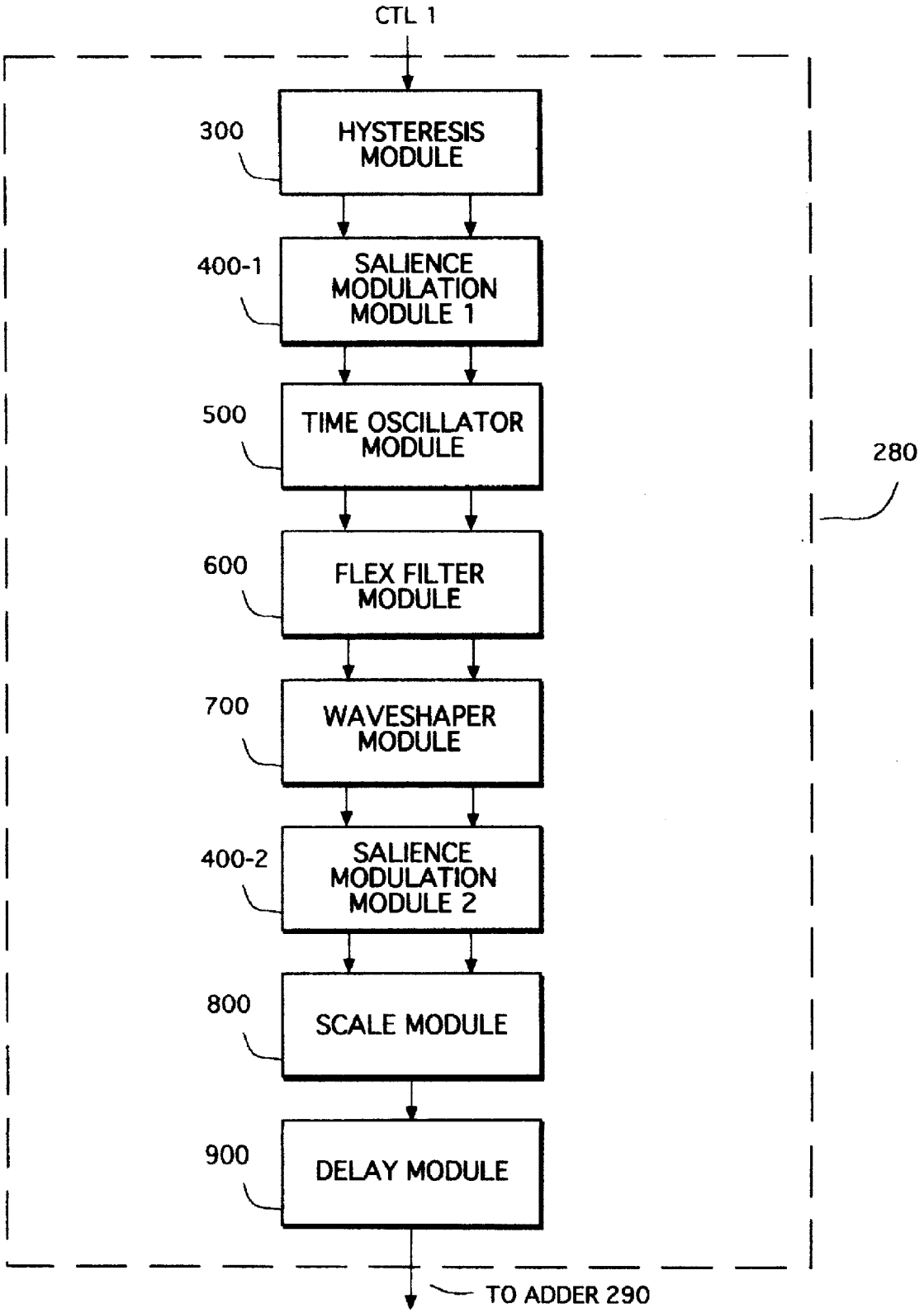
FIG. 4 is a generalized block diagram of one chain of gesture synthesis modules, according to a preferred embodiment of the present invention.

Referring to FIG. 3 and FIG. 4, the controller and modulator displacement values presented to gesture synthesizer 210 may be used to activate and control chains of gesture synthesis modules, e.g. modules 300, 400-1, 500, 600, 700, 400-2, 800, and 900. Some or all of the CTL-N, CTLNv, MO1, and MO2 signals may also be input to modulation source 404 as shown in FIGS. 14, 17, 18, 22, and 23.

Data used throughout the gesture synthesis system 210 is specified as either control data or modulation data. Control data is input from the user-operated controllers and from one module to the next in a continuous chain as shown in FIG. 4. Modulation data is always input to the modules internally via modulation source 404 shown in FIG. 23. Control data is eventually exported from the gesture synthesizer 210 and used to control continuous pitch and/or volume and/or timbre of tone generator 60, or to activate note-on, note-off data, whereas modulation data is used to modify control data.

FIG. 3 shows all sources of data available as modulation data via the modulation source 404. For example, data from two modulation operators MO1 and MO2 is exported to modulation source 404 as is output from the gesture synthesis chains 280-5 and 280-6, which are activated by MO1 and MO2. The various controller displacement, controller velocity, and the data output from gesture synthesis chains 280-1, 280-2, 280-3, and 280-4 are also exported to modulation source 404. It will be appreciated that other sources of modulation data may include data output from the individual gesture synthesis modules and/or acceleration data, and/or velocity of the output of the gesture synthesis modules, and/or acceleration of the output of the gesture synthesis modules.

Figure 24:
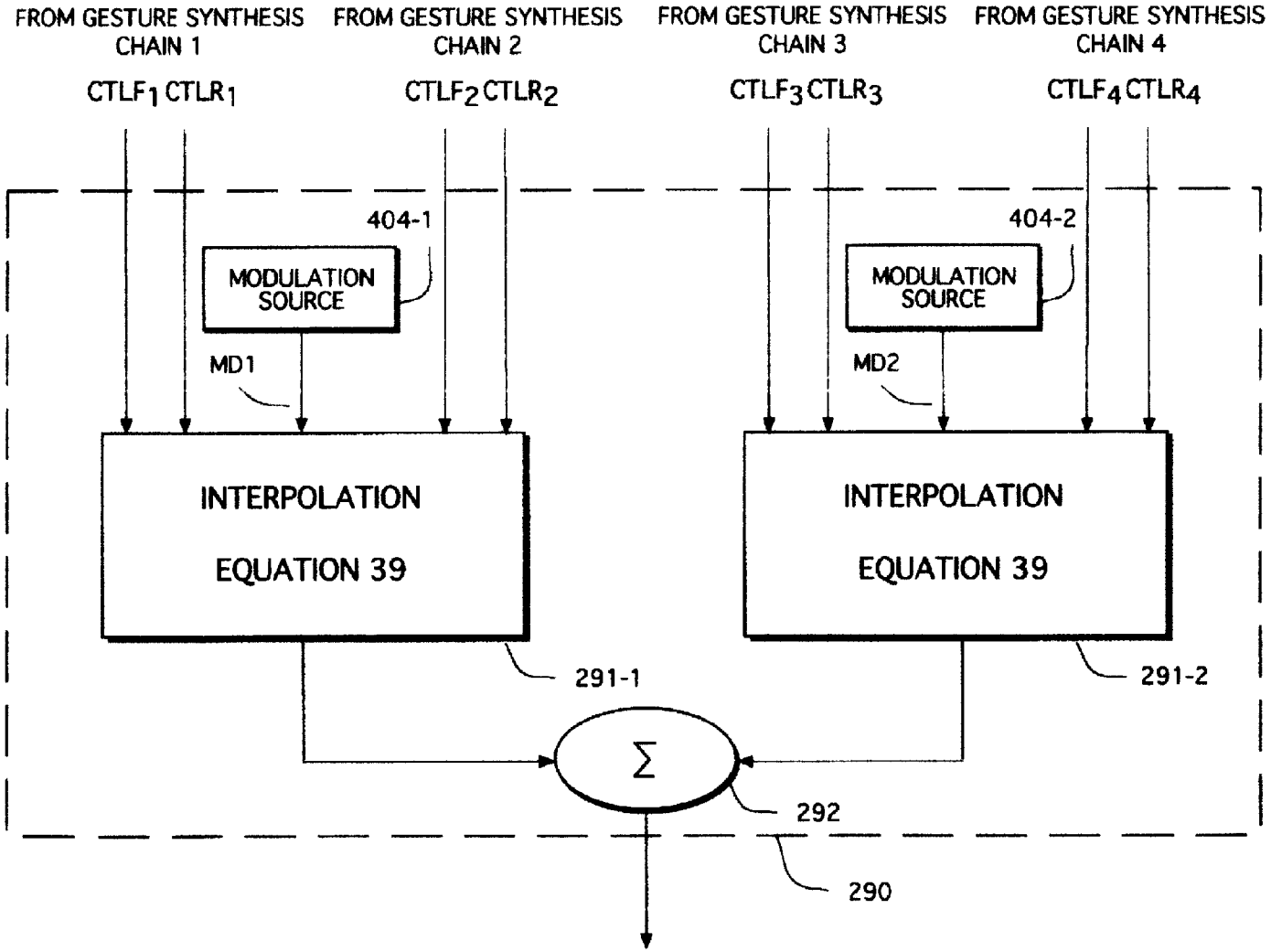
FIG. 24 is a generalized block diagram of adder 290 showing modulation controlled crossfades, according to the present invention.

As shown in FIG. 3, in the preferred embodiment, position data from four control operators CTL1–4 are input to gesture synthesis chain 280-1, 280-2, 280-3, and 280-4. The gesture synthesis chain outputs are output to velocity converters 282-1,2,3,4. The gesture synthesis chain outputs and the outputs of the velocity converters are input to adder 290. Additional velocity converters may be used to further convert the velocity data into acceleration data. The control data input to the gesture synthesis chains may also be input to Adder 290, to be combined with synthesized control data. Adder 290 may have user adjustable parameters for attenuating the various sources of input data. Adder 290 may also provide a crossfade function controlled by modulation data. FIG. 24 shows one such implementation, which will be described in detail later.

The combined data from adder 290 is exported as continuous pitch data to tone generator 60. Two other gesture synthesis chains 280-7 and 280-8 preferably are provided for modification of tone volume and/or tone timbre data, and/or generation of note on and note off data. Data from one or more control operators is input to gesture synthesis chains 280-7 and 280-8. The data from chains 280-7 and 280-8 is exported as tone volume and/or tone timbre information and/or note data to the tone synthesizer. It will be appreciated that the output of gesture synthesis chains 280-1, 280-2, 280-3, and/or 280-4 may be input to gesture synthesis chains 280-7 and/or 280-8 for further modification before being exported. It will further be appreciated that velocity and/or acceleration of data output from one or more gesture synthesis chains may also be exported as tone pitch, tone volume and/or tone timbre information and/or note data to the tone synthesizer.

A single gesture synthesis chain as depicted in FIG. 4 will now be described in detail. The various user-input controller displacement and velocity values presented to gesture synthesizer 210 may preferably be used to activate and control, or be modified by, a chain of gesture synthesis modules, e.g. modules 300, 400-1, 500, 600, 700, 400-2, 800, and 900. The control data (e.g., CTL1) may thus be subjected to hysteresis by a hysteresis module 300 and/or subjected to salience (curvature) modulation by a salience modulation module 400-1 and/or 400-2 and/or be used to activate and control a time domain oscillator, in a time oscillator module 500, and/or be subject to filtering preferably by a flex filter module 600 and/or be subjected to waveshaping by a waveshaping module 700 and/or be scaled by a scale module 800, and/or be delayed by a delay module 900.

The above represented order of the modules may be varied, or even reversed, and one or more modules may be deleted or bypassed. Preferably, the effect of each module on the control data is determined before activation of the controllers by input of programming arguments by the user. The programming arguments preferably available to the user for each module are shown in FIGS. 5–10. It will be appreciated that the functions of two, or more of the modules may be combined to make a single module. The modular architecture as specified is the most flexible from a programming standpoint, but may be more difficult for a new user to understand than a single, unified architecture.

Description of the Hysteresis Module

Figure 11A:
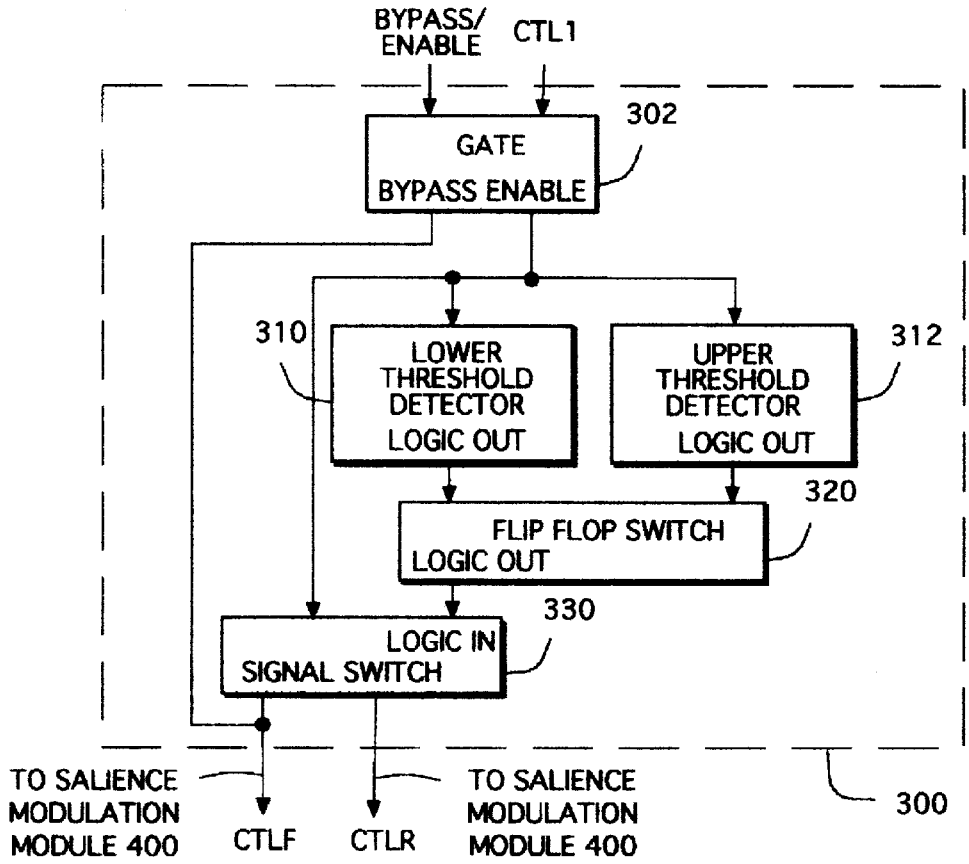
FIGS. 11A and 11B are generalized block diagrams depicting alternative embodiments of a hysteresis module, according to the present invention.

FIG. 11A is a generalized block diagram of a Hysteresis Module 300. Hysteresis is used to model the cyclic oppositional forces of muscle pairs as embodied in the cyclic oppositional forces function 240. Motion performed by a musician is usually accomplished using two muscles, one pulling in the direction of motion, and one pulling in the opposite direction to provide braking force. Muscles have a different force activation characteristic when contracting than when expanding. When the direction of motion is reversed, as when performing vibrato, the roles of the muscles are also reversed. The result is an inversion of the characteristic shape of the gesture in the forward and reverse direction.

The present invention seeks to emulate a musician's muscular interaction with an instrument. Accordingly, when modifying control data using the gesture synthesis modules, it is necessary to treat the data in the forward direction in a different, and usually opposite way from the data moving in the reverse direction. Hysteresis module 300 may be used to provide such differentiation in the forward and reverse direction. Hysteresis module 300 bifurcates the incoming control data (e.g., CTL1), and exports the forward control data ("CTLF") from a first outlet, shown on the left side of FIG. 11A and referred to as the left outlet, and exports the reverse control data ("CTLR") from a second outlet, shown on the right side of FIG. 11A.

Each of the forward and reverse control data may then be used to activate each of two sides of a bifurcated synthesis function. However, since simple hysteresis may result if the reverse function is an exact inversion of the forward, it is possible to use the same function for each direction. The hysteresis effect is accomplished by inverting one direction of data input to the function, and then inverting it again at the output. The effect is to invert gesture synthesis function itself for one direction of control data. This method may have the advantage of requiring less memory storage, since only one synthesis function is required. However, it is often desirable to introduce additional variations in the effect of one side of the synthesis, in addition to the hysteresis resulting from inverting the function. This requires two separate synthesis functions, one for each of forward and reverse control data.

As shown in FIG. 11A, control data from a user controller CTL1 is input to gate 302. Switching of gate 302 is available to the user as a bypass/enable menu selection. If enable is selected, controller data is input to lower threshold detector 310, upper threshold detector 312, and signal switch 330. Lower threshold detector 310 uses a logical comparison to test whether control data it receives is greater than a lower threshold amount.

Alternatively this function may test for the direction of motion of data, by comparing subsequent data values. The detector 310 test result is sent to the left input of a flip-flop switch, 320. The flip flop may be variously referred to as a bistable switch, or bipolar latch. When it receives a logical "false" at the left input input, it outputs a logical "false" regardless of its previous state. When it receives a logical "false" at its right input, it outputs a logical "true". Thus when the initial control data received by the lower threshold detector 310 is less than the lower threshold amount, the lower threshold detector 310 sends a logical "false" to the flip-flop switch 320. This "false" causes flip flop switch 320 to output a logical "false" to the logic input of signal switch 330. When the signal switch 330 receives a logical "false", it exports the forward controller data CTLF from the left outlet.

Likewise, the upper threshold detector 312 uses a logical comparison to test whether the control data it receives is greater than the upper threshold amount. This function may also test for direction of motion by comparing subsequent data values. When the control data exceeds the upper threshold, the threshold detector 312 sends a logical "false" to the right input of the flip flop switch 320. Flip flop switch 320 changes state and outputs a logical "true" to the signal switch 330. When the signal switch 330 receives a logical "true" it exports the control data from the right outlet. This remains the case until the control data once more falls below the lower threshold amount, at which time the whole sequence is repeated. Thus data input to the hysteresis module 300 is alternately exported as CTLF and CTLR to salience modulation module 400-1 as shown in FIG. 4.

Figure 11B:
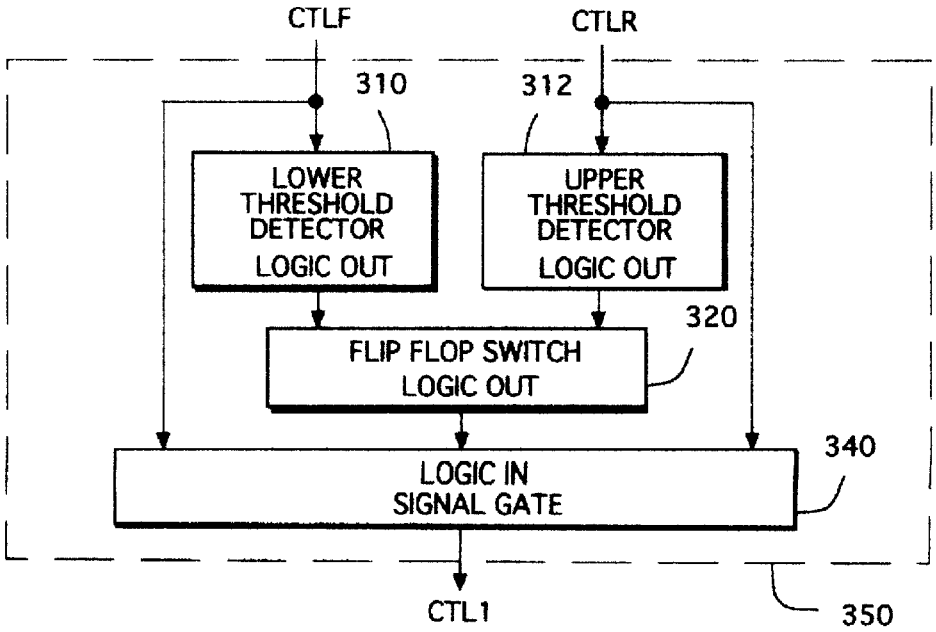

FIG. 11B shows an alternative embodiment of a hysteresis module 350, which works similarly to the module depicted in FIG. 11B. The principle difference is that the bifurcated gesture synthesis which creates hysteresis is accomplished prior to thus bifurcated control data being input to hysteresis module 350. Hysteresis module 350 uses logic switching to alternately output data in the forward direction, and data in the reverse direction (i.e. combine the two data streams by switching back and forth between them).

The components hysteresis module 350 function the same as described for [hyteresis] *hysteresis* module 300 except that instead of a signal switch 330 there is a signal gate 340. The two control data streams CTLF and CTLF are input to signal gate 340 as is logic data from flip flop switch 320. Hysteresis module 350 would customarily come at the end of the gesture synthesis chain as discussed in the operation section. Therefore, signal gate 340 alternately exports data from CTLF and CTLR to the scale module 800.

It will be appreciated that other means of creating hysteresis may be implemented. For example, the switch may occur at the end of a gesture in each direction or at the beginning. Or it may occur once at the beginning and once at the end of one direction of motion. The above process may be implemented as a series of computer instructions using logical comparisons and conditional branch operations. In another embodiment, an analog comparator circuit using an operational amplifier or equivalent transistor circuit may be used in place of a flip flop. A cyclic operator may also be used, that returns to a starting point using one continuous function or table to convert operator values like a mobius strip.

Description of the Salience Modulation Module

Figure 5:
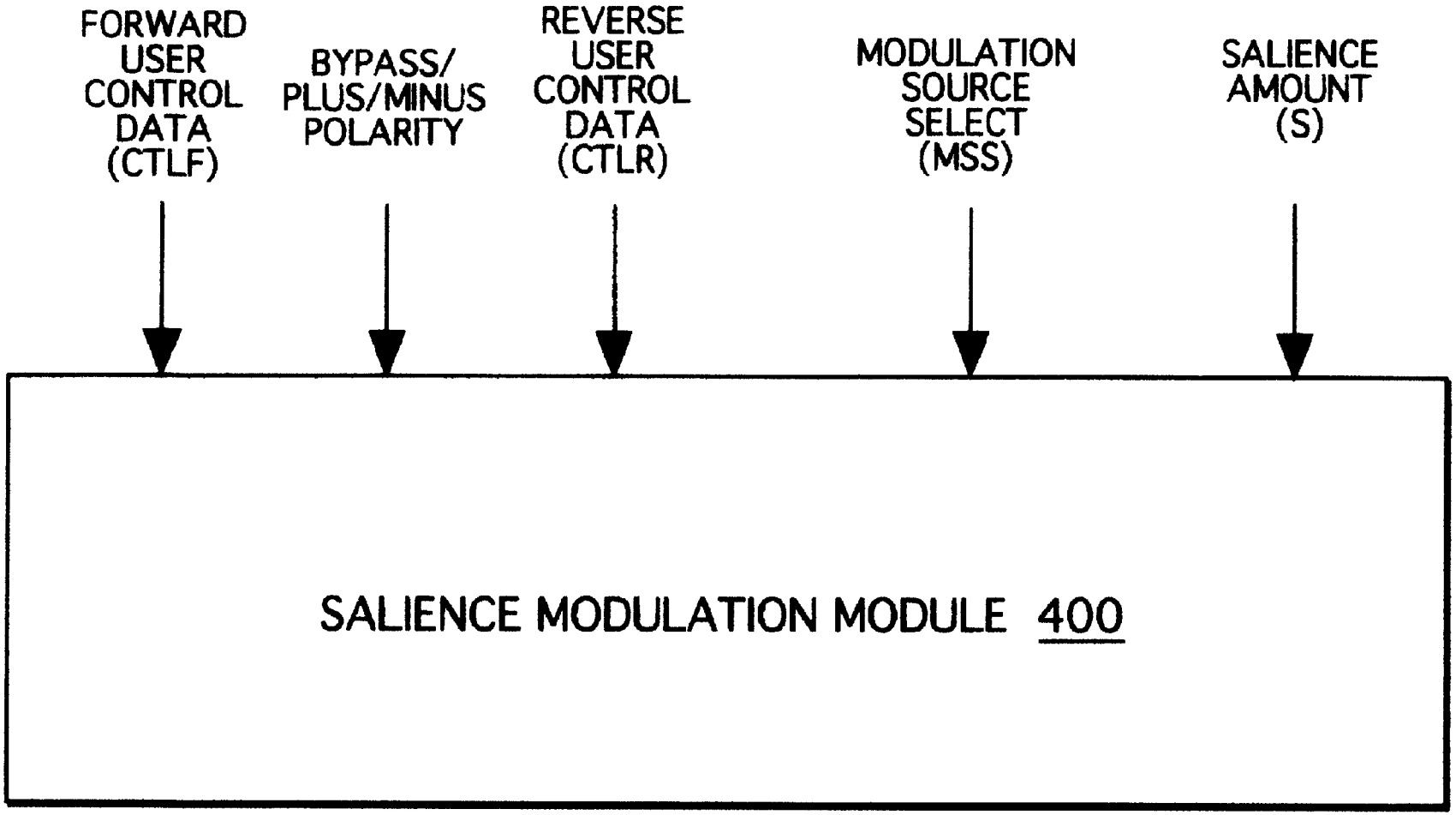
FIG. 5 is a diagram depicting the programming arguments input to a salience modulation module, according to the present invention.
Figure 12:
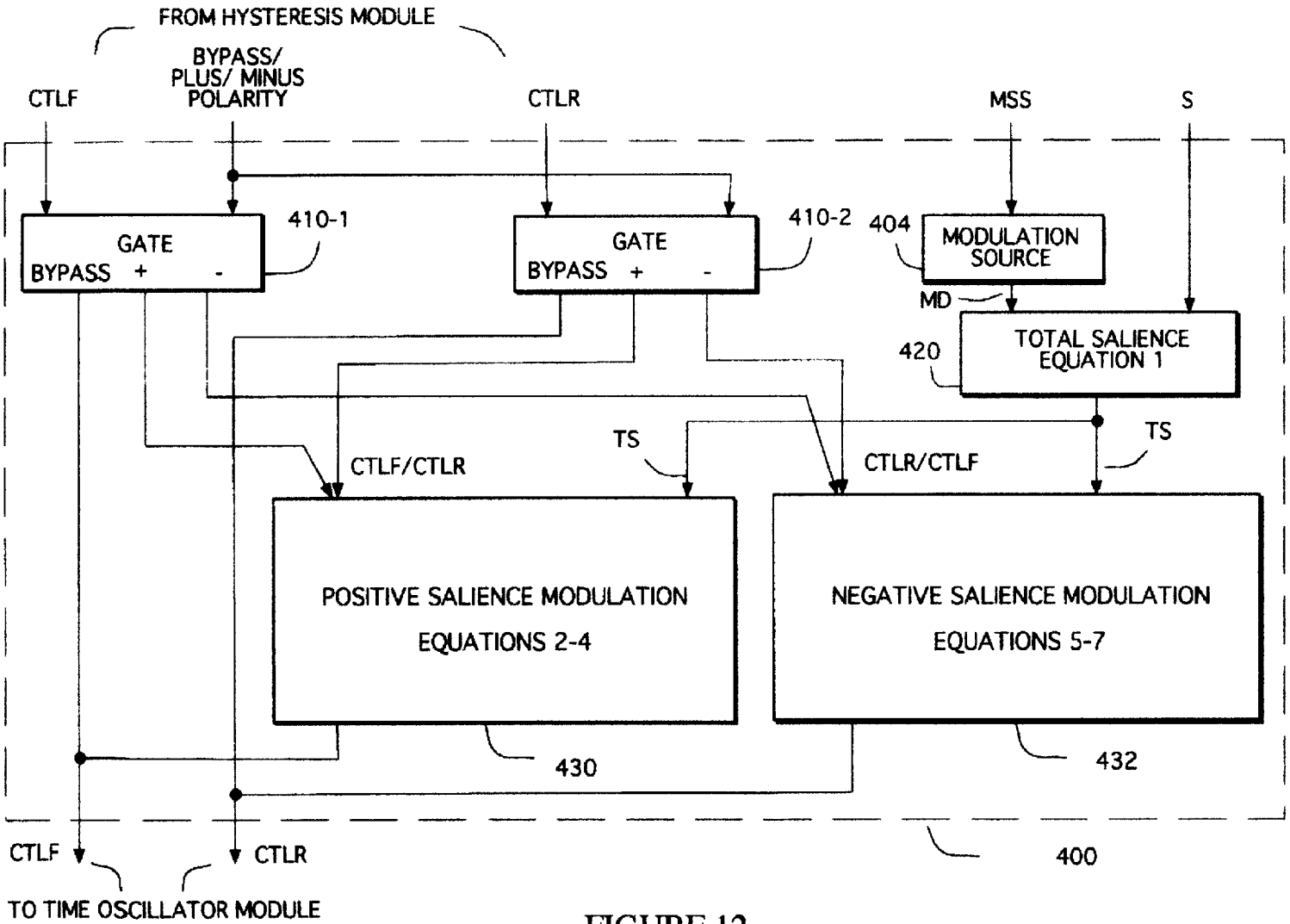
FIG. 12 is a generalized block diagram depicting a salience modulation module, according to the present invention.

FIG. 12 is a generalized block diagram of the salience modulation module 400. The programming arguments are shown in FIG. 5. The term "salience" here refers to the amount of curvature of a gesture. Specifically, it is a measure of the amount of deflection of a gesture curve away from a diagonal line connecting its endpoints. This measurement is illustrated in FIG. 13B and FIG. 13E. Salience is also defined as having a positive or negative polarity. Polarity refers to the direction of the salience modulation curve. Positive salience modulation is accomplished with a convex transfer function (FIG. 13B) while negative salience modulation is accomplished with a concave transfer function (FIG. 13E).

As noted, one deficiency in prior art synthesizers is the inability to define a virtual trajectory representing a gesture to be performed, and modify the characteristics of same in real time. The present invention provides a number of methods of accomplishing the desired control. For instance, salience modulation may be used to modify the curvature of the virtual trajectory as embodied in the virtual trajectory function 260. Or it may be used in conjunction with other modules to vary the time and/or amplitude parameters. The virtual trajectory parameters may be varied by a constant amount or by continuous modulation data from a selected modulation source.

In the present invention, musical gestures are represented in terms of parameters that are analogous to those previously described for musical tones. For example, gestures are performed to cover a certain distance in a certain amount of time. This is comparable to the amplitude and frequency of vibration of a tone. In addition, each type of gesture has a characteristic musical effect that is related to the shape of the distance-time curve it describes. This is comparable to the timbre of a musical tone, which is related to the waveshape of the periodic wave that produces it. Subtle nuances of shape for similar gestures give added variety and meaning, as do subtle shadings of the timbre of an instrument. To obtain these nuances, control data may be modified in a continuous manner by a separate modulation source, which may be compared to a control envelope that is used to modify tone parameters. Modification by data from a modulation source may be likened to the controlling action of the antagonistic muscle in muscle pairs. This is embodied in the cyclic oppositional forces function 240.

Shown in FIG. 13A and FIG. 13D is a pair of gesture curves, one for the forward direction of motion, and one for the reverse direction, that together may be regarded as a gesture waveform. Their characteristic curvature may be regarded as the waveshape. Each half waveform, corresponding to each direction of controller motion, has a different characteristic shape. This difference results from the changing roles of the two muscles used to create each gesture, as represented by the cyclic oppositional forces function 240.

In practice, pitch bends are generally performed in rhythm with the other notes in a musical phrase, and often have the same duration as a note. This may be regarded as a virtual time parameter that corresponds to wavelength [in the waveform model]. The duration of a single pitch bend corresponds to half a wavelength. Each half wavelength corresponds to one direction of operator deflection. Thus, in FIGS. 13A, 13C, 13D, and 13F, each half wavelength is represented separately. FIG. 13A shows a single gesture as it might appear after waveshaping by the waveshaping module 700. FIG. 13B shows the salience modulation transfer function. FIG. 13C shows the gesture curve as it might appear after shaping by the transfer function. FIGS. 13D–F show the same shaping process of the other half waveform, resulting from the reverse direction of operator deflection.

Referring to FIG. 12, forward and reverse control data CTLF and CTLR is input from hysteresis module 300 to gates 420-1 and 420-2. A bypass/plus/minus polarity select allows the user to determine whether module operation will be bypassed. If bypass is selected, data to gates 420-1 and 420-2 determine that CTLF and CTLR are exported from the outputs to the time oscillator module 500 (see FIGS. 4 and 14). Otherwise, the user determines the polarity of salience modulation. Depending on polarity selection made by the user the forward and reverse control data is input from gates 420-1 and 420-2 to either positive salience modulation 430, or negative salience modulation, 432. As will be described, transfer function equations 2–4 are associated with positive salience modulation, whereas equations 5–7 govern negative salience modulation. TABLE 1, appearing at the end of the disclosure, sets forth all of the equations referred to, including a [bried] *brief* description of their function.

A modulation source is preferably selected from a menu provided to the user. As depicted in FIG. 12, *a* number MSS representing the selection is input to modulation source 404. Modulation data MD from the selected modulation source is input to salience amount function 420. A constant number representing a constant amount of salience S is also selected by the user, and is input to salience amount 420. Salience amount 420 computes a total salience amount TS using EQUATION 1. EQUATION 1 ensures that the total salience amount TS remains within the specified increment range of 0–127. The constant salience S establishes a base amount of salience, such that the total salience amount TS moves in a range between the constant salience S and the maximum increment of 127.

The output of salience amount function 420 is input to positive salience modulation function 430 and negative salience modulation function 432. The amount of shaping achieved by these functions can thus be constant, or can be modified continuously using MD. In the preferred embodiment, one of three salience modulation equations that can be used for each module. EQUATION 2 and EQUATION 5 generate positive and negative salience hyperbolic curves similar to that shown in FIGS. 13B and 13E, but skewed to one side. EQUATION 3 and EQUATION 6 generate positive and negative salience exponential curves also similar to that shown in FIGS. 13B and 13E, but skewed to the other side. EQUATION 4 and EQUATION 7 generate positive and negative salience radial curves that are a section of a circle, and are most like the ones in FIGS. 13B and 13E.

These three pairs of equations have slightly different effects, the most effective being the radial curve. However, each subsequent pair requires more processing power than the last, the third being the most expensive. The output of the positive salience modulation 430 and negative salience modulation 432, are exported respectively as CTLF and CTLR from the left and right outputs and are provided as inputs to the time oscillator module 500.

It will be appreciated that other salience modulation equations are possible. These may include transfer functions that generate parabolic, trigonometric, elliptical or other types of polynomial curves or combinations thereof. These equations may be specified as having variable salience with associated programming arguments, or may accomplish salience modulation according to internally generated data, such as that from a clock, without variation available to the user.

Description of the Time Oscillator Module

Figure 6:
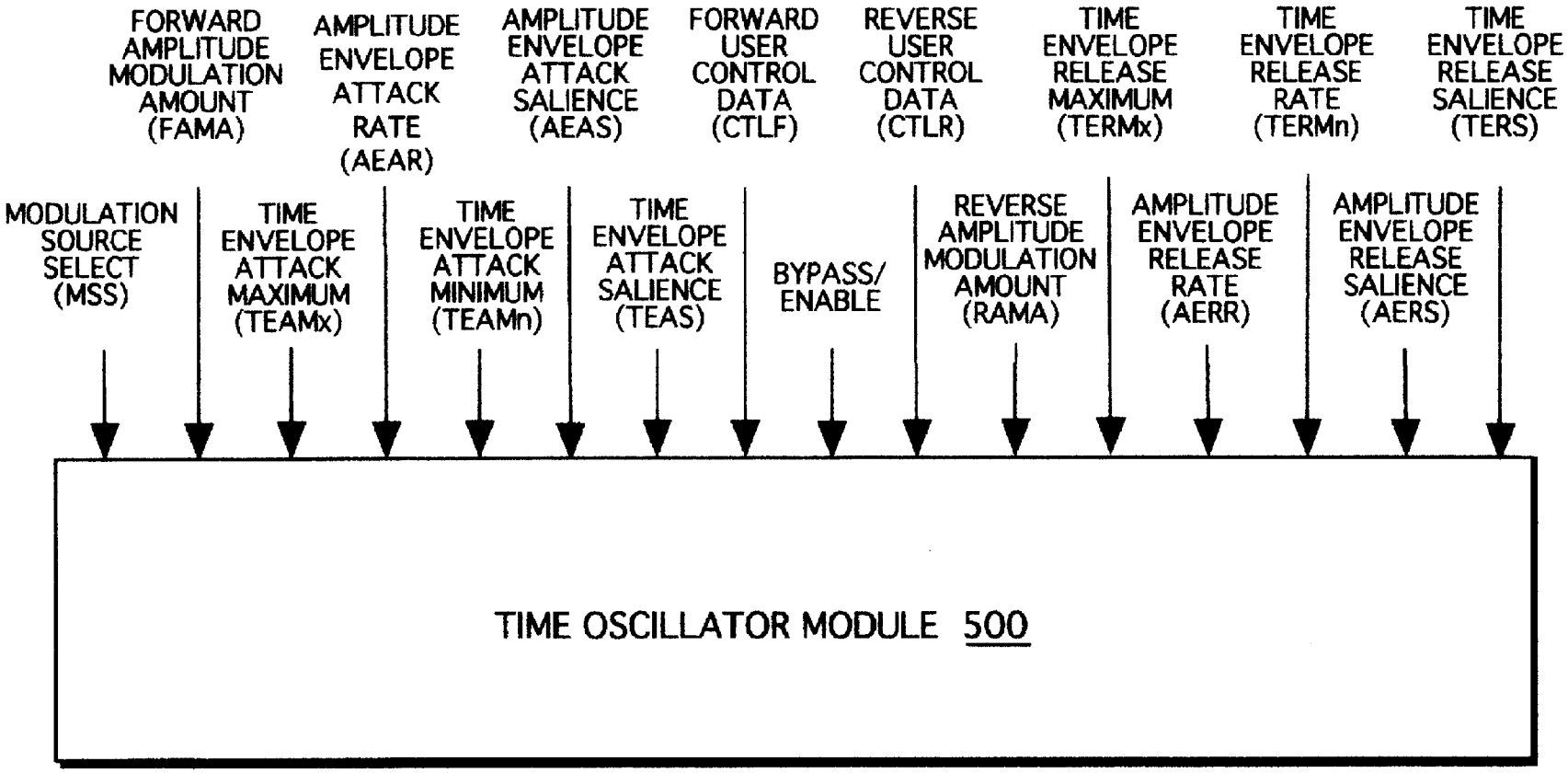
FIG. 6 is a diagram depicting programming arguments input to a time oscillator module, according to the present invention.
Figure 14A:
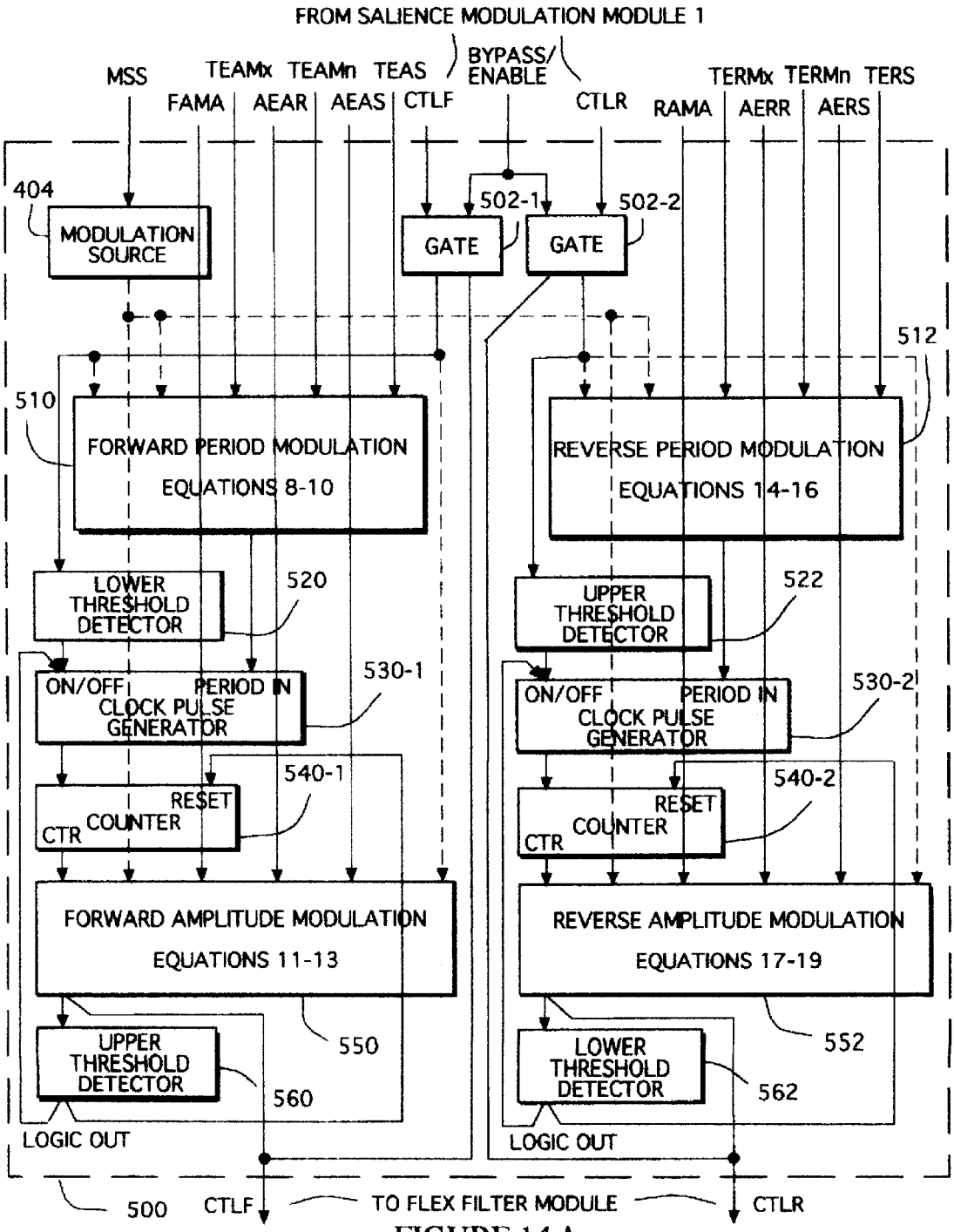
FIGS. 14A and 14B are generalized block diagrams depicting alternative embodiments of a time oscillator module, according to the present invention.

FIG. 14A is a generalized block diagram of a preferred embodiment of the time oscillator module 500. Programming arguments to the module are shown in FIG. 6. Muscles are activated by electrical pulses generated by a musician's nervous system. This module models the response of muscles to an internal electrical stimulus, as embodied in the muscle stimulus response function 250. It sums clock pulses to create control data in accordance with user input control data. It uses to clock sources to mimic the cyclic action of muscle pairs, as embodied in the cyclic oppositional forces function 240 in FIG. 2.

Figure 15A:
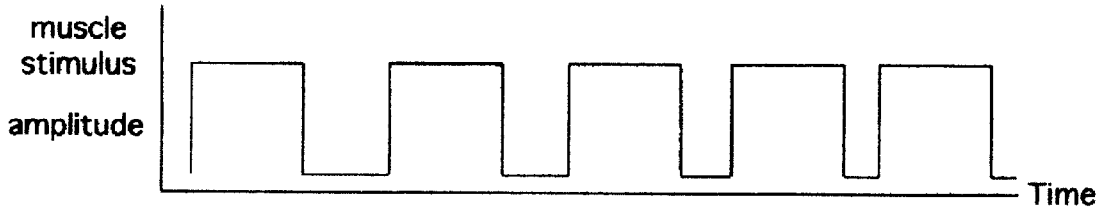
FIGS. 15A–D depict muscular response to electrical stimulus, and a stair-step summation of clock pulse function.
Figure 15B:
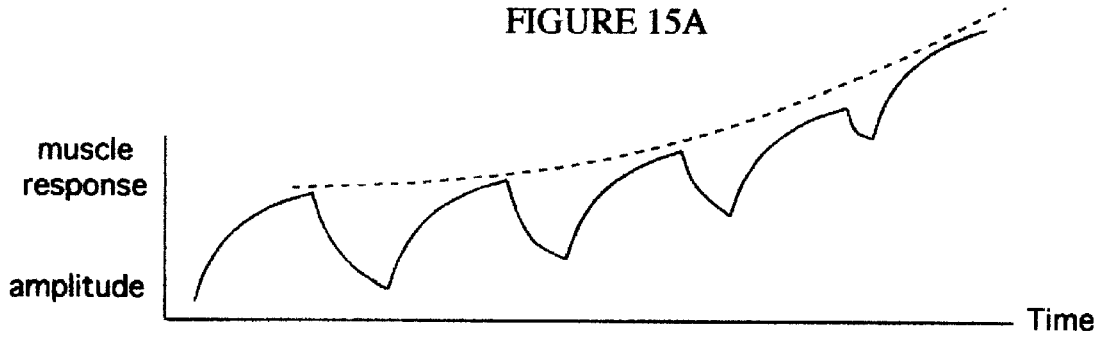

Force develops in muscles in response to a train of electrical pulses, as shown in FIG. 15A. Each discrete pulse causes the muscle to twitch. The twitches have a characteristic rise time and decay time as shown in FIG. 15B. As the period of the pulses decreases, each twitch only partly decays before the onset of the next, resulting in a net increase in force. The force increases at a rate inversely proportional to the period of the pulses. The amplitude of the force that is added with each successive twitch also increases in inverse proportion to the pulse period, since each twitch has a shorter time to decay before the next twitch superimposes on it.

Figure 14B:
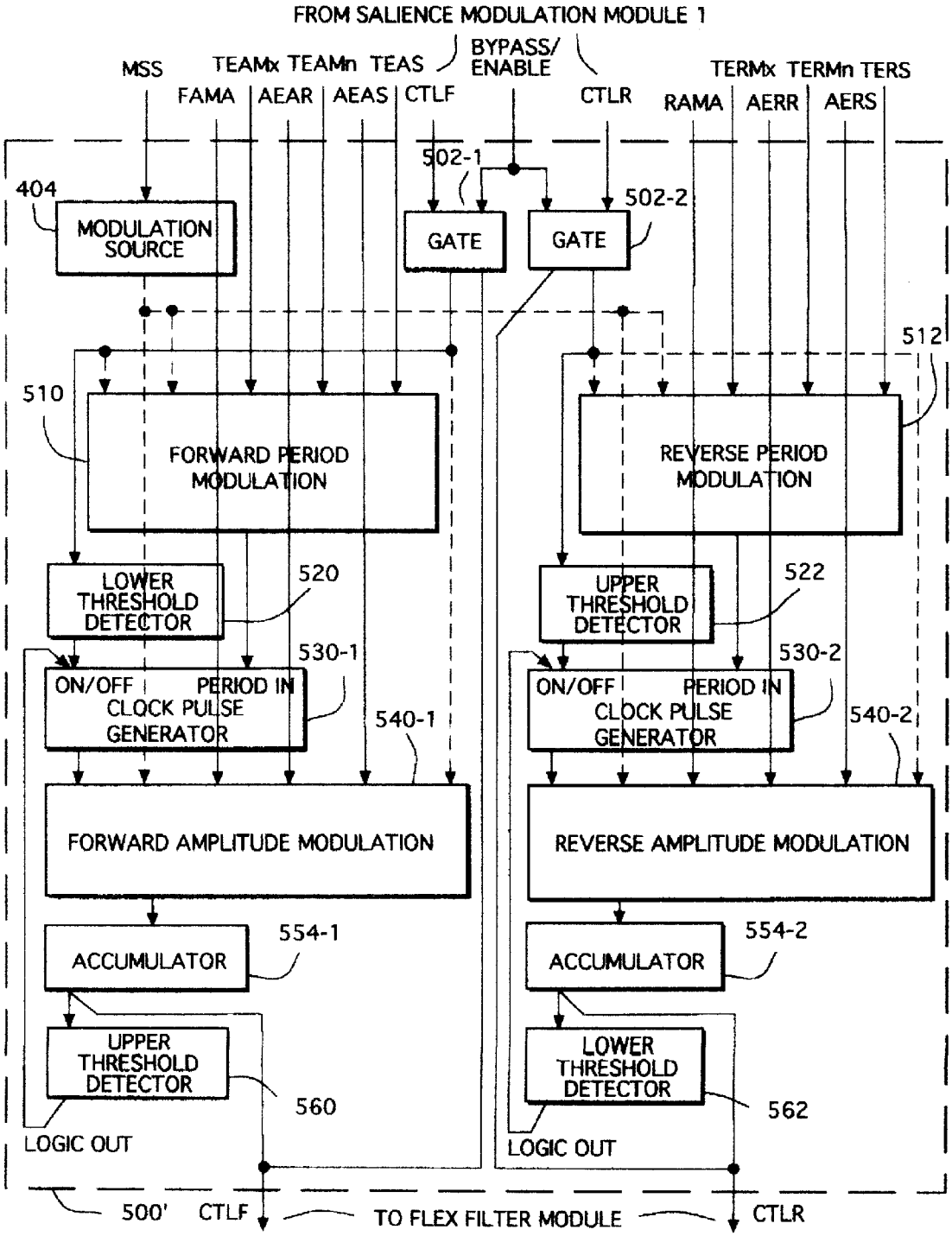
Figure 15C:
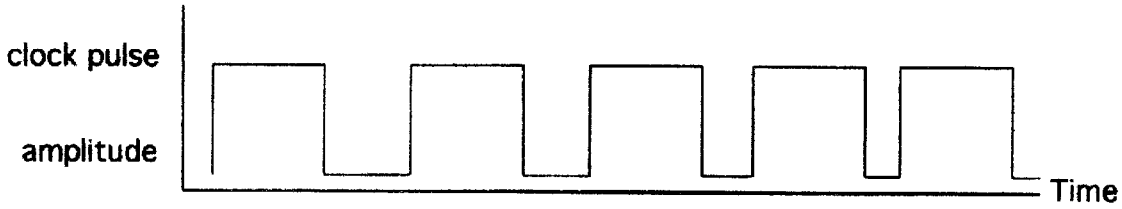
Figure 15D:
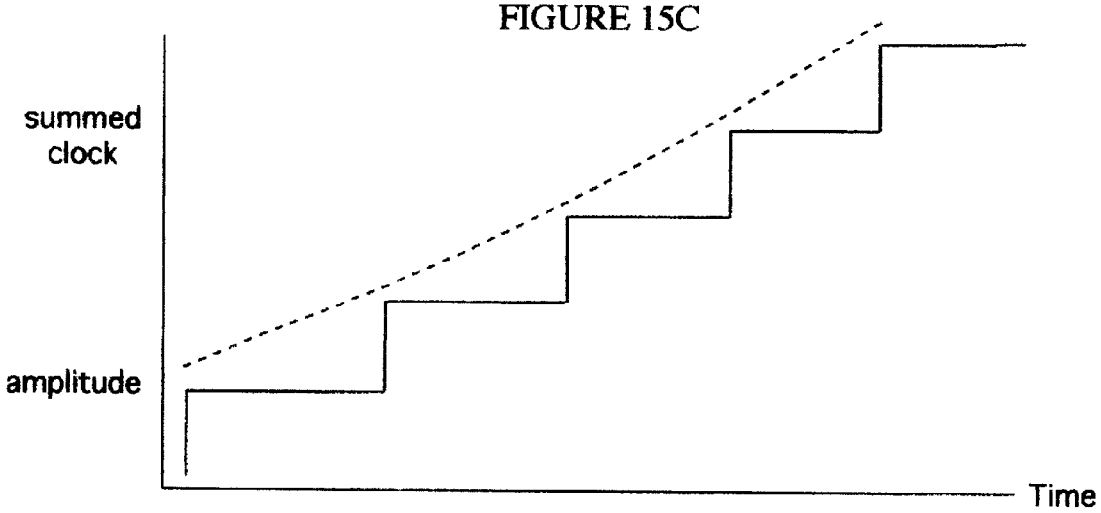

The above process can be modeled by adding pulses from a clock, as shown in FIGS. 15C and 15D. The period of the clock pulses is varied in accordance with a user operated controller, simulating muscle stimulation. The amplitude of the summation is simultaneously varied, simulating the increase in amplitude of residual twitch force with decreasing period. Alternatively, the amplitude of each successive pulse may be varied and the resulting modified pulses summed. These two embodiments are shown in FIGS. 14A and 14B respectively. The clock pulse generators 530-1 and 530-2 represent calculations performed once every cycle of the operation of each side of the module. It will be appreciated that a constant period system clock may be running in the background at all times, but that activation of the clock pulse generators 530-1 and 530-2 in this representation indicates initiation of the oscillator routines controlled by each. Likewise, deactivation of the clock pulse generators represents stopping or pausing the filter routines. Variations in their cycle period may represent delay or subdivide functions necessary to vary the rate of calculations controlled by a constant period system clock.

Referring now to FIG. 14A, forward and reverse control data is input from the salience modulation module 400 to gates 502-1 and 502-2. A bypass/enable select allows the user to bypass operation of module 500. If enable is selected, forward control data is input to a lower threshold detector 520. The lower threshold detector 520 uses a logical comparison to test if control data it receives is greater than a lower threshold amount. When control data exceeds a lower threshold amount, the lower threshold detector 520 sends a logical command to clock pulse generator 530-1. A logical "true" activates the clock pulse generator 530-1 which outputs periodic pulses with period determined by forward period modulation 510. Alternatively, the lower threshold detector 520 may test for forward direction of data, by comparing subsequent data values.

The forward period modulation 510 varies the period of the clock pulses in accordance with an equation that preferably uses three programming arguments, in addition to controller data and modulation data. This equation generates values that describe a curve. The programming arguments specify the endpoints of the curve, and its characteristic salience or curvature as shown in FIG. 16A. This curve is comparable to the attack portion of the sort of control envelope used to modify tone oscillators, which has similar programming arguments. When the controller is operated to move in the forward direction, the values generated by the modulation equation in accordance with the controller data are referred to as the attack of the time envelope. The envelope attack has the arguments time envelope attack maximum TEAMx, time envelope attack minimum TEAMn and time envelope attack salience TEAS as shown in FIG. 16A.

When control data is first input, time envelope attack maximum value specified by TEAMx is input to the clock pulse generator 530-1. As the controller is moved in the forward direction, the period of the pulses is decreased in accordance with the forward period modulation equation, along the curve defined by TEAS, until it reaches the minimum value TEAMn. A modulation source is selected from a provided menu which inputs a number MSS representing the selection to the modulation source 404 (see FIG. 23). Modulation data MD from modulation source 404 is combined in the forward period modulation 510 with control data CTLF, and may be used to further modify the clock period.

Three equations for the forward period modulation 510 are specified, each having somewhat different envelope generation characteristics. In EQUATION 8, the programming arguments act for the most part independently. That is, varying one of the programming arguments does not vary, or varies only slightly, the envelope characteristics specified by the other programming arguments. However, EQUATION 8 requires the greatest amount of processing power. EQUATION 9 creates a somewhat different characteristic envelope, and is not as realistic sounding as EQUATION 8. However, EQUATION 9 requires considerably less processing power to operate. EQUATION 10 is a compromise. It is more difficult to program than EQUATION 8 in that the programming arguments tend to have an effect on one another, but it uses less processing power. It also produces more realistic effects than EQUATION 9.

The clock pulses from clock pulse generator 530-1 are input to counter 540-1. Counter 540-1 sums clock pulses and outputs a stair step function as shown in FIG. 15D. The stair step function is input to forward amplitude modulation 550. The forward amplitude modulation 550 varies the amplitude of the summed clock pulses in accordance with an equation that uses three arguments in addition to data from CTLF and MD. These arguments are also similar to those commonly used for control envelopes. The Amplitude Envelope Attack Rate AEAR controls the rate at which the stair step function rises. The Amplitude Envelope Attack Salience AEAS controls the salience or curvature of the output of forward amplitude modulation 550. The Forward Amplitude Modulation Amount FAMA controls the degree to which data from modulation source 404 effects the forward amplitude envelope rate and salience. Three forward amplitude modulation equations are specified. EQUATION 11 only allows for modulation of the amplitude with MD. EQUATION 12 allows for modulation with CTLF and MD. In EQUATIONS 11 and 12, the rate and salience arguments may also effect the quality specified by the other argument. An equation that gives similar output may be specified, but for which the programming arguments act independently. However, such an equation would require more processing power. EQUATION 13 only has arguments for AEAR and AEAS and does not allow for modulation. However this equation requires very little processing power.

The output of forward amplitude modulation 550 is input to an upper threshold detector 560. When the data reaches an upper threshold at or near the maximum specified increment of 127, upper threshold detector 560 sends a logical "false" to the clock pulse generator 520 which stops sending out clock pulses. A logical "false" is also sent to the counter 540-1, which causes it to reset to zero. Alternatively, counter 540-1 may be reset by data from upper threshold detector 512 indicating that control data input to time oscillator module 500 has reversed direction. Or counter 540-1 may be reset by logic data from lower threshold detector 510 when control data once more has returned to a starting position. In another embodiment, a logic signal may also be sent to the reverse clock pulse generator 530-2 causing it to begin [generationg] *generating* clock pulses. In still another embodiment, the upper threshold detector 560 may detect when a certain amount of time has elapsed from the start of clock pulse summation, or when the velocity or acceleration of output data reaches a predetermined amount. Output from forward amplitude modulation 550 is also exported as CTLF from the left output to the Flex Filter Module 600.

The time oscillator module 500 operates in a similar fashion when the controller is moved in the reverse direction. Control data CTLR is input to an upper threshold detector 522. The upper threshold detector 522 first reverses the control data by subtracting it from the maximum data increment amount of 127. Threshold detector 522 then uses a logical comparison to test if the data it receives is greater than a lower threshold amount. When the reversed data exceeds a lower threshold amount, upper threshold detector 522 sends a logical command to clock pulse generator 530-2. A logical "true" activates the clock pulse generator 530-2, which outputs periodic pulses whose period is determined by reverse period modulation 512. Alternatively upper threshold detector 522 may test the for reverse direction of motion of data, by comparing subsequent data values.

Reverse period modulation 512 varies the period of the clock pulses from clock pulse generator 530-2 in accordance with an equation that uses three programming arguments, in addition to control data and modulation data. This equation generates values that describe a curve. The programming arguments specify the endpoints of this curve and its characteristic salience or curvature as shown in FIG. 16B. This curve is comparable to the release portion of the sort of control envelope used to modify tone oscillators, which has similar programming arguments. It is therefore referred to as the release of the time envelope, and is specified by the arguments time envelope release maximum TERMX, time envelope release minimum TERMn and time envelope reverse salience TERS as shown in FIG. 16B.

When reverse control data CTLR is first input, the value for the time envelope release maximum TERMX is input to the clock pulse generator 530-2. As the controller is moved in the reverse direction, the period of the pulses is decreased in accordance with the reverse period modulation equation, along a curve with salience determined by TERS, until it reaches a minimum value TEAMn. Modulation data MD from modulation source 404 is preferably combined in the reverse period modulation equation with control data from CTLR, and may be used to further modify the clock period.

Three equations for reverse period modulation 512 are specified, each having somewhat different envelope generation characteristics. In EQUATION 14, the programming arguments act for the most part independently. That is, varying one of the programming arguments does not vary, or varies only slightly, the envelope characteristics specified by the other programming arguments. However, EQUATION 14 requires the greatest amount of processing power. EQUATION 15 creates a somewhat different characteristic envelope, and is not as realistic sounding as EQUATION 14. However, EQUATION 15 requires considerably less processing power to operate. EQUATION 16 is a compromise. It is more difficult to program than EQUATION 14 in that the programming arguments tend to have an effect on one another, but it uses less processing power. It also produces more realistic effects that EQUATION 15.

The clock pulses from clock pulse generator 530-2 are input to counter 540-2. The counter sums clock pulses and outputs a stair step function as shown in FIG. 15D. The stair step function is input to reverse amplitude modulation 552. Reverse amplitude modulation 552 reverses the direction of the stair step function causing it to step down from the maximum increment amount of 127 to 0. It also varies the amplitude of the stair step function in accordance with an equation that uses three arguments in addition to data from CTLR and MD. These arguments are also similar to those commonly used for control envelopes. Thus the Amplitude Envelope Release Rate AERR controls the rate at which the stair step function declines. The Amplitude Envelope Release Salience AERS controls the salience or curvature of the output of reverse amplitude modulation. The Reverse Amplitude Modulation Amount RAMA controls the degree to which data from the modulation source 404 effects the reverse amplitude envelope rate and salience.

Three reverse amplitude modulation equations are specified. EQUATION 17 only allows for modulation of the amplitude with MD. EQUATION 18 allows for modulation with CTLR and MD. For both of these equations, the rate and salience arguments may also effect the quality specified by the other argument. An equation that gives similar output may be specified, but for which the programming arguments act independently. However, such an equation would require more processing power. EQUATION 19 only has arguments for AERR and AERS and does not allow for modulation. However this equation requires very little processing power.

The output of reverse amplitude modulation is input to a lower threshold detector 562. When the data reaches a lower threshold at or near the minimum specified increment of 0, the lower threshold detector 562 sends a logical "false" to the clock pulse generator 530-2, which stops sending out clock pulses. A logical "false" is also sent to the counter 540-2, which causes it to reset to zero amount. Alternatively, counter 540-2 may be reset by data from lower threshold detector 510 indicating that control data input to time oscillator module 500 has returned to a starting position. Or counter 540-2 may be reset with logic data from upper threshold detector 512 when control data returns and starts back in the reverse direction again. Similarly to the upper threshold detector, the lower threshold detector 562 may detect when an amount of time has passed, when a velocity or acceleration rate has been reached, and may also reactivate the forward pulse counter 530-1. The output of reverse amplitude modulation is also exported from the right output as CTLR to the Flex Filter Module 600.

It will be appreciated that other period or amplitude modulation equations with the same or like programming arguments may be specified. For example a simpler amplitude equation would contain only a rate argument and no salience argument. Polynomial, trigonometric, eliptical, exponential or logarithmic functions, or preset lookup tables for which variable endpoints and curves can be determined by the user may provide results similar to the equations provided. In another embodiment, equations may be specified without variable arguments but which vary the clock period in a similar fashion to that which is specified. Or control data may be used directly to vary clock period and/or amplitude. Likewise, inverted or reversed control data may be used to vary clock period and/or amplitude. These simplified arrangements may be made more flexible by adding rate arguments. A simplified forward period modulation formula might be (128-CTLF)*R where R is rate. Additional terms may be added for modulation data i.e. (127-CTLF)*R+(128-MD)*A where MD is modulation data and A is modulation amount.

An alternative time oscillator module 500' is shown in FIG. 14B. In time oscillator module 500', amplitude of individual pulses may also be modified before being summed in an accumulator, as an alternative to modulating the sum of pulses added by a counter. Here all elements function as previously described except that the outputs of clock pulse generators 530-1 and 530-2 are first input to forward and reverse amplitude modulation 540-1 and 540-2 respectively instead of being input to pulse counters as in FIG. 14A. The outputs of amplitude modulation 540-1 and 540-2 are then added in accumulators 554-1 and 554-2 respectively. The data from accumulators 554-1 and 554-2 are input to upper and lower threshold detectors 560 and 562 which operate as previously described.

The results obtained by time oscillator module 500 shown in FIG. 14A and time oscillator 500' shown in FIG. 14B will be different. In time oscillator module 500', when the amplitude modulation is varied continuously, each clock pulse is modified by a different amount, and the results summed. In time oscillator module 500, when amplitude modulation is varied continuously, in effect every pulse is modulated continuously.

In both embodiments, additional switching elements may be necessary to avoid overlapping data between left and right output data CTLF and CTLR. For example, when data from one side has not exceeded its output threshold, the clock may continue to generate data while other side has already started, When the two sides are later combined, they will conflict. This may be avoided with gates controlled by the input threshold detectors 520 and 522 or by stopping clock generation of each side using logic data from the other side's threshold detector (i.e., logic data from lower threshold detector 520 stops clock pulse generator 530-2 and logic data from upper threshold detector 522 stops clock pulse generator 530-1).

It will be appreciated that an enhancement to the above embodiments may include a means of testing for zero rate of movement of the input control data. When control data stops, the clock pulse generator is turned off, stopping operation of the module. An additional enhancement might include a means of detecting a change of direction of input control data. When data changes direction, the previously activated clock pulse generator is turned off, while the clock pulse generator on the other side is turned on. In addition, a means of initializing the counter or accumulator for the newly activated side may be provided so that the output of the module is the same as it was before the direction change. This would require the use of another equation, likely an inversion of the amplitude modulation equation, which calculates what value of the counter or accumulator would give the same output value as the previous output.

It will be appreciated that an alternative embodiment may use only one clock pulse generator but provide means of switching the pulses output from the generator between forward and reverse amplitude modulation 540-1 and 540-2. Likewise, a single pulse counter or accumulator may be used, but for which the sign of the operation is changed to initiate a change of direction of output data. Or two pulse counters may be running simultaneously with the outputs gated alternately using input or output control data. It will also be appreciated that other arrangements of the elements described may give similar or identical results.

A more complex embodiment for a time module would implement a real time superposition algorithm utilizing complex transforms of a unit step function, such as a Laplace Transform, to simulate superposition of muscle twitches resulting from response to internal electrical stimulation. Another, more elaborate implementation might include several clock pulse generators, with successively spaced threshold detectors to activate them. As the control operator crosses each threshold, a new clock is activated. When this happens either the previous clock turns off, or the outputs of each successive clock are combined with the previously activated ones. Each such clock could be set at a predetermined or variable rate. In addition, a series of clocks activated in a like manner by the combined output of the module could also be combined with the ones activated by the control operator. The threshold detectors in the above embodiments may detect position of input or output control data, or may detect velocity and/or acceleration of input control data, or may detect units of time passed since the activation of the gesture. These embodiments are considerably less efficient than those previously described, but may create complex and interesting synthesized gestures otherwise difficult to obtain.

Description of the Flex Filter Module

Figure 7:
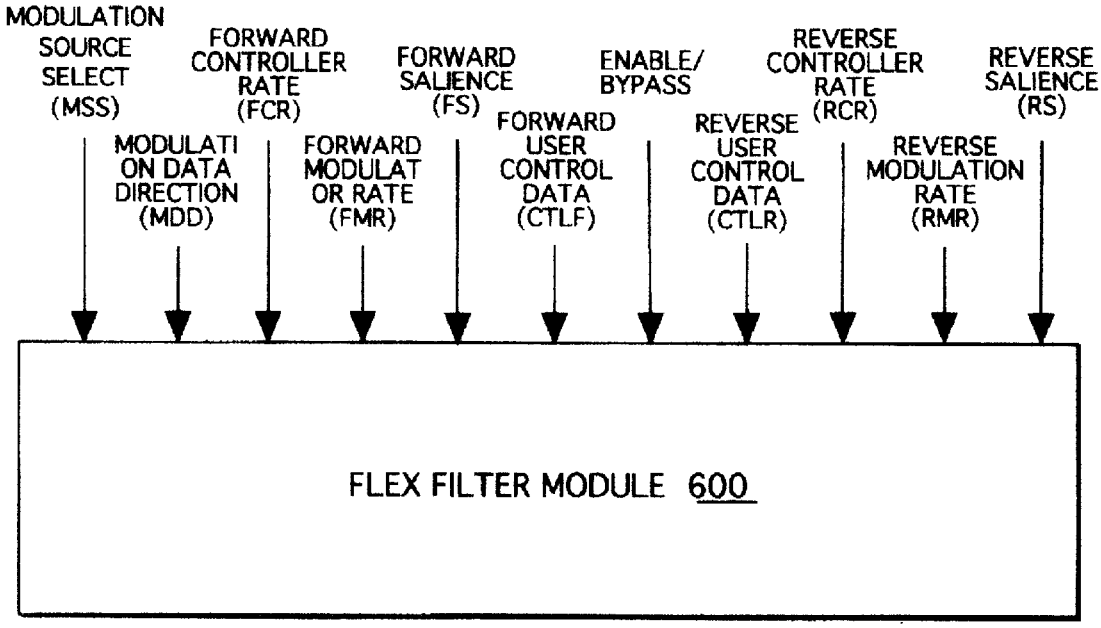
FIG. 7 is a diagram depicting programming arguments input to a filter module, according to the present invention.
Figure 17:
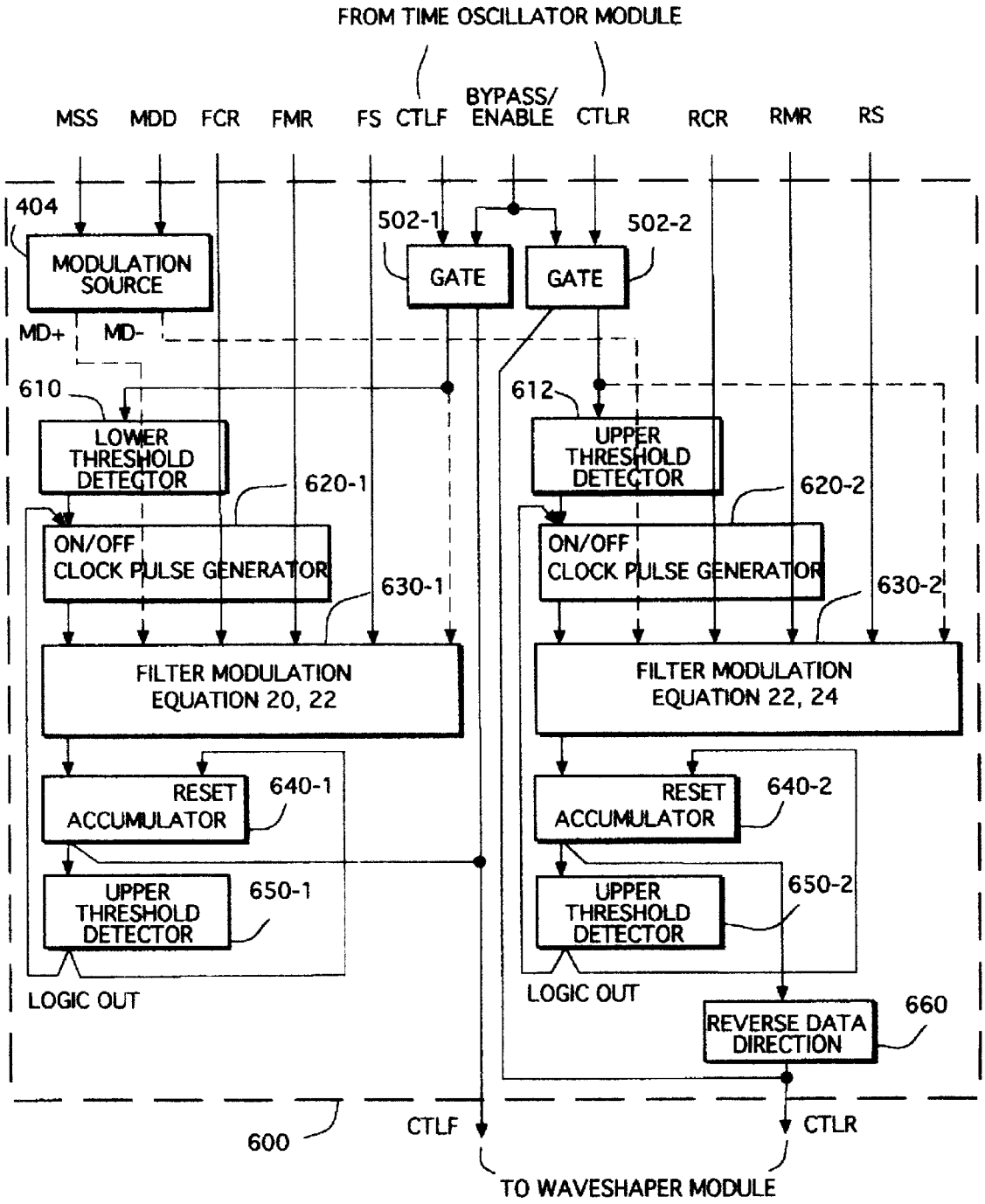
FIG. 17 is a generalized block diagram depicting a filter module, according to the present invention.

FIG. 17 shows a generalized block diagram of a filter based on Hill's equation. The programming arguments to flex filter module 600 are shown in FIG. 7. Hill's equation is a mathematical representation of observed properties of muscles. It is derived from a mechanical model containing elastic components and a viscous damping component. Representing the model mathematically, and solving for velocity yields a relation that specifies the velocity that a single muscle at full activation can move a given load. Hill's equation is shown as Equation 41 in Table 1. It is used here to represent the velocity of a muscle moving a load near its limit of strength, as when playing a musical instrument. As load increases linearly, velocity decreases nonlinearly. This effect is counterintuitive. It is a common misconception, for example, that muscular force increases linearly as a rubber band is stretched, and that the elastic resistance of the rubber band approaches infinity. In fact, elastic force is linear with displacement. It is the perception of muscle strength by the user that is non-linear. This non-linear perceptual quality is represented in Hill's equation.

In the flex filter module 600, a function derived from Hill's equation is integrated in real time. The output of the integration is gesture position or distance versus time. This is embodied in the Hill's equation function 230 of FIG. 2. This module also has a separate forward and reverse direction representing the cyclic action of muscle systems as embodied in cyclic oppositional forces function 240.

Referring to FIG. 17, forward and reverse control data CTLF and CTLR are input from the time oscillator module 500 to gates 502-1 and 502-2 of the flex filter module 600. A bypass/enable select input to the gates allows the user to bypass operation of the flex filter module 600, or input the control data to appropriate functions to enable its operation. If enable is selected, forward control data is input to lower threshold detector 610. Lower threshold detector 610 uses a logical comparison to test if control data it receives is greater than a lower threshold amount. When data exceeds a lower threshold amount, the lower threshold detector 610 sends a logical command to clock pulse generator 620-1. A logical "true" starts the clock pulse generator 620-1. Alternatively the upper threshold detector 610 may test for forward direction of data, by comparing subsequent data values. The clock pulse generators 620-1 and 620-2 represent calculations performed once every cycle of the operation of each side of the filter. It will be appreciated that a clock may be running in the background at all times, but that activation of the clock pulse generators in this representation indicates initiation of the filter routines controlled by each. Likewise, deactivation of the clock pulse generators represents stopping or pausing the filter routines.

The clock pulses from generator 620-1 are used to activate filter modulation function 630-1 such that every time a clock pulse is received, function 630-1 computes a solution for EQUATION 20 using the current input values. The calculation result is input to an accumulator 640-1, which sums successive values at clock pulse intervals. The function of the accumulator is to store previously accumulated values and add each incoming value each clock cycle, as is known in the art. The same function can be accomplished with a one cycle delay, a feedback loop and a summation of the delayed previous value and the incoming value. It will be appreciated that similar results may be obtained by multiplying previously stored values by an index calculated from incoming values rather rather than a summation.

EQUATION 20 is a parametric representation of Hill's equation in which control data and modulation data, representing increasing force activation, are treated as decreasing load. There are also terms for programming arguments.

Figure 23:
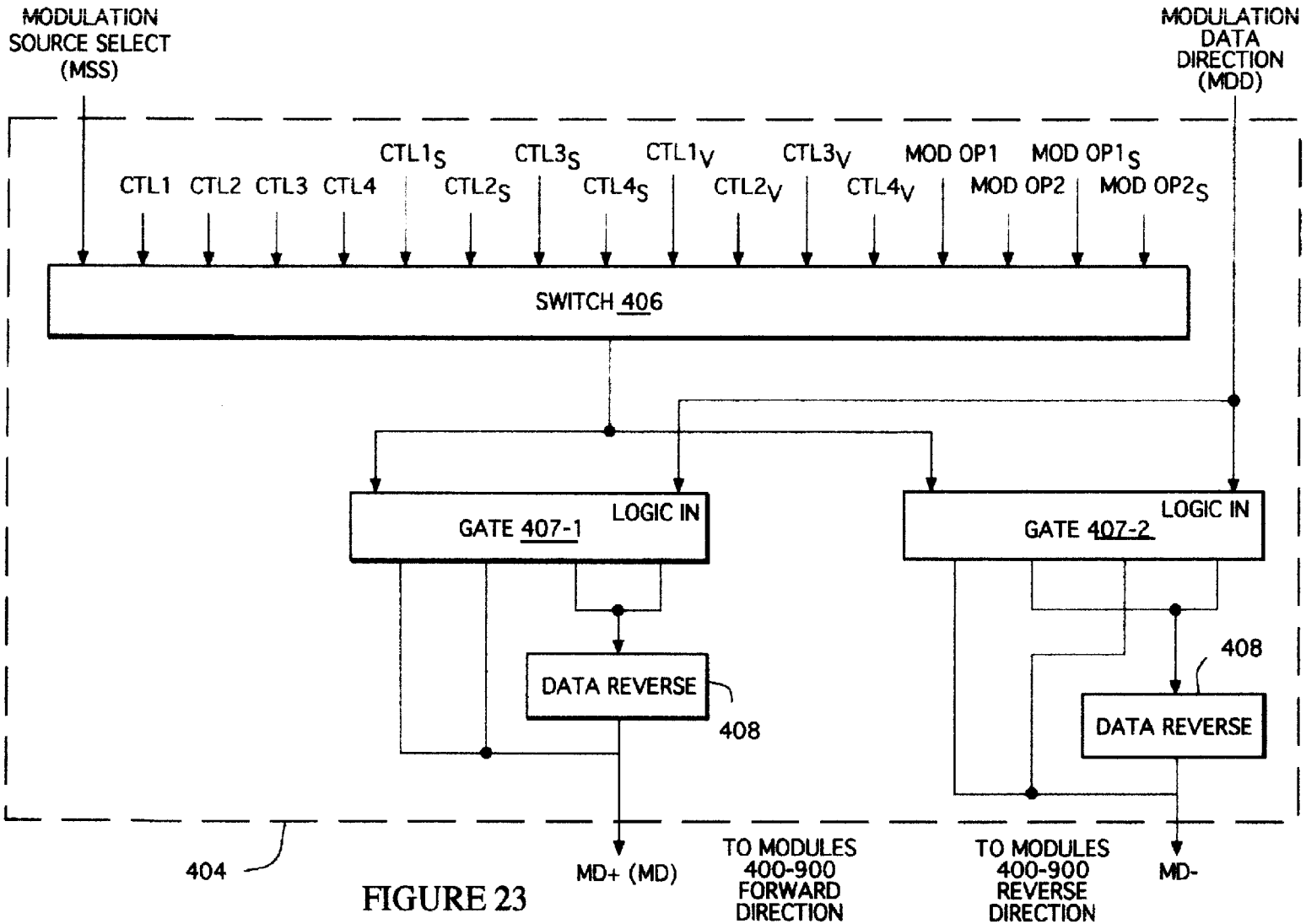
FIG. 23 is a generalized block diagram of a modulation source function, according to the present invention.

A modulation source is selected from a modulation source select menu provided to the user. A digital number MSS representing the selection is input to modulation source 404. A preferred data direction for each direction of deflection of the modulation operator is also selected from four possible mappings. These mappings are illustrated in FIG. 23 and discussed in greater detail in the Description of the Modulation Source Function. A digital number MDD representing the selection is input to modulation source 404.

Modulation data MD from the selected modulation source is input to filter modulation 630-1 along with forward control data CTLF. Programming arguments input to filter modulation 630-1 include forward controller rate FCR, forward modulator rate FMR and forward salience FS. The rate arguments scale the control and modulation data input to the filter modulation function 630-1 and thus control the rate at which data will accumulate in the accumulator 640-1. The salience controls the curvature of the characteristic hyperbolic function described by Hill's equation. This argument has an effect on the sound that is perceived, but is undefined in terms of standard qualities of sound perception. It also has an effect on the overall rate of accumulation. Data from the accumulator 640-1 is exported as CTLF from the left output to the waveshaper module 700.

Data summed in the accumulator 640-1 is also input to an upper threshold detector 650-1. When the upper increment amount of 127 is reached, a logical command is input to the clock pulse generator 620-1, stopping the clock, and thus the calculations of the filter modulation 630-1. A logical command is also sent to the accumulator 640-1 resetting its data to 0.

Alternatively, accumulator 640-1 may be reset by data from upper threshold detector 612 indicating that control data input to flex filter module 600 has started in the reverse direction. Or accumulator 640-1 may be reset by logic data from lower threshold detector 610 when control data once more returns to the starting position. In another embodiment, upper threshold detector 650-1 may detect when a certain amount of time has passed, or when velocity or acceleration of output data has reached a certain amount. Logic data from upper threshold detector 650-1 may also start clock pulse generator 620-2.

In the reverse direction control data CTLR is input to an upper threshold detector 612. The upper threshold detector 612 first reverses the control data by subtracting it from the maximum increment amount of 127. Detector 612 then uses a logical comparison to test if the result it receives is greater than a lower threshold amount. When the reversed data exceeds a lower threshold amount, the upper threshold detector 612 sends a logical command to clock pulse generator 620-2. A logical "true" activates the clock pulse generator 620-2. Alternatively, upper threshold detector 612 may test for reverse direction of motion of data, by comparing subsequent data values.

The clock pulse from generator 620-2 is used to activate filter modulation 630-2. Every time filter modulation 630-2 receives a clock pulse, it computes a solution to EQUATION 21 using the current input values. The calculation result is input to an accumulator 640-2, which sums successive values at clock pulse intervals, as above for the forward direction. The reverse direction data is exported as CTLR from the right output to the waveshaper module 700.

In the present embodiment, the same filter modulation equation is used for the positive and negative direction. However, the reverse direction has separate programming arguments, reverse controller rate RCR, reverse modulator rate RMR and reverse salience RS. These have the same function as above for the positive direction. However, separate arguments for the reverse direction allow the user to create a different gesture characteristic for the reverse direction. This may be used to synthesize characteristics of gestures operating against an elastic load in one direction and in tandem with an elastic load in the other direction, or to otherwise synthesize characteristics of gestures which are not bidirectionally symmetrical. In another embodiment only one filter modulation function may be used so that the forward and reverse directions have the same characteristic. This arrangement requires that the data direction and output both be inverted for the reverse direction.

Data summed in accumulator 640-2 is input to an upper threshold detector 650-2. When the upper increment amount of 127 is reached, a logical command is input from detector 650-2 to the clock pulse generator 620-2, stopping the clock pulse generation, and thus the filter data calculation by filter modulation 630-2. A logical command is also sent from upper threshold detector 650-2 to the accumulator 640-2 resetting its data to 0. Alternatively, accumulator 640-2 may be reset by data from lower threshold detector 610 indicating when control data input to flex filter module 600 has returned to a starting position. Or accumulator 640-2 may be reset by logic data from upper threshold detector 612 when control data direction once more starts in the reverse direction. Similarly to the forward direction, upper threshold detector 650-2 detects when a certain amount of time has passed, or when velocity or acceleration of data output reaches a certain amount. Logic data from upper threshold detector 650-2 may also restart clock pulse generator 620-2. Lastly, data from the accumulator 640-2 is sent to a data reverse formula 660, which simply reverses the direction of the data by subtracting it from the increment limit of 127.

Additional switching elements may be necessary to avoid overlapping data between left and right output data CTLF and CTLR. For example, when data from one side has not exceeded its output threshold, the clock may continue to generate data while the other side has already started, When the two sides are later combined, they will conflict. This may be avoided with gates controlled by the input threshold detectors 620 and 622 or by stopping clock generation of each side using logic data from the other side's threshold detector (i.e., logic data from lower threshold detector 610 stops clock pulse generator 620-2 and logic data from upper threshold detector 612 stops clock pulse generator 620-1). In another embodiment, both accumulators may be active constantly, while the output is switched using gates switched by either the input control data or the accumulator outputs.

It will be appreciated that an enhancement to the above embodiments may include a means of testing for zero rate of movement of the input control data. When control data stops, the clock pulse generator is turned off, stopping operation of the module. An additional enhancement might include a means of detecting a change of direction of input control data. When data changes direction, the previously activated clock pulse generator is turned off, while the clock pulse generator on the other side is turned on. In addition, a means of initializing the accumulator for the newly activated side may be provided so that the output of the module is the same as it was before the direction change. In the event one accumulator is used, a change of direction will cause the accumulator to begin subtracting values rather than adding. This may be accomplished with a simple change of sign in the modulation function equation.

It will be appreciated that other embodiments of filters based on Hill's equation may be possible. An exact version of this equation or one derived from it may be implemented without variable arguments. It will also be appreciated that equations based on a mass-spring representation of muscle activation may be used. A differential equation showing such a relation including terms for mass, viscosity, elasticity, and initial displacement, which may represent resistance due to friction is shown in Equation 40 in Table 1. Real time integration of this equation could be implemented as a second order filter. An approximation of this model can also be implemented using a second order polynomial for which rate and salience parameters similar to those above are defined. Such an equation may also include terms for velocity and/or acceleration of control input and/or module output. This implementation is embodied in the visco-elastic properties function 270.

Good results may also be obtained by using the output of one filter as input to another. It may also be usefull under some circumstances to provide a feedback path from the output of one filter to its input or to the input of a previous filter. Equations 22 and 23 show a Modulation Function for which FB represents a negative feedback term that causes the output to decelerate as it approaches the upper limit of 127. The constant in the denominator may be adjusted to change the function curvature. An additional parameter may be a multiplier in the numerator that may be adjusted to change the rate. And an additional parameter may be introduced to vary the amount of feedback. Finally, modulation by another operator, or by velocity and/or acceleration of input or [ouput] *output* data also produces usefull results.

In another embodiment, positive feedback from the output will cause regeneration or resonance, requiring only an initial input value to activate each side of the filter. The rate may then be modulated by another source, such as velocity, or may be dependent on the operator that activates the gesture, allowing the user to have a selection of operators, each activating the same gesture at a different rate.

It is also possible to implement a version of this filter including a simple integrator of controller data, with no feedback. However, this gives less natural sounding results. Simple integration represents only the first order effect of a viscous damping element in muscles. Better results are obtained by including a constant or constants representing elastic components and/or second order components representing inertial effects as described above.

Description of the Waveshaper Module

Figure 8:
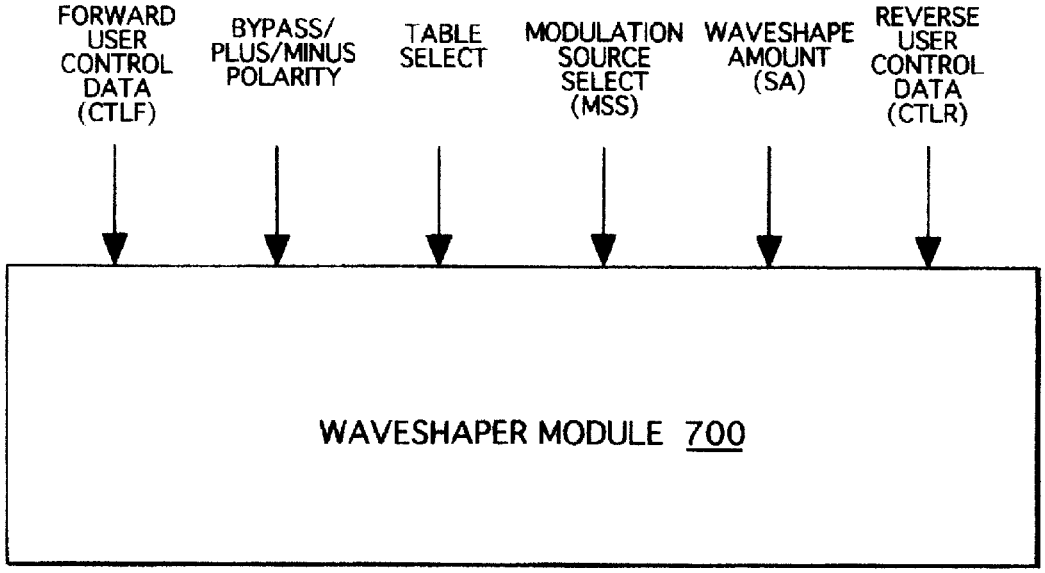
FIG. 8 is a diagram depicting programming arguments input to a waveshaper module, according to the present invention.
Figure 9:
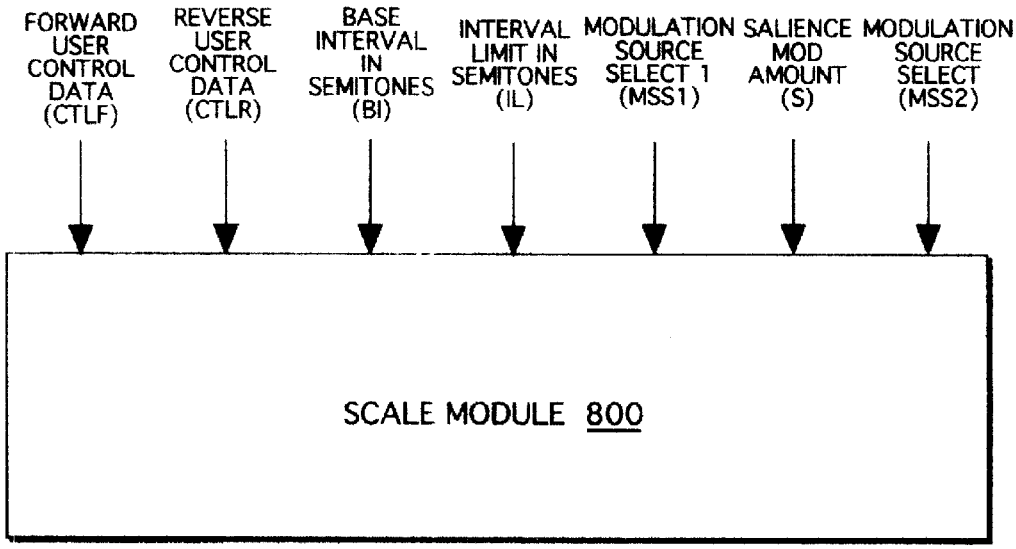
FIG. 9 is a diagram depicting programming arguments input to a scale module, according to the present invention.
Figure 18:
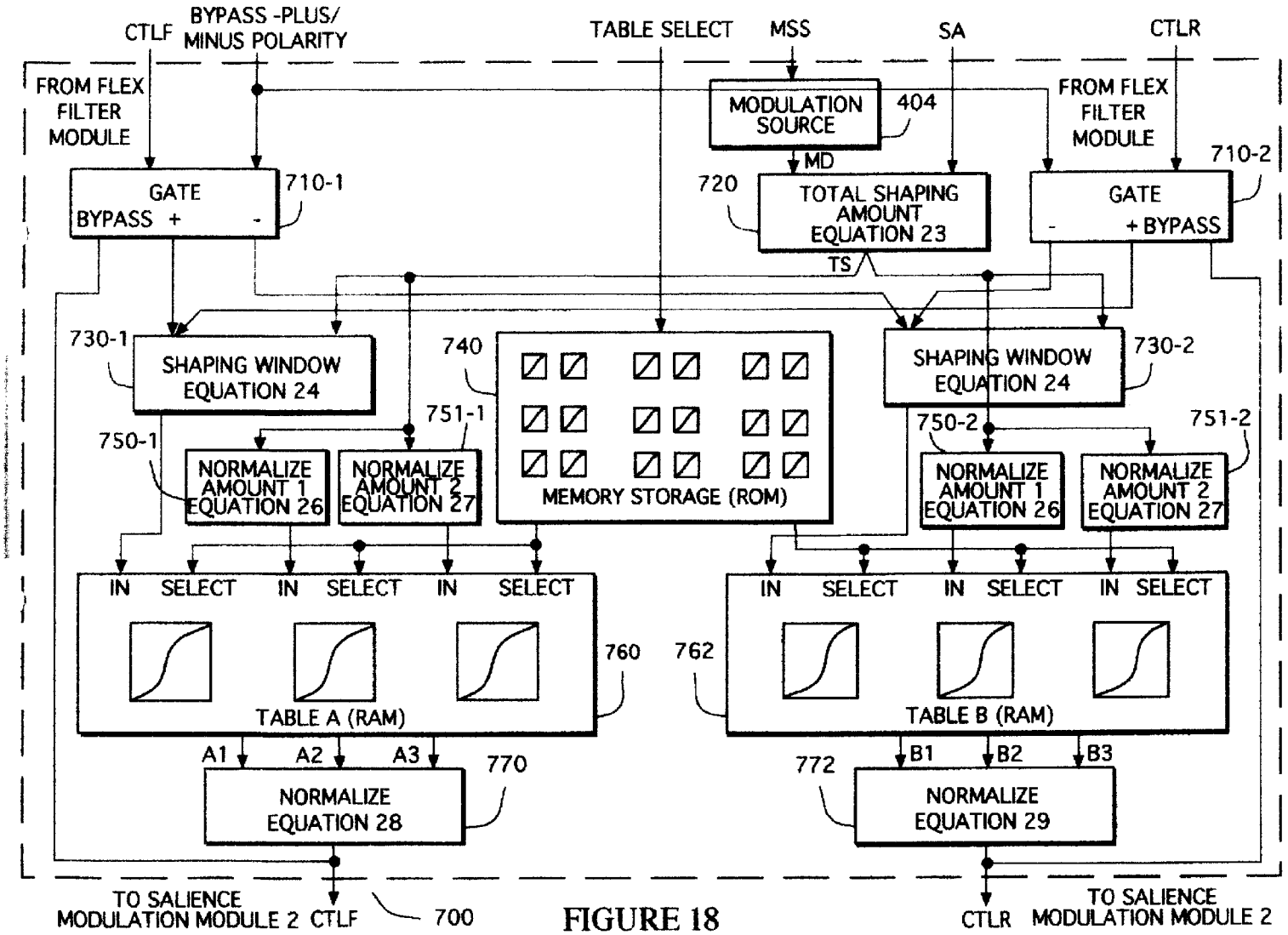
FIG. 18 is a generalized block diagram depicting a waveshaper module, according to the present invention.
Figure 19A:
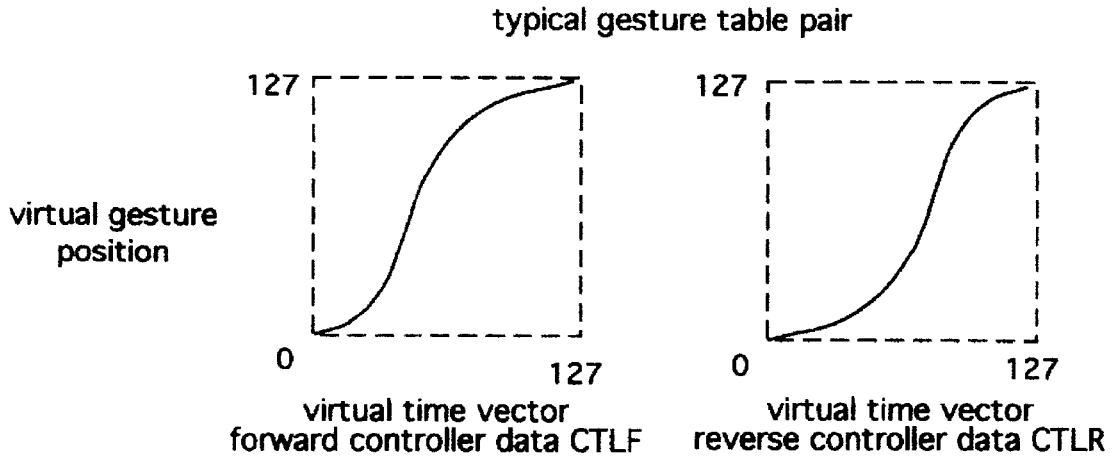
FIGS. 19A–C graphically depict typical gesture lookup table pairs used by a waveshaper module, and depict significant perceptual characteristics of gestures, according to the present invention.

FIG. 18 is a generalized block diagram of the waveshaping module 700, whose programming arguments are shown in FIG. 8. Module 700 preferably uses tables of values representing the position-time characteristics of musical gestures to modify control data or generate note data. Time is represented on one axis of each table, with amplitude or gesture distance on the other axis, or note numbers in the case of note data. The tables are arranged in pairs and preferably have 128 storage locations as shown in FIG. 19A.

User controller deflection is assumed to represent linear time, as has been determined by experimentation with prior art control operators. Therefore, input control data is represented on the horizontal time axis, and the value to be output as conversion data for each input number is represented on the vertical distance axis. The conversion data may also be represented as an array of 128 numbers, each successive nth number representing conversion data for the input control data number n. In another embodiment, data from a clock source with constant or variable period may be used as control data instead of position data from a user activated controller. Conversion tables may then have variable length corresponding to the time of the gesture represented by the table.

Figure 19B:
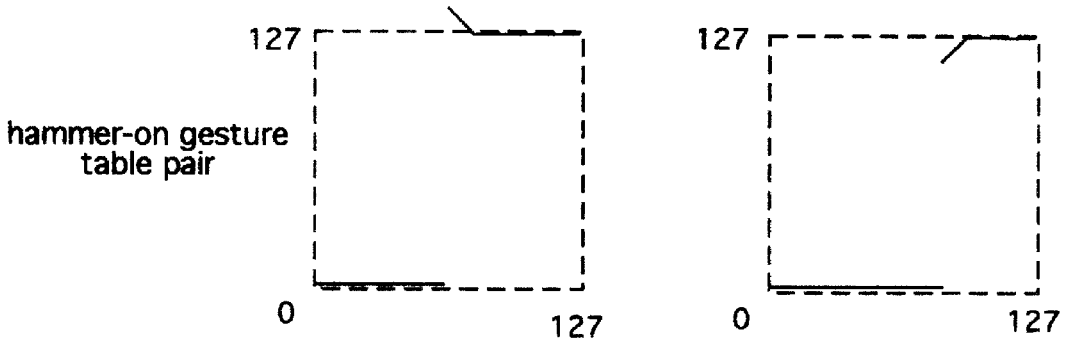
Figure 19C:
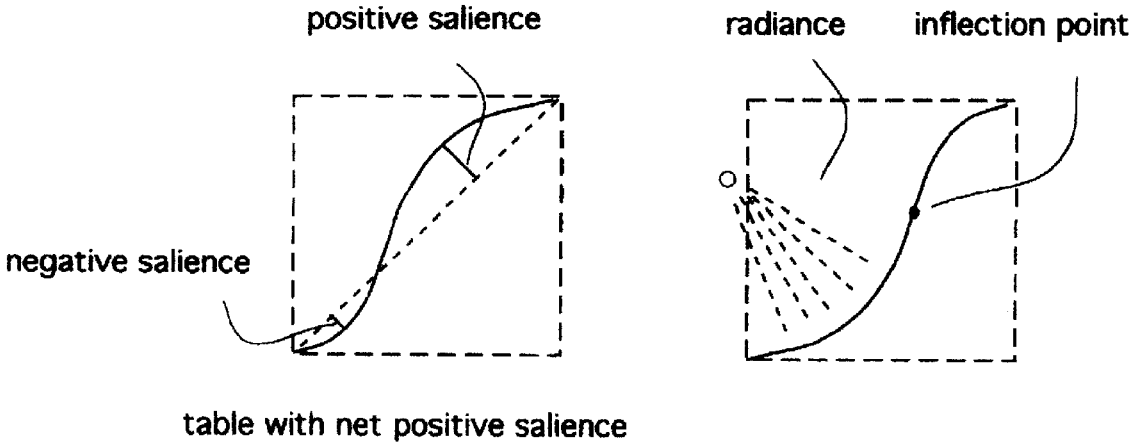

The table curvature may represent a gesture acceleration-deceleration characteristic that gives a desirable perceptual quality. Curvature may be specified in terms of existence and location of an inflection point, the amount of salience of various sections of the curve, and an additional characteristic referred to here as "radiance", as shown in FIG. 19C. Radiance may be understood as a measure of "roundness" and defined as the degree to which a curve or a section of a curve appears to rotate about a locus. There is no programming argument specified for radiance, but in another embodiment this might be a usefull parameter. Salience may be defined as the amount of deflection away from a diagonal joining the endpoints, or joining an endpoint and an inflection point. These tables may thus be represented as virtual trajectories, as embodied in the virtual trajectory function 260 shown in FIG. 2.

Gesture curves may be defined using a variety of methods. Most curves with desirable perceptual qualities may be determined with the above parameters of salience, radiance, and the existence and location of inflection points. In another embodiment, these parameters may be specified as programming arguments or modified directly by modulation data. Tables may be drawn using mathematical methods that describe curves, including non-real time gesture modeling. By contrast, many usefull gestures may be discovered experimentally by hand drawing. Complex gestures may be assembled from segments, and more than one gesture may be represented in one table. As such a gesture table may include one or more changes of direction and a return to a starting point. Some gesture table maps may be adapted from experimentally observed position-time characteristics of real musical gestures, such as the hammer-on pair shown in FIG. 19B. Others may be sampled directly from real instruments or MIDI controllers as position-time data, and scaled to fit the specified table dimensions.

The tables are preferably arranged in pairs, representing two sides of a wave-like cyclic phenomena involving a starting point, a change in direction, and a return to the starting point. In such a gesture pair the second gesture curve is usually an inverted and reversed image of the first, as shown in FIG. 19A. This reflects the hysteresis created by the changing roles of the muscle pairs used to create motion, as embodied in the cyclic oppositional forces function 240. Muscles have different visco-elastic response characteristics when contracting than when stretching. The acceleration-deceleration characteristic that creates the gesture curvature is thus distorted. When direction is reversed, the distortion is inverted.

Thus one of the table pair is specified for forward direction of motion, and one for reverse direction. It is not necessary that the pairs be exact inversions. When the load varies with position, one or both directions of motion will be distorted, and some table pairs may reflect this. However, this effect can also be simulated with other methods, including salience modulation using controller data as the salience modulation operator, and waveshaping as will be discussed presently, using the controller data as a modulation operator. Some table pairs may not require hysteresis at all, and could then contain identical curves. To implement a simpler embodiment it is also possible to dispense with one side of the overall synthesis model. Although not necessarily desirable, such an embodiment would require one table rather than pairs of tables.

Referring now to FIG. 18, the tables are preferably stored in ROM memory 740. In the present embodiment they are stored on a Macintosh hard disk. A pair of tables is preferably user-selected from a provided table select menu and written into RAM memory Table A 760, and Table B 762. Forward and reverse control data, CTLF and CTLR are input to gates 710-1 and 710-2 from flex filter module 600. A bypass/plus/minus polarity select menu allows the user to determine if the control data will bypass waveshaping module 700. If bypass is selected, the control data is exported to the salience module 2 400-2 as shown in FIG. 4. Otherwise the user determines whether control data is input to one or the other of the table pairs via the shaping windows 730-1 and 730-2. Conventionally, the tables for the forward direction have net positive salience as shown in FIG. 19C. Reversing the polarity of the input will send the forward controller data to the negative salience table and vice versa.

Figures 20A, 20B:
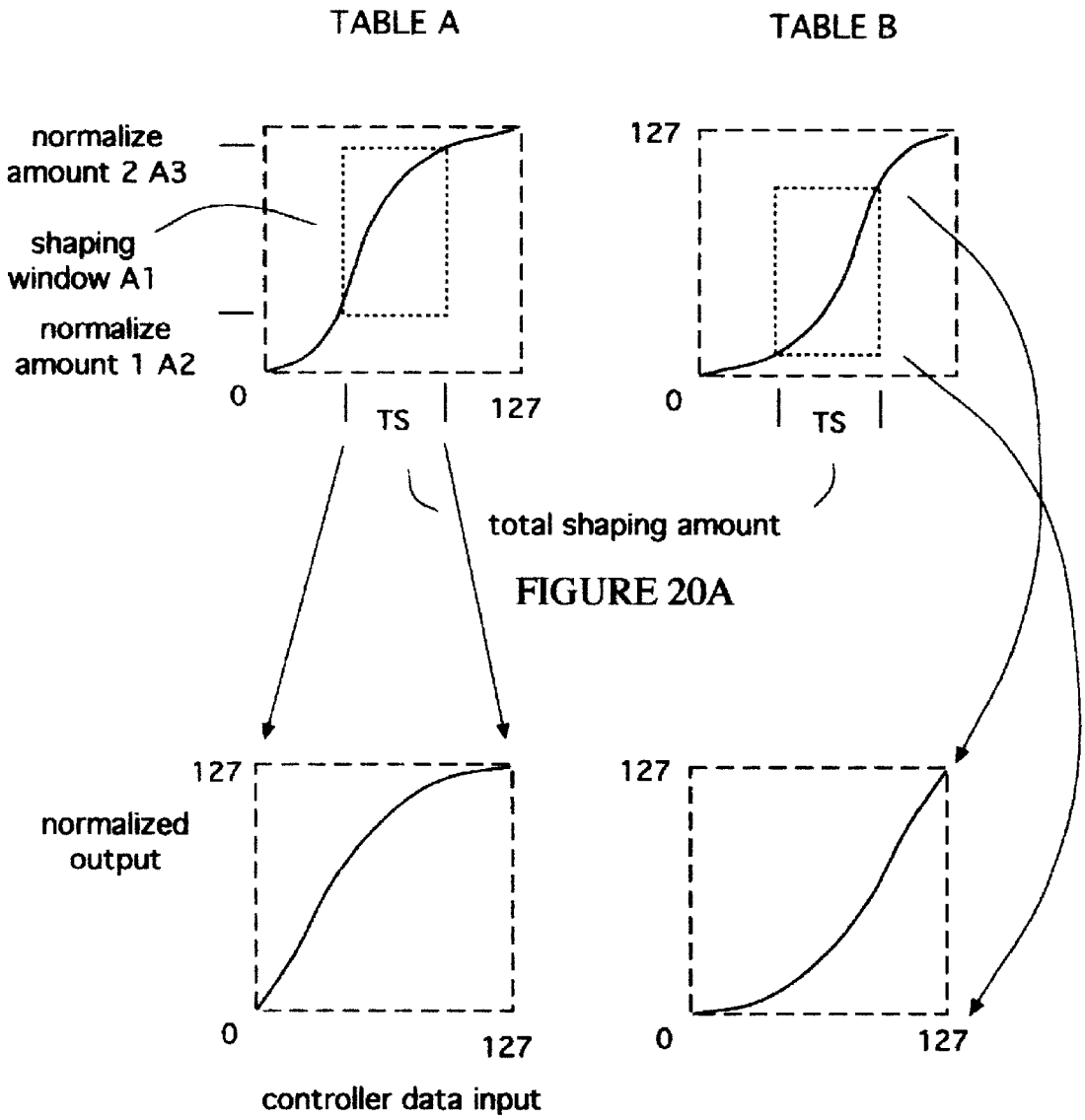
FIGS. 20A and 20B graphically depict the effect of a waveshaper shaping window on gesture lookup table data, according to the present invention.

As shown in FIG. 18, value SA representing constant amount of waveshaping is input to shaping amount 720. A modulation source is selected from a provided menu, which inputs a digital number MSS to the modulation source 404. Continuous modulation data MD from a modulation source 404 is input to total shaping amount 720 along with SA. Values representing shaping amount TS are determined by EQUATION 23 shown in TABLE 1, and are input to shaping windows 730-1 and 730-2 along with control data CTLF and CLTR respectively. Shaping windows 730-1 and 730-2 scale the controller data using EQUATION 24 to a range specified by TS. This range of values is centered within the total specified data range of 128 increments, as shown in FIG. 20A. If TS is 64, a range of 64 input values is defined from 32-96. That is, control data from 0–127 input to EQUATION 25 gives an output of 32-96. In another embodiment, the position of the shaping window may be determined by a position argument rather than being centered within the data range.

Referring again to FIG. 18, scaled control data is input to Table A 760 and Table B 762 which are presently stored in RAM. The total shaping amount to which the control data is scaled defines the dimensions of a shaping window within the Tables A and B, as shown in FIG. 20A. The output ranges of this window, A1 and B1 are used along with two other ranges of values A2 and B2 and A3 and B3 to normalize the output, as shown in FIG. 20B. To obtain values for A2 and B2, the total shaping amount TS is first input to normalize amounts 1 750-1 and 750-2, which uses EQUATION 26 to obtain normalized conversion values that are input to Table A and Table B. The results of this conversion are the normalize amounts A2 and B2. To obtain values for normalize amounts A3 and B3, the total shaping amount is first input to normalize amounts 2 751-1 and 751-2, which use EQUATION 27 to obtain conversion values which are then input to Table A and Table B. The results of these conversions are the normalize amounts A3 and B3. The three conversion values for each table, A1, A2, A3, and B1, B2, B3 are input to normalize 770 and 772, which use EQUATIONS 28 and 29 to output the normalize values as shown in FIG. 20B. The shaped and normalized control data is exported as CTLF and CTLR to the salience modulation module 2 400-2.

To accomplish the above two conversions, separate copies of Tables A and B may be made in RAM as shown in FIG. 18, or the conversion may be performed in sequence with the control data conversion using the same table memory locations. However, since the total shaping amount 720 and thus normalize amounts A2, B2, A3, and B3 are typically varied during performance, it may be faster to include three copies of the tables as shown. The result will be that when total shaping amount 720 is varied by the modulation data, a greater or lesser degree of shaping will result, depending on the size of the shaping window.

In another embodiment of the waveshaping module 700, the shaping window may be defined by specifying the height of the shaping window rather than the width. The position variable is also specified as a height. In still another embodiment, instead of a table width and position, a separate start point and end point are specified. Such an embodiment may be appropriate for use with multisegment tables activated by input from a time oscillator module 500, flex filter module 600 or delay module 900. In this case it may not be appropriate to normalize the output of the tables. However, modulation of start point and end point may still be desirable.

In still another embodiment, the control data may be input to two pairs of tables. One pair may contain only partial data representing irregularities encountered when performing gestures. For example, when performing glissando on a guitar a series of pitch bumps such as those shown in the hammer-on gesture pair in TABLE 19B result from crossing a series of frets. These discontinuities may be represented in separate tables and combined in varying amounts with the virtual trajectory tables to create added realism for some gestures. Other irregularities representing "grit", "blip" and "glottal" sounds may likewise be represented.

Finally, a module containing only a pair of tables with no shaping window or normalize equations may be particularly usefull when combined with other modules. Specifically, input from a hysteresis module 300 may be used for fast gestures such as vibrato. Because vibrato happens quickly, subtle variations to the tables are not as noticeable as for slow gestures, However, the variation in shape resulting from the change of direction happens within a perceivable timing window. Therefore a hysteresis switch with a pair of tables reflecting muscle bifurcation, like those shown in FIG. 19A produce a usefull vibrato effect, Vibrato may be enhanced by including similar volume and/or timbre variation, using gesture synthesis chains 280-7 and 280-8 shown in FIG. 3. As suggested above, usefull results are also obtained using multisegment tables with input from time oscillator module 500, flex filter module 600, or delay module 900,.

Description of the Scale Module

Figure 10:
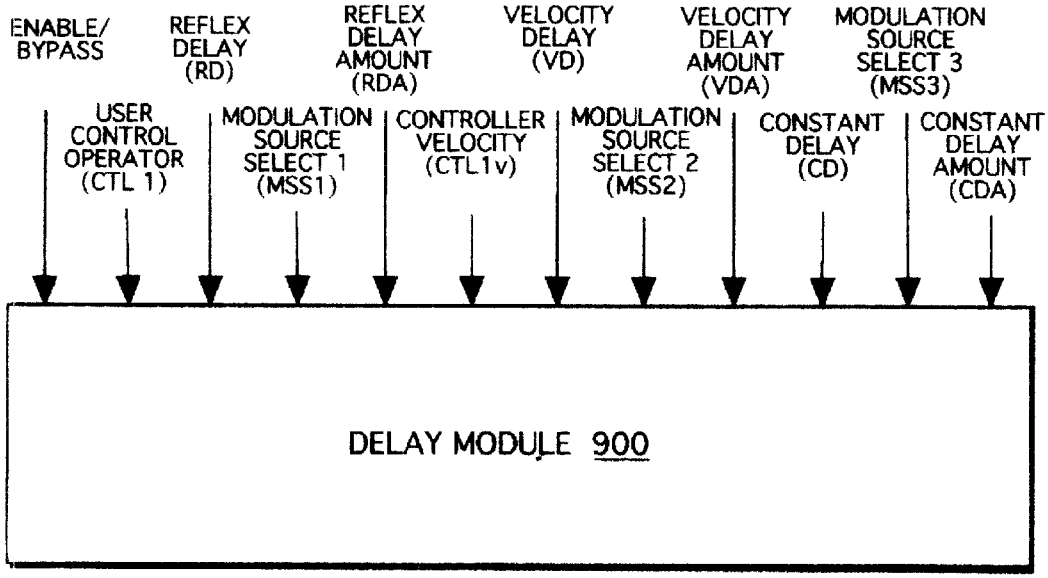
FIG. 10 is a diagram depicting programming arguments input to a delay module, according to the present invention.
Figure 21:
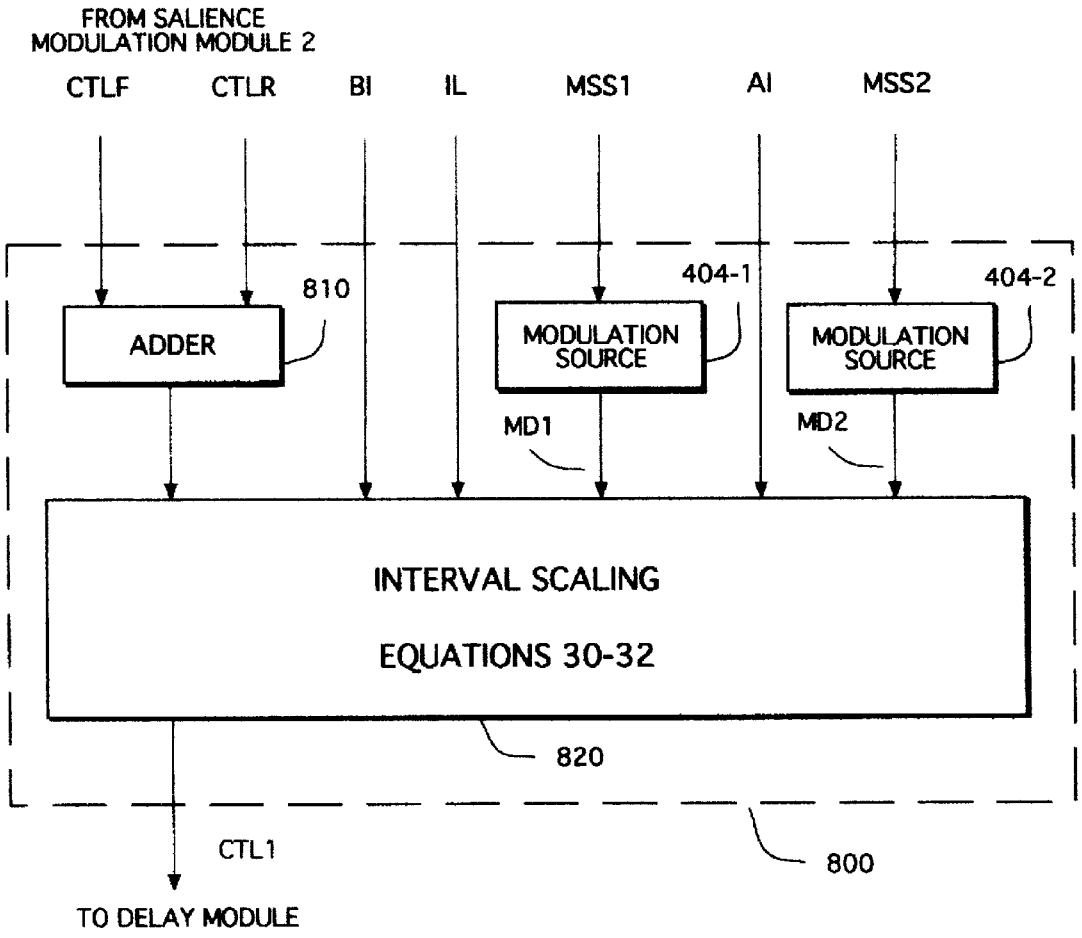
FIG. 21 is a generalized block diagram of a scaler module, according to the present invention.

FIG. 21 is a generalized block diagram of the scale module 800, the programming arguments for which are shown in FIG. 10. Module 800 scales the amplitude of inputted control data so that it traverses a specified musical interval or distance, which is the amplitude of the virtual trajectory of a gesture as embodied in the virtual trajectory function 260.

In the familiar "do-re-mi" scale, each syllable represents an interval or distance from the first note of the scale. Pitch bends, then, are usually performed to move from one note of a scale to an adjacent note, the movement being referred to as the distance of a pitch bend gesture. The physical distance displaced when bending a guitar string is nearly linearly proportional to the interval of the resultant pitch bend. If gestures are considered as waveforms, the physical distance is analogous to the peak gesture amplitude. In some references, however, the term "width" may be encountered in some prior art as denoting the interval resulting from displacement of a pitch bend device.

A shown in FIG. 21, forward and reverse control data, CTLF and CTLR input from the salience modulation module 2 are combined in adder 810. The resultant complete gesture waveform, CTL1, is input to interval scaling 820. Control data is scaled within a range determined by the Base Interval BI argument and the Interval Limit IL argument. The gesture interval is ordinarily determined by BI, but can be varied from BI to IL during or in between gestures using modulation data.

A modulation source is selected from a provided menu, and a corresponding digital number MSS1 representing the selection is input to modulation source 404-1. Continuous modulation data MD1 from modulation source 404-1 is input to interval scaling 820, and used to vary the gesture interval.

The gesture interval can also be modified during or in between gestures by adding an amount of modulation data to both BI and IL arguments. The maximum amount that can be added is determined by the Add Interval Amount AI argument which is specified in semitones, and input to interval scaling 820. The amount added is scaled from 0 to AI and is varied with modulation data.

A second modulation source is selected from a provided menu, with a corresponding digital number MSS2 representing the selection input to modulation source 404-2. Continuous modulation data MD2 is input to interval scaling 820 and used to vary the added interval amount.

One of three specified equations, EQUATIONS 30–32 for interval scaling can be used. The Interval Limit IL argument is not used in EQUATION 30. This simplifies the operation and saves processing power when no interval modulation is desired. In EQUATION 31, modulation of the interval from the Base Interval BI to the Interval Limit IL using MD1 will produces a linear modulation gesture. With EQUATION 32, modulation of the interval will produce an exponential S curve modulation gesture. This may be more natural sounding. The output of the interval scaling formulas CTL1 is exported to summer 830.

Another embodiment of the scale module 800 would be bifurcated like the previous modules. Such an embodiment would have a second side with similar sets of equations as described above with the addition of an offset parameter. The offset would be a constant interval amount specified for each side. It's purpose would be to create a sudden "leap" by the offset amount, primarily when the gesture switches to the second side. Such a leap simulates a sudden displacement of the hand before the return gesture, used in a number of instrumental techniques. Separate programming parameters for the second side would permit the return gesture to traverse the entire amount of displacement without a return leap.

A bifurcated scale module is embodied in the cyclic oppositional forces function 240. For the reverse side of the module to represent an inverted gesture, however, the scaling function must also be inverted. To accomplish this, the reverse side must start from an offset amount representing maximum displacement of the forward side, including displacement resulting from modulation. The reverse displacement must then be in the negative direction, from the offset to zero displacement, including modulation.

It will be appreciated that other scale equations are possible using the same or similar arguments to specify scaling amount. Using modulation data from gestures synthesis functions rather than directly from modulation operators may give more realistic gestures when scale is modified from the base interval to the interval limit. These methods would require considerably more processing power to implement. Alternatively, a scale modulation equation may be specified that scales data by a predetermined amount without programming arguments available to the user. Finally, a module for scaling the input to any of the other modules may have programming parameters for start and stop point, as described in the section describing the operation of the Scale Module.

Description of the Delay Module

Figure 22:
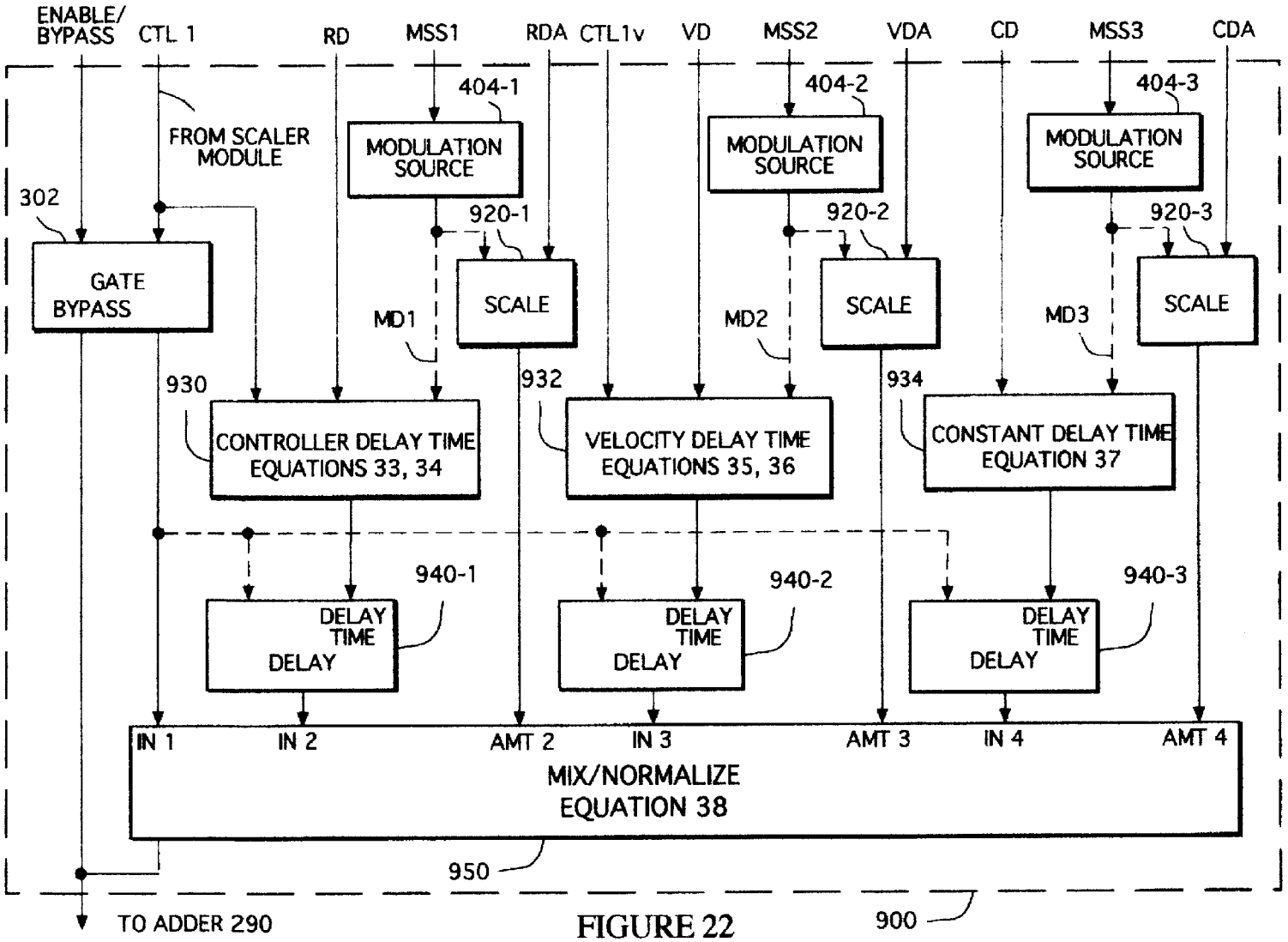
FIG. 22 is a generalized block diagram of a delay module, according to the present invention.

FIG. 22 is a generalized block diagram of the delay module 900. The programming arguments are shown in FIG.

10. Delay module 900 delays the control data by an amount of time determined by one of several delay arguments or combinations of these arguments or modulation data. Delay represents modification of the virtual time parameter as embodied in the virtual trajectory function 260. Variable delay represents reflected oppositional force encountered when performance gestures interact with real physical systems or with constraints of muscles themselves. Reflected force will act to delay the motion. Position dependent delay represents force due to an elastic load. Velocity dependent delay represents force due to the viscous damping element of muscle systems. This is embodied in the visco-elastic properties function 270. Constant delay represents force due to friction, and acceleration dependent delay represents force due to inertia.

Referring to FIG. 22, control data CTL1 is input to gate 302, which determines if data bypasses the module functions, or if the module functions are enabled. If enable is selected, the control data is input to three variable delay lines, 940-1, 940-2, and 940-3. More delay lines can be used, or as few as one, and series-parallel delay combinations may also be used. Series configurations may also be simulated by summing arguments to obtain a total amount of delay time for one delay line, and this is specified in the present embodiment.

The outputs of the delay lines are input to mix/normalize 950, along with data from CTL1. Mix/normalize 950 combines variable amounts of data from all four sources and also normalizes the output to stay within the specified increment range of 0–127.

The amount of the delayed data from each delay line which is mixed and normalized is determined by the delay amount arguments, Reflex Delay Amount RDA, Velocity Delay Amount VDA, and Constant Delay Amount CDA and varied with modulation data. Three modulation sources are selected from provided menus. Digital numbers MSS1, MSS2, and MSS3 representing the selections are input to modulation sources 404-1, 404-2, and 404-3. Continuous control data from these sources MD1, MD2, and MD3 are input to scale 920-1, 920-2, and 920-3 along with the amount arguments RDA, VDA, and CDA. Data representing scaled amounts are sent from scale 920-1, 920-2, and 920-3 to mix/normalize 950. This data determines the relative amplitude of each delayed signal using EQUATION 38.

The delay time for each module may be constant or may be varied continuously, and is determined by controller delay time 930, velocity delay time 932, and constant delay time 934. The delay time for the first delay line is a function of the control data. The control data is sent to controller delay time 930 along with a multiplier reflex delay RD and modulation data MD1. As the control data increases, the delay time increases by a factor determined by the RD and MD1.

One of two equations may be used to compute the delay time. With EQUATION 33, delay is determined by the control data times a factor determined by adding the constant RD and the variable MD1. EQUATION 34 represents two delay lines in series. It computes the total delay time as the control data times the constant RD, plus the data from MD1. In this case, the total delay time is the same as if the data went through two delay lines, one with delay time determined by the control data, and one with delay time determined by MD1. A number representing delay time input to delay line 940-1.

The delay time for the second delay line is a function of the velocity of the control data. The control velocity data CTL1v is input to velocity delay time 932 along with multiplier that determines velocity delay time VD and modulation data MD2. One of two equations may be used to compute the delay time as above. EQUATIONS 35 and 36 are the same as above except that control velocity is used instead of control data. Thus EQUATION 36 also simulates two delay lines in series by adding amounts from the velocity data, and the modulation data. A number representing delay time is then input to delay line 940-2.

The delay time for the third delay line is determined by a constant amount and varied by modulation data. A number representing constant delay CD is input to constant delay time 934 along with modulation data MD3. EQUATION 37 simply adds the two numbers to obtain a number representing delay time. This number is input to delay line 940-3.

The outputs of the three delay lines are input mix/normalize 950. The delayed values are mixed with the control data in accordance with the amount values from the scales 920-1, 920-2 and 920-3 and the output is normalized by EQUATION 36 to the specified increment range. Other equations may also be specified to mix and normalize the delayed values. The result from mix/normalize 950 is exported as CTL1 to adder 290 and as CTL1s to modulation source 404.

It will be appreciated that an alternative embodiment of the delay module 900 would be bifurcated like the previous modules. Such an embodiment would have a second side with delay modulation similar to the above description. This would permit programming separate delay characteristics for the return gesture.

The above delay time equations are given as examples of various combinations of arguments that give usefull amounts of variable delay time. It will be appreciated that other equations and combinations of these arguments are possible which may also give usefull results. Neither is it necessary that three modulation operators be used, nor that they be arranged as shown. In practice, only one argument may be varied at a time, or several be varied by the same operator.

Description of the Modulation Source Select

The modulation source 404 provides a selection of modulation operator data to the gesture synthesis modules 400–900. Referring to FIG. 23, data from sixteen sources, referred to as modulation sources, is input to switch 406. In other embodiments, more or less modulation sources may be specified. A modulation source is selected for use from a modulation source select menu. The menu sends a corresponding number MSS to switch 406. Switch 406 outputs data from the selected operator to gates 407-1 and 407-2. Thus the data can be routed to one of four outputs of gates 407-1 and 407-2. Two of the outputs of each of the gates 407-1 and 407-2, are preferably input to data reverse functions 408, which subtract the data from 127, thus reversing its direction. The data is exported as MD, or as MD+ and MD−, from the modulation source 404 to modules 400–900.

Modulation data exported from the modulation source function 404 may be specified as positive going, ranging from 0–127 or negative going, ranging from 127–0, corresponding to forward modulation operator deflection, and may be likewise specified as positive going or negative going corresponding to the reverse modulation operator deflection. Forward and reverse data direction corresponding to forward and reverse operator deflection is selected from a modulation data direction menu MDD. In the preferred embodiment, there are four possible mappings of data direction to operator deflection.

The data is preferably bifurcated so that the output of one gate is input to one side of a module, while the output of the other gate is input to the other side. This permits independent selection of modulation data direction for each direction of control data. This is desirable because although direction of deflection changes, so do the roles of muscles. One muscle may still modify the deflection activated by another, so that the effect of modulation of deflection in one direction is the same as in the other. Thus direction of modulation data should be the same in both directions. On the other hand, it may be desirable to reverse the effect of modulation to reflect some of the vagaries of traditional instrument construction and playing technique.

In the present embodiment, the only module in which this feature is shown as implemented is the flex filter module 600. In module 600, the filter modulation equation is the same for both sides. However, as shown by unit 660 in FIG. 17, the data output the reverse direction side is reversed. This is in contrast to other modules such as the time oscillator module 400. Here, the data reversal is accomplished by the amplitude modulation equation. The modulation data is also reversed in this equation, so that modulation has the same effect in the forward and reverse directions of control data and modulation data. However, this equation could be implemented the same way as the filter module. That is, the same equation could be used for the positive and negative amplitude modulation, with the data for the negative direction reversed at the output. In this case it would be desirable to also reverse the modulation data, or at least have the option to do so. Thus in FIG. 23, the data from gates 407-1 and 407-2 would be input separately to the amplitude equations. Modulation data direction could then be specified separately as for the filter module.

Description of Adder with Interpolation

Adder 290 in FIG. 3 may include an interpolation function. The interpolation function "crossfades" the output of one gesture synthesis chain into another under control of modulation data. Typically, both gesture synthesis chains will be activated by a single operator, which may also provide continuous modulation data for the interpolation.

FIG. 24 shows forward and reverse control data from each of four gesture synthesis chains. CTLF1 and CTLR1 from gesture synthesis chain 280-1 and CTLF2 and CTLR2 are input to interpolation function 290-1. An equation for the interpolation function is shown as Equation 39 in Table 1. The interpolation is controlled by modulation data MD1 from modulation source 404-1. When the value of MD1 is 0, only data from CTLF1 and CTLR1 is output. When the value of MD1 is 127, only data from CTLF2 and CTLR2 is output. In between the data from each of the synthesis chains is summed in amounts determined by the value of the modulation data.

Interpolation function 290-2 operates in the same way to interpolate data from gesture synthesis chains 280-3 and 280-4 using modulation data MD2 from modulation source 404-2. The outputs of interpolation functions 290-1 and 290-2 are then added in adder 292 and output as synthesized control data to the tone generator 60.

It will be appreciated that other interpolation functions are possible. In one embodiment, the outputs of two chains may be switched instantaneously when modulation data crosses a threshold. In another embodiment, the interpolation occurs gradually, but only after a certain threshold is crossed, or the interpolation may have a characteristic curvature.

Operation of the Hysteresis Module

Hysteresis module 300 is used in conjunction with at least one other module, since its sole purpose is to bifurcate control data. Thus in one embodiment its output may be coupled to salience modulation module 400-1 as shown in FIG. 4. In another embodiment hysteresis output may be coupled to waveshaper module 700, bypassing or omitting, for example, modules 400-1, 500, and 600 from the generic diagram shown in FIG. 4. Both of the above modules may have two signal paths, one for forward direction of control operator deflection, and for the reverse direction. Waveshaper module 700, for example, uses pairs of tables, each of which have opposite curvature as shown in FIGS. 19A–C. This reflects the hysteresis that occurs from the changing roles of the two muscles used to perform a gesture, as embodied in the cyclic oppositional forces function 240. A combination of the hysteresis module 300 and the waveshaper module 700 is usefull for creating vibrato effects. The salience modulation module 400 also varies the amount of curvature of two directions of gestures with a pair of transfer functions. These modify the curvature in opposite directions as shown in FIGS. 13B and 13E, thus accomplishing hysteresis. These two modules may be effectively used to synthesize gestures when salience is modified with modulation data.

In contrast to hysteresis module 300, hysteresis module 350 would customarily be use at the end of the gesture synthesis chain prior to scale module 800. Hysteresis module 300 would be removed in such an embodiment. The disadvantage of such an implementation is that when some gesture synthesis modules such as salience modulation 400 and waveshaper module 700 are implemented with hysteresis module 350, both sides of the modules are always active, requiring the greater processing power. For time module 500 and flex filter module 600, input switching is accomplished by the modules themselves, so that ordinarily hysteresis module 300 is not required. However time delays caused by the action of these modules may cause a discontinuity in the values of one side from the other. Placing hysteresis module 350 after the synthesis, insures that the switch will not be made until the data clears a specified threshold amount. Alternatively, these modules may themselves be outfitted with such switching circuitry.

Operation of the Salience Modulation Module

The salience modulation module 400 varies gesture curvature using a selection of variable transfer function pairs. These vary curvature in one direction or the opposite direction. The 20 effect of this modification is shown in FIGS. 13 A–F. Such bifurcated curvature modulation reflects the bifurcation of muscle systems and the hysteresis of cyclic gestures, as embodied in the cyclic oppositional forces function 240. Salience modulation is generally used in conjunction with at least other module, for example either before and/or after waveshaping module 700. The resultant effect varies the virtual time and/or virtual amplitude parameter of gestures as embodied in the virtual trajectory function 260 in FIG. 2. It is useful to note the similarity of the salience modulation curves of FIGS. 13B and 13E to the time envelope curves shown in FIG. 16 that are used to modulate clock period and amplitude in the time oscillator module 500. When salience modulation module 400 is used before and/or after waveshaping module 700 or flex filter module 600, it may be considered an envelope generator. The salience modulation curves modify the virtual time and/or amplitude parameters of virtual gestures in a manner similar to the envelopes in the time oscillator module 500.

The salience modulation module 400 may also be operated alone. If operated alone, polarity of the input may be reversed, or control data may be input to only one side of the module. On its own, this module is most effective when a modulation operator such as a pedal is used to continuously vary control data. More than the actual shape of the resulting gesture, the effect achieved is to impart the sense of gesture variation present in live music performance.

In another embodiment, the output of the salience modulation module 400 is coupled to the input of the time oscillator module 500. In this case modifying the salience of the of the control data imparts very fine nuances to the period modulation of module 500. Thus very elegant and beautiful pitch inflections may be accomplished of the sort typically performed by virtuoso musicians who have achieved masterful control over their muscles' internal force activation processes. Similarly, a salience modulation module 400 may be used before the flex filter module 600. This also gives an additional subtle dimension of control when the salience of the control data is modified with modulation data. The effect is similar in that control data will represent muscular force as it is applied to a system under load, as represented by Hill's equation. Subtle variations of control data are used to impart fine nuances of gesture such as may be accomplished by a musician who has mastered fine control of the amount of force exerted when performing an instrument.

The output of various modules may also be coupled to the salience modulation module 400. This is usefull to simulate the effect of increasing load on a gesture. In this case, positive salience modulation acts to shape the gesture as if it were compressed by increasing load in the forward direction, and negative salience acts to shape the gesture in the negative direction as might an elastically compressed force as it releases its tension.

Operation of the Time Oscillator Module

The time oscillator module 500 models the response of muscles to the internal electrical stimulus that activates muscle contractions. This is embodied in the muscle stimulus response function 250. The programming arguments are based on a representation of an oscillator operating in the time domain (as opposed to the frequency domain). In a tone synthesizer, audio oscillators use clocks cycling at audio frequencies to create periodic tones. Tone frequency and tone amplitude may be modulated using control envelopes. These envelopes are activated automatically along with the tone oscillator, usually in response to depression of a key on a piano keyboard. In the time oscillator module 500, cyclic data is created by summing clock pulses. Since the cyclic oppositional action of muscles is bifurcated, two clocks are required to complete one cycle, or one clock with a change of direction. This is similar to the way oscillation occurs in a natural environment, where the push-pull action of a driving force and a reflected one result in simple harmonic motion.

In the time oscillator module 500, the period of the clock pulses, and the amplitude of the summed pulses, are modified by control envelopes in a similar manner to the frequency and amplitude envelopes of tone oscillators. However in time oscillator module 500, the envelopes do not proceed automatically, but are generated with control data. The result is that additional control data is created automatically by a clock. Because this closely resembles the way real muscles are activated, the time module gives very realistic sounding gesture data by itself. Characteristics of the gestures generated are preprogrammed by setting the envelope arguments. These include a base amount of modulation, the envelope minimum, TEAMn for the forward direction and TERMn for the reverse direction. The envelope maximums TEAMx and TERMx correspond to the amplitude parameter of tone envelopes. The salience arguments, TEAS and TERS, correspond to the amount of curvature of the attack and release portions of tone envelopes. The period modulation envelope arguments are illustrated graphically in FIGS. 16A and 16B.

The amplitude envelope operates somewhat differently. There is a salience argument, AEAS and AERS as with the period modulation envelopes. However, since the amplitude always begins at 0 and ends at 127, there are no arguments for minimum and maximum. There is, however, a rate argument, AEAR and AERR that corresponds to the attack rate and release rate parameters of tone envelopes. There are also modulation amount arguments FAMA and RAMA, which correspond to the modulation amount parameter of digitally controlled amplifiers (DCA) in tone synthesizers. This argument specifies the amount of effect modulation data will have on the amplitude rate and salience.

Although the time oscillator module 500 can be effectively operated by itself, it may also be followed by a salience modulation module 400 or waveshaper module 700 for additional gesture modification. If the time oscillator module 500 is preceded by a salience modulation module 400, additional types of gestures may be affected. This is because additional subtlety and complexity may be added to the control data that generates the envelopes by modifying the salience of the control data. In a like manner, the waveshaper module 700 may precede the time oscillator module 500. This also allows for subtle shaping of the control data used to create the envelopes.

When the time oscillator module 500 precedes the waveshaper module 700, multisegment tables may be used to simulate a series of gestural effects such a trill run or lick. Such gestures are perceived as a single musical entity, although they may involve one or more stops and starts or changes of direction. This perceptual characteristic results because they have an overall time shape that may vary only little with the tempo of the music. Such a shape may be represented as a single gesture trajectory. A time oscillator module may effectively simulate such a trajectory, and is therefore ideal for simulating such effects when combined with tables representing the displacement characteristics of gesture combinations.

Finally the time oscillator module 500 may be followed by another time oscillator module 500, or by the flex filter module 600. The resulting gestures are curving and fluid, but this type of arrangement uses a lot of computer processing power. The time oscillator module 500 can bifurcate the control data itself, but preceding it with a hysteresis module 300 may be more efficient, since only one period modulation equation would be activated at once.

Operation of the Flex Filter Module

The flex filter module 600 performs a real time integration of Hill's force-velocity equation expressing the visco-elastic properties of muscles. It is implemented like a bifurcated digital filter. Its programming arguments are similar to those specified for filters used in tone synthesizers. Thus Forward Controller Rate FCR may be compared to the cutoff frequency of a tone filter, and the Forward Modulation Rate FMR, may be compared to the modulation of the filter cutoff for tone filters. The use of the term "rate" instead of "frequency" reflects the fact that flex filter module 600 acts in the time domain instead of the frequency domain. The Forward Salience FS may be compared to the resonance parameter of a tone filter. In practice, it has a similar effect of altering the quality of the sound in an unobvious but significant way, without altering its time properties. However, unlike the case for resonance, for which the effect on the Fourier series components of a periodic tone are well understood, there is no corresponding method of perceptual analysis for the effects of salience on perceptual qualities of time domain gestures. Nevertheless these effects are real. The lack of a well-developed science of the perceptual qualities of gestural nuances may be the very reason these methods of gesture synthesis have not been invented previously.

Like for the time oscillator module 500, when the flex filter module 600 precedes the waveshaper module 700, multisegment tables may be used to simulate a fused series of gestures. These will have a different overall time shape or trajectory than that produced by the time oscillator module 500. This arrangement may also be combined in parallel with another module or modules to add an an overall variation to the trajectory.

Flex filter module 600 may be operated alone, but for best results is preceded by a salience modulation module 400. The effect of this is qualitatively similar to the time oscillator module 500, but the types of gestures are somewhat different. In practice this arrangement creates gestures most like those of a practiced electric guitarist, or more accurately it makes such gestures possible to achieve. The flex filter module 600 may also be preceded or followed by a waveshaper module 700, or followed by a salience modulation module 400.

Operation of the Waveshaper Module

The waveshaper module 700 adds the characteristic curvature or acceleration-deceleration characteristic of gestures performed against strong elastic loads, Curvature is accomplished by converting control data with lookup table pairs. The degree to which this curvature is transferred to a gesture is controlled by defining a window near the center of the curve where there is typically the least amount of curvature. The window is then expanded to become the entire gesture, as shown in FIGS. 20A and 20B. As the size of the window is increased using modulation, more curvature is added until the entire table is used for the gesture. This is embodied in the virtual trajectory function 260 and also the cyclic oppositional forces function 240.

The waveshaper module 700 is usefull for creating fast gestures such as vibrato, since when gestures are performed quickly, there is little time for the subtlety of modulation that can be imparted more effectively with the time oscillator module 500 or the flex filter module 600. For this, simple lookup tables with no shape modulation may suffice. This requires little processing power, and so responds to the rapid back and forth motions required to execute real time vibrato. When combined with the hysteresis module 300, waveshaper module 700 creates the characteristic curvature with hysteresis these motions exhibit when performed on real instruments.

Hammer-on gestures, slurs, glissandos, and slides are also most easily created with the table lookup method. Tables for these gestures are created by emulating data sampled from real musical gestures, as was done for the hammer-on gesture shown in FIG. 19B. As discussed above, multi-gesture effects referred to as runs, licks, riffs and trills may be performed when the waveshaper module 700 is preceded by the flex filter module 600 or time oscillator module 500. For these it may be advantageous to use the embodiment discussed above with variable start and stop point.

The waveshaper module 700 is also usefull for creating effects such as strums, glissandos, or arpeggios for which Midi note data is used to trigger a succession of notes. Gesture time is represented on one axis, while Midi note numbers are represented on the [y] other. For these kinds of gestures, another module is generally required to provide input to the tables. In particular, a time module 500 provides appropriate time-position data which is then converted to note data by the tables. A flex filter module 600, or delay module 900 may also provide usefull time-position trajectories for note data.

To effect slow inflected bends, the shaping amount can advantageously be modified in real time using modulation data. In practice, user experimentation with shaping and other programming arguments will provide a sense of how gesture synthesis works, and how certain types of gestures and modification techniques performed on real instruments can be accomplished with the gesture synthesizer.

Operation of the Scale Module

Ordinarily there must be a scale module 800 at the end of the gesture synthesis chain to scale the gesture amplitude to the desired musical interval. Musical intervals are generally measured in semitones. Thus the programming arguments to the scale module 800 include a Base Interval BI in semitones, an Interval Limit IL in semitones, and an Ad Interval AI, also in semitones. Most pitch bend gestures are performed to traverse a distance of two semitones. However vibrato requires a fractional semitone amount, and so the arguments preferably must allow for fine adjustment to two decimals. Other gestures are performed to five or seven or twelve semitones. In addition, some gestures are performed to raise the pitch of a note, and some to lower the pitch. Thus the arguments may be set to positive or negative numbers, allowing for a bend up or a bend down.

The gesture amplitude is usually set as the Base Interval BI. The Interval Limit IL is used to allow amplitude modulation of the gesture as it is performed. This may be used so that interval of the gesture resulting from deflection of an operator can be changed in between gestures during a performance to accommodate requirements of the music. Or the modification can be performed during the gesture to create an additional gesture effect. Modification of the virtual amplitude of a planned gesture is embodied in the virtual trajectory function 260. This may be done with a modulation operator such as a pedal, e.g. pedal 54 in FIG. 2, or with controller velocity MO1v or CTL1v, or with data from a second controller operated simultaneously.

The Add Interval AI amount is used with a second modulation operator, such as velocity or a pedal. It adds a given amount to both the Base Interval BI and the Interval Limit IL. It will thus add an interval amount to any other gesture that is performed with another control operator. Its effect with velocity as modulator is to add slight variations to the amplitude of a performed gesture as might occur if it were performed with greater or lesser force. Its effect with a pedal may be to simulate the action of a guitarist's hand sliding up or down the fretboard of a guitar, while continuing to use the fingers to inflect notes. The effect of such a motion would be to raise the pitch of all the gestures by an amount of semitones equal to the number of frets crossed.

In another embodiment, a scale module 800 may be used at the beginning of the gesture synthesis chain to modify the virtual time parameter before input to the waveshaper module 700, or to flex filter module 600, for example. In this case, the Base Interval BI and/or Interval Limit IL would usually be set to at least twelve semitones. This is because twelve semitones would ordinarily indicate the total control data available in one direction. The interval scale equations are specified so that a setting of twelve semitones gives a maximum data output of 127. This insures that a full range of values is available for further gesture synthesis modules. The Add Interval AI argument can also be set to a negative amount. In this case, the virtual time values will be displaced forward in time, while modulation may compress or distort these values to effectively modify the action of subsequent modules. Alternatively, an input scale module might simply have parameters for start and stop point, indicating the range of values output in response to input control data. The start and stop points may also be modulatable.

As previously discussed, a bifurcated scale module may include parameters that allow for varying the reverse deflection characteristics separately from those of the forward deflection. Thus gestures of different amplitudes may be represented in the forward and reverse directions.

Operation of the Delay Module

The delay module 900 acts to delay control data by a variable amount and recombine it in variable amounts with direct control data. The effect of the delay module 900 is to modify the virtual time parameter of gestures in a manner that can be continuously controlled by the user. The effect of varying the amounts of delayed data is to also vary the amplitude of virtual gestures in a way that is somehow dependent on the time modification. This is embodied in the virtual trajectory function 260.

The effect of delay module 900 is similar to the time oscillator module 500, but where module 500 gives the user control over performance data as it is projected into the future by a clock, delay module 900 gives the user control over performance data that is projected into the past. In this way it mimics the force dependent viscous damping element of muscle systems. Velocity controlled delay represents viscous damping of the force exerted by the muscle itself. This is embodied in the [V] visco-elastic properties function 270. Position dependent reflex delay represents delay due to reflected force of a position varying load, such as a guitar string. Constant delay represents damping due to constant force such as friction. In another embodiment, acceleration dependent delay may represent delay from force due to inertia. The amounts of delay time due to these arguments may be modified in real time with modulation data, and/or the amount of delayed signal may also be modified.

The delay module 900 is used at the end of the gesture synthesis chain as shown in FIG. 4 and imparts an added subtle effect to any gesture generated by a previous module. Since its effect is to elongate gestures, care must be exercised in its use, or the effect is sloppy or too languid sounding. It may also be necessary to vary arguments of other modules such as envelope rates to account for the time lag. It may also be effective to use a time [oscilator] *oscillator* module 600 with little or no period modulation as a source of constant rate control data input to delay module 900. Gesture variation is then accomplished by using a control operator or other source of modulation data to vary delay time of the constant rate control data.

In the gesture synthesis chain of FIG. 4, the delay module 900 is shown after the scale module 800. However, it is also possible to use two delay modules, one for the forward direction of motion and one for the reverse, in order to impart different time modulation effects for each direction. Delay module 900 may also be used alone, giving a distinctly [recognizeable] *recognizable* effect encountered in some musical styles, noteably Country and Western. Delay module 900 may also precede the waveshaper module 700. In particular, realistic guitar slides may be thus synthesized using appropriate lookup tables.

A delay module may also be used at the beginning of the gesture synthesis module chain. This may give a different type of gesture variation. In another embodiment, data from each delay line 940 is input to a separate gesture synthesis chain 280, before being recombined in the mix/normalize function 950. Thus one operator may control up to four chains simultaneously. In this case, data from each synthesis chain may be used as modulation data in another. Since the data is ultimately combined to make one gesture, lookup tables in the waveshaper module 700 may represent gesture partials instead of complete gestures. A gesture partial may simulate an effect such as audible clicks that result from crossing frets when performing glissando on a guitar, or a glottal bump from a saxophonist's throat. These may be combined in varying amounts by varying the amount arguments with modulation data.

Summary and Conclusion

The present invention provides a gesture synthesizer for electronic musical instruments, which solves the well-known and much lamented problem of obtaining expressive musical control of electronic instruments. The physical construction is designed to be simple and comfortable to operate while electronic simulations perform difficult gestures. The simulations are very flexible and produce a wide range of realistic results. Since the parameters are specified and manipulated in the electronic domain, they are easily applied to the parameters of electronic sound production. The present invention may be implemented using relatively inexpensive, standardized parts, and can thus be produced cost-effectively.

Other means may be specified of mathematically modifying gesture parameters herein described as virtual time, virtual amplitude, and virtual shape or acceleration-deceleration characteristic. These parameters may also be specified as rate, musical interval, and inflection, where inflection is represented in terms of location of inflection point, amount of curvature or salience, and smoothness or roundness of curvature or "radiance".

The above description should not be construed as limiting the scope of the invention. Those skilled in the art will recognize many other forms in which the above described invention may be embodied. Another embodiment, possibly of greater advantage from a marketing standpoint, would be a black box style MIDI accessory containing electronic components, such as ROM and RAM memory and a dedicated processing unit necessary to store and execute the program described above. As such the present invention could be implemented on a single printed circuit board. A set of performance operators may be provided such as a joystick, and/or an array of levers, and one or more pedals and/or additional operators to be manipulated by the user's thumb. Such an embodiment might also contain a visual display for a menu-driven user interface and operators such as buttons and/or a slide control for entering programming parameters. Additionally a means of storing all the programming arguments for a single gesture synthesis chain, or indeed for all specified chains may be implemented. Such storage capability may include RAM with battery backup, EEPROM or disk storage. In such an embodiment, all specified programming arguments may be stored as a single "preset" and later recalled for a live performance. Storage for a number of presets may be provided, as may ROM storage of presets provided by the manufacturer and designed for general use.

Another embodiment would be a black box as described above, but without the menu driven user interface. In this case, a set of presets would be provided that could be selected with a button or buttons, but the presets could not be modified by the user. Still another embodiment would be the above black box with performance operators but with only one set of synthesized gestures hard-wired to the operators with no means of altering their parameters or selecting alternative gestures. Still another embodiment would be any of the three above-mentioned black boxes without the performance operators but with MIDI inputs provided that would accept data from external operators such as alternative MIDI controllers or conventional MIDI keyboards.

Another embodiment could be contained within an otherwise conventional MIDI or non-MIDI music keyboard or alternative controller, interfacing directly with the synthesis or control architecture of the host unit, and as such may or may not contain means of altering the gesture synthesis parameters. Still another embodiment might be contained on a disk or memory card or memory card, so that information representing the gesture synthesis architecture described above could be read into a host unit designed as an open-architecture music system, which is thus configured by data read from some such or other memory storage device. In a similar way, any or all of the above described implementations could be burned into a ROM memory chip for installation into a pre-existing music system, such that the ROM chip accesses the resources of the host system and interfaces with its performance operators and tone synthesis architecture to create gesture synthesis as described.

The gesture synthesis architecture could be embodied on a single printed circuit board or card such as a PCMCIA card for installation into a host computer system. Finally, a dedicated integrated circuit could be designed and manufactured containing all the necessary electronic components and codes to perform gesture synthesis as described, when interfaced with any performance operator or operators and any tone generating means. Such a printed circuit board, PCMCIA card, or integrated circuit could also contain an internal tone generating means requiring only a physical operator to activate it.

It will be appreciated that gesture synthesis is not limited to modification of data as set forth in the MIDI specification. Other data communications protocols representing musical parameters may likewise be modified. Non-musical data may also be modified.

Non-music applications for the gesture synthesis architecture described above might include computer graphics, games, and animation. A painting, drawing, or "sculpting" program could be implemented that synthesizes brush strokes or strokes from a pen or other drawing, painting, or sculpting tool, on a two dimensional surface or within a simulated three-dimensional space. In another embodiment, preset synthesized strokes or gestures could be specified for programs designed to facilitate writing on a computer screen in a particular alphabet or style which is pictographic, or based more on irregular curves than an alphabet composed of regular lines and circles. Other graphics applications might be used to author computer-driven animation of rendered objects, photographs, hand drawn figures or other images such that their movements appear natural and lifelike.

Likewise, natural lifelike motion could be simulated on motor controlled devices such as prosthetic limbs, or robotic appendages using this gesture synthesis model. Finally, although synthesized speech is well-specified in the prior art, natural human speech contains tonal information similar to that in music. This invention could be applied to alter certain tonal attributes, such as the fundamental frequency of synthesized words and phrases to impart a lifelike sense of emotion and meaning. Modifications and variations may be made to the disclosed embodiments without departing from the subject and spirit of the invention as defined by the following claims.

APPENDIX

TABLE 1

| No. | Equation | Function |
|---|---|---|
| 1 | S +MD − S*MD/127 | Total Salience; normalizes modulation data and constant Salience programming amount. |
| 2 | (651 − TS*4)*CTLF/(524 − 4*TS + CTLF) | Hyperbolic Positive Salience Transfer Function; uses convex hyperbolic curve with variable salience to modify control data in accordance with modulation data. |
| 3 | 260 − TS − (260 − TS)* exp((−.0079*(ln(260 − TS)) + .0079*ln(133 − TS))*CTLF) | Exponential Positive Salience Transfer Function; uses convex exponential curve with variable salience to modify control data in accordance with modulation data. |
| 4 | (sqrt((10835/TS − .184*TS − 63.5)$^2$ − CTLF$^2$ + 21670*CTLF/TS − .368*CTLF* TS + 127*CTLF) − 10835/TS + .184*TS + 63.5) | Radial Positive Salience Transfer Function; uses convex radial curve with variable salience to modify control data in accordance with modulation data. |
| 5 | (−524 + 4*TS)*CTLR/(CTLR − 651 + 4*TS) | Hyperbolic Negative Salience Transfer Function; uses concave hyperbolic curve to modify control data in accordance with modulation data. |
| 6 | 127*(exp(CTLR/(158 − TS)) − 1)/(exp(127/(158 − TS)) − 1) | Exponential Negative Salience Transfer Function; uses concave exponential transfer function with variable salience to modify control data in accordance with modulation data. |
| 7 | 10835/TS − .184*TS + 63.5 − sqrt((10835/TS − .184*TS − 63.5)$^2$ − CTLR$^3$ − 21669*CTLR/TS + .368* CTLR*TS + 127*CTLR − 46.8*TS + 2752007/TS) | Radial Negative Salience Transfer Function; uses concave radial transfer function with variable salience to modify control data in accordance with modulation data. |
| 8 | (254*TEAS*TEAMx − TEAS*TEAMx*CTLF − TEAS*TEAMx*MD + 254*TEAMn*CTLF + TEAMn*TEAS*MD)/((CTLF + MD + TEAS)*254) | Time Envelope Attack; modulates clock period in accordance with forward control data, modulation data, and three programming arguments that are envelope parameters Maximum, Minimum, and Salience. |
| 9 | (TEAMx)/(CTLF + MD + TEAS) + TEAMn | Time Envelope Attack; modulates clock period in accordance with forward control data, modulation data, and three programming arguments that are envelope paramenters Maximum, Minimum, and Salience. |

TABLE 1-continued

| No. | Equation | Function |
|---|---|---|
| 10 | (TEAMx + 254 − CTLF − MD)/(TEAS + CTLF + MD) + TEAMn | Time Envelope Attack; modulates clock period in accordance with forward control data, modulation data, and three programming arguments that are envelope paramenters Maximum, Minimum, and Salience. |
| 11 | (CTR*AEAR*4)/(128 − .001*FAMA*MD + CTR + AEAS) | Amplitude Envelope Attack; modulates amplitude of summed clock pulses in accordance with modulation data, a programming argument Modulation Amount, and two programming arguments. that are envelope parameters, Rate and Salience. |
| 12 | (CTR*AEAR*CTLF)/(128 − .003*FAMA*MD + CTR + AEAS) | Amplitude Envelope Attack; modulates amplitude of summed clock pulses in accordance with forward control data, modulation data, a programming argument Modulation Amount, and two programming arguments that are envelope parameters, Rate and Salience. |
| 13 | (CTR*AEAR*AEAS*10/(128* AEAS + 500 + CTR*AEAS) | Amplitude Envelope Attack; modulates amplitude of summed clock pulses in accordance with forward control data, and programming arguments, Rate and Salience. |
| 14 | (−TERS*TERMx*CTLR − TERS*TERMx*MD − 64516* TERMn + 254*TERMn* CTLR + 254*TERMn*MD − 254*TERMn*TERS + TERMn*TERS*CTLR + TERMn*TERS*MD)/(254* (−254 + CTLR + MD −TERS)) | Time Envelope Release; modulates clock period in accordance with reverse control data, modulation data, and three programming arguments that are envelope parameters Maximum, Minimum, and Salience. |
| 15 | (TERMx)/(254 − MD − CTLR + TERS) + TERMn | Time Envelope Release; modulates clock period in accordance with reverse control data, modulation data, and three programming arguments that are envelope parameters Maximum, Minimum, and Salience. |
| 16 | (TERMx + CTLR + MD)/ (TERS + 254 − CTLR − MD) + TERMn | Time Envelope Release; modulates clock period in accordance with reverse control data, modulation data, and three programming arguments that are envelope parameters Maximum, Minimum, and Salience. |
| 17 | 129 − ((CTR*AERR*4)/ (.001*RAMA*MD + (127 − CTR) + AERS)) | Amplitude Envelope Release; modulates amplitude of summed clock pulses in accordance with modulation data, a programming argument Modulation Amount, and two programming arguments that are envelope parameters, Rate and Salience. |
| 18 | 128 − (CTR*AERR*(127 − CTLF))/(89.9 + .003*FAMA*MD + (127 − CTR) + AERS) | Amplitude Envelope Release; modulates amplitude of summed clock pulses in accordance with reverse control data, modulation data, a programming argument Modulation Amount, and two programming arguments that are envelope parameters, Rate and Salience. |

TABLE 1-continued

| No. | Equation | Function |
|---|---|---|
| 19 | 127 − (CTR*AEAR*AEAS*10)/ (128*AEAS + 500 + CTR*AEAS) | Amplitude Envelope Release; modulates amplitude of summed clock pulses in accordance with reverse control data, and programming arguments, Rate and Salience. |
| 20 | 100*(FCR*CTLF + FMR*MD+)/ (127*(FCR*FS + FMR*FS) − FS*(FCR*CTLF + FMR*MD) + FS*1000) | Forward Filter Modulation; Hill's equation in which forward control data and modulation data are treated as decreasing load. Has programming arguments Control Rate, Modulation Rate and Salience. |
| 21 | (RCR*(127 − CTLR) + RMR*MD)*100/ (127*(RCR*RS + RMR*RS) − RS*(RCR*(127 − CTLR) + RMR*MD) + 1000*RS | Reverse Filter Modulation; Hill's equation in which reverse control data and modulation data are treated as decreasing load. Has programming arguments Control Rate, Modulation Rate and Salience. |
| 22 | (127*CTLF − CTLF*FB)/ (8*(168 − CTLF)) | Forward Filter Modulation; includes negative feedback term, FB. |
| 23 | (127 − CTLR)*(127 − FB)/(8*(41 + CTLR) | Reverse Filter Modulation includes negative feedback term, FB. |
| 24 | CTLF*TS/127 + (127 − TS)/2 | Shaping Window; scales and offsets control data in accordance with Total Shaping parameter. |
| 25 | SA + (127 − SA)*MD/127 | Total Shaping; normalizes modulation data and constant Shaping Amount programming argument. |
| 26 | (27 − TS)/2 | Normalize Amount 1; the conversion characteristic of this amount is the lower endpoint of the shaping window, to be used to normalize converted data. |
| 27 | (127 + TS)/2 | Normalize Amount 2; the conversion characteristic of this amount is the upper endpoint of the shaping window, to be used to normalize converted data. |
| 28 | (A1 − A2)*127/(A3 − A2) | Normalize; normalizes converted data from forward shaping window. |
| 29 | (B1 − B2)*127/(B3 − B2) | Normalize; normalizes converted data from reverse shaping window. |
| 30 | (CTL1*83*BI + MD2*83*AI)/1000 | Interval Scaling; scales control data in accordance with Base Interval programming argument, and adds an amount determined by Add Interval argument in accordance with modulation data. |
| 31 | (66*CTL1*(MD1*IL − MD1*BI − 128*BI) + MD2*8300*AI)/100000 | Interval Scaling; scales control data in between Base Interval and Interval Limit programming arguments in accordance with modulation data, and adds an amount determined by Add Interval argument in acordance with additional modulation data. |

TABLE 1-continued

| No. | Equation | Function |
|---|---|---|
| 32 | .083*CTL1*(IL*(.06*exp(.056*MD1)) + BI − .06*IL)/(.06*exp(.056*MD1) + MD2*.083*AI | Interval Scaling; scales control data in between Base Interval and Interval Limit programming arguments in accordance with modulation data, and adds an amount determined by Add Interval argument in accordance with additional modulation data. |
| 33 | CTL1*(RD + MD1)/127 | Controller Delay Time; determines time delay of control data in accordance with control data, modulation data, and Reflex Delay programming argument. |
| 34 | (CTL1 + MD1)*RD | Controller Delay Time; determines time delay of control data in accordance with control data, modulation data, and Reflex Delay programming argument. |
| 35 | CTL1v*(VD + MD2) | Velocity Delay Time, determines time delay of control data in accordance with velocity data, modulation data, and Velocity Delay programming argument. |
| 36 | (CTL1v + MD2)*VD | Velocity Delay Time, determines time delay of control data in accordance with velocity data, modulation data, and Velocity Delay programming argument. |
| 37 | (CD + MD3) | Constant Delay, determines time delay of control data in accordance with modulation data and Constant Delay programming argument. |
| 38 | (IN 1 + IN 2*MAT 2 + IN 3*AMT 3 + IN 4*AMT 4)/(1 + AMT 2 + AMT 3 + AMT 4) | Mix/Normalize; mixes control data with delayed control data in accordance with Amount argument and normalizes output. |
| 39 | ((127 + MD1)*(CTLF1 + CTLR1) + MD1*(CTLF2 + CTLR2))/127 | Interpolation equation; crossfades inputs from two gesture synthesis chains under control of modulation data. |
| 40 | $F(t) = M(t)*d^2x(t)/dt^2 + b(t)*dx(t)/dt + k(t)*(x(t) - x_0(t))$ | Mass-Spring differential equation; gives a function for force development over time, in terms of resistance due to mass (times acceleration), viscosity (times velocity), stiffness or elasticity (times displacement), and an initial displacement possibly due to friction. |
| 41 | $V = (T_0 - T)*a/(b + T)$ | Hill's equation; giving velocity of shortening of a muscle in terms of the tension developed by the muscle T, the maximum tension the muscle can develop $T_0$, and two constants a and b representing properties that may be modeled as combinations of elastic and viscous elements. |

What is claimed is:

1. A gesture synthesizer (GS) for use with an electronic sound synthesizer (ESS), which electronic music synthesizer provides at least a tone signal responsive to an ESS user-input device that permits user selection of discrete pitches, said gesture synthesizer coupleable to at least a first GS user-input control device, said gesture synthesizer comprising:

first detection means, coupled to said first GS user-input control device, for generating control data representing user-operation of said first GS user-input control device;

at least a first gesture synthesis means, coupled to said first detection means, for synthesizing a desired transfer function simulating muscle action, said transfer function represented by at least one model selected from a group consisting of (i) a model implementing Hill's equation, (ii) a model representing cyclic opposing effects of two force sources representing cyclic opposition action of a muscular system, (iii) a model representing muscular stimulus response to internal electrical impulses, (iv) a model representing visco-elastic properties of muscle pairs and elasticity of simulated loads[, and (v) a model altering virtual trajectory of gesture created with said gesture synthesizer];

said first gesture synthesis means outputting synthesized control data responsive to said control data such that said tone signal provided by said electronic sound synthesizer is responsive to and modifiable by said first GS user-input control device.

2. The gesture synthesizer of claim 1, wherein said gesture synthesizer has at least one characteristic selected from a group consisting of (i) said gesture synthesis means accepts MIDI-compatible data, (ii) said gesture synthesis means accepts MIDI-compatible data from said GS user-input control device, (iii) said gesture synthesis means outputs MIDI-compatible data, and (iv) said gesture synthesis means accepts MIDI-compatible data as input and outputs MIDI-compatible data.

3. The gesture synthesizer of claim 1, wherein:

said detection means detects forward and reverse direction deflection of said first GS user-input control device and outputs logic data in accordance with detected said direction;

wherein said first gesture synthesis means includes:

means for generating clock pulses whose individual amplitudes are modulatable according to [an amplitude modulation defining] an amplitude envelope, said amplitude envelope having a forward portion and a reverse portion wherein at least one *of* said portions is varied according to a parameter selected a group consisting of (i) a forward direction of a GS user-input control device, (ii) modulation data from a user-selected modulation source whose modulation data has a direction proportional to said logic data, (iii) a combination of control data and modulation data, (iv) said synthesized control data; and at least one accumulator selected from a group consisting of (i) a forward accumulator for controllably combining amplitudes of said clock pulses responsive to digital numbers representing said forward portion of said amplitude envelope, and (ii) a reverse accumulator for controllably combining amplitudes of said clock pulses responsive to digital numbers representing said reverse portion of said amplitude envelope.

4. The gesture synthesizer of claim 1, wherein said gesture synthesizer further includes;

at least a second synthesis means coupled to said first detection means, and;

an interpolation means that controllably combines synthesized control data from said first and second synthesis means, said interpolation means including at least one means selected from the group consisting of (i) a switching means that alternately switches between synthesized control data from said first and second synthesis means, (ii) a crossfade means that crossfades between synthesized control data from said first and second synthesis means.

5. The gesture synthesizer of claim 1, wherein said first detection means detects forward direction and reverse direction deflection of said first GS user-input control device, and outputs first and second logic data corresponding to detected said forward and reverse direction; and said first gesture synthesis means further including:

switching means for bifurcating said control data so as to provide forward control data and reverse control data; and persistently available conversion means for converting at least one of said forward control data and said reverse control data according to a conversion characteristic selected from a group consisting of (i) a conversion characteristic generated from a muscle emulation model, (ii) a conversion characteristic sampled from a musical instrument, (iii) a conversion characteristic sampled from a MIDI-compatible controller, (iv) a conversion characteristic emulating sampled data, and (v) a conversion characteristic emulating musical gestures.

6. The gesture synthesizer of claim 1, wherein:

said first detection means detects forward direction and reverse direction deflection of said first GS user-input control device, and outputs first and second logic data corresponding to detected said forward and reverse direction; and said first gesture synthesis means further includes:

a source of modulation data responsive at least in part to a direction of said first GS user-input control device, said direction being determined by said first and second logic data.

7. The gesture synthesizer of claim 6, wherein said modulation data includes data selected from a group consisting of (i) a control data signal, (ii) peak amplitude of a control data signal, (iii) said synthesized control data, (iv) substantially constant said modulation data, (v) said modulation data includes a first derivative with respect to time of said positional control data, and (vi) said modulation data includes a second derivative with respect to time of said positional control data.

8. The gesture synthesizer of claim 1, wherein said gesture synthesizer further includes:

a second GS user-input control device;

second detection means, coupled to said second GS user-input control device, for generating control data representing user-operation of said second GS user-input control device;

said second detection means detecting forward and reverse direction of said second GS user-input control device, and outputting first and second logic data corresponding to detected said forward and reverse direction; and a source of modulation data, responsive at least in part to said direction of said second GS user-input control device, said direction being determined by said first and second logic data.

9. The gesture synthesizer of claim 1, wherein:

said first detection means detects forward and reverse direction deflection of said first GS user-input control device, and outputs first and second logic data corresponding to detected said forward and reverse direction;

said first gesture synthesis means further includes:

a source of modulation data, responsive at least in part to said direction of said first GS user-input control device, said direction being determined by said first and second logic data;

switching means for bifurcating said control data so as to provide forward control data and reverse control data; and means for scaling amplitude of said forward control data proportionally to said modulation data; and means for scaling amplitude of said reverse control data proportionally to said modulation data.

10. The gesture synthesizer of claim 1, wherein said first detection means detects forward and reverse direction of said first GS user-input control device, and outputs first and second logic data corresponding to detected said forward and reverse direction;

wherein said first gesture synthesis means further includes:

a source of modulation data responsive at least in part to a direction of said first GS user-input control device, said direction being determined by said first and second logic data;

a first and second source of control data signals, responsive at least in part to said first GS user-input control device;

means for delaying said first control data signal by an amount of delay determined at least in part by data from said source of modulation data; and means for controllably combining at least said second control data signal with delayed said first control data.

11. The gesture synthesizer of claim 10, wherein said first gesture synthesis means further includes persistently available conversion means for converting said synthesized control data according to a conversion characteristic selected from a group consisting of (i) a conversion characteristic generated from a muscle emulation model, (ii) a conversion characteristic sampled from a musical instrument, (iii) a conversion characteristic sampled from a MIDI-compatible controller, (iv) a conversion characteristic emulating sampled data, and (v) a conversion characteristic emulating musical gestures.

12. The gesture synthesizer of claim 1, wherein said first detection means detects forward direction and reverse direction deflection of said first GS user-input control device, and outputs first and second logic data corresponding to detected said forward and reverse direction; and said first gesture synthesis means further includes a source of modulation data responsive at least in part to detected direction of said first GS user-input control device, said direction being determined by said first and second logic data; and means for combining and using said modulation data to vary at least one parameter selected from a group consisting of (i) peak amplitude of a time-delayed control data signal, (ii) delay time of a time-delayed control data, (iii) salience-curvature applied to a control data signal, (iv) width of a shaping window applied to control data signal, (v) height of a shaping window applied to control data signal, (vi) start point of a shaping window applied to control data signal, and (vii) stop point of a shaping window applied to control data signal.

13. The gesture synthesizer of claim 1, wherein said first detection means detects forward and reverse direction of said first GS user-input control device; wherein:

said first gesture synthesis means includes bifurcation means for separately directing, according to detected said forward and reverse direction of said first GS user-input control device, data selected from a group consisting of (i) control data, and (ii) synthesized control data;

said gesture synthesizer further including bifurcated gesture synthesis means for generating forward synthesized control data by activating a first half of simulated said muscle action responsive to said forward control data, and for generating reverse synthesized control data by activating a second half of simulated said muscle action responsive to said reverse control data.

14. The gesture synthesizer of claim 13, wherein:

said bifurcation means includes at least one comparison means selected from the group consisting of (i) threshold detection means for comparing control data values to a lower threshold and outputting a first logic signal when said lower threshold is traversed, and for comparing control data values to an upper threshold and outputting a second logic signal when said upper threshold is traversed, and (ii) means for comparing subsequent values of said control data, and outputting first and second logic data in accordance with increasing and decreasing values of said control data, said GS further including:

bipolar switching means for generating alternating switching logic data responsive to logic signal from said threshold detection means;

wherein said bifurcated gesture synthesis means includes at least one switching means selected from a group consisting of (i) a signal switch for bifurcating said control data in response to said alternating switching logic data from said bipolar switching means, and (ii) a signal gate for selecting forward or reverse direction of said synthesized control data in response to said alternating switching logic data.

15. The gesture synthesizer of claim [14] *13*, wherein said bifurcated gesture synthesis means further includes at least one gesture synthesis module selected from a group consisting of (i) a salience module, (ii) a time oscillator module, (iii) a flex filter module, (iv) a waveshaper module, (v) a bifurcated scale module, and (vi) a delay module.

16. The gesture synthesizer of claim 1, wherein:

said detection means detects forward and reverse direction deflection of said first GS user-input control device and outputs logic data in accordance with detected said direction;

said first gesture synthesis means includes:

means for generating clock pulses, said clock pulses having an amplitude magnitude that varies according to a filter modulation function having a modulation function selected from a group consisting of (i) said modulation function has salience-curvature, (ii) said modulation function is varied in accordance with control data, (iii) said modulation function is varied in accordance with modulation data responsive at least in part to a direction of said first GS user-input control device, said direction being determined by said first and second logic data, (iv) said modulation function is varied responsive to a combination of control data and modulation data, and (v) said modulation function is varied responsive to said synthesized control data; and a unit that provides forward synthesized control data functionally proportional to summed amplitude of each said clock pulse.

17. The gesture synthesizer of claim 1, wherein:

said detection means detects forward and reverse direction of said first GS user-input control device and outputs logic data in accordance with detected said direction;

said first gesture synthesis means includes:

means for generating clock pulses, said clock pulses having an amplitude magnitude that varies with at least one characteristic selected from a group consisting of (i) said amplitude is substantially constant, (ii) said amplitude is varied responsive to control data, (iii) said amplitude is varied responsive to modulation data, (iv) said amplitude is varied responsive to said logic data, (v) said amplitude corresponds to at least a partial summation of at least two successive said clock pulses, and (vi) said amplitude is varied responsive to a combination of control data and modulation data;

at least one accumulator selected from a group consisting of (i) a forward accumulator that sums said clock pulses in response to said logic data and provides forward synthesized control data responsive to a running sum of said clock pulses, and (ii) a reverse accumulator that subtracts said clock pulses in response to said logic data and provides reverse synthesized control data responsive to a running subtraction of said clock pulses.

18. The gesture synthesizer of claim 17, wherein said first gesture synthesis means further includes persistently available conversion means for converting said synthesized control data according to a conversion characteristic selected from a group consisting of (i) a muscle emulation model generated conversion characteristic, (ii) a conversion characteristic sampled from a musical instrument, (iii) a conversion characteristic sampled from a MIDI-compatible controller, (iv) a conversion characteristic that emulates sampled data, and (v) a conversion characteristic that emulates musical gestures.

19. The gesture synthesizer of claim 18, wherein said first gesture synthesis means further includes:

at least one scaling means selected from a group consisting of (i) means for scaling amplitude of said forward synthesized control data proportional to modulation data, and (ii) means for scaling amplitude of said reverse synthesized control data proportional to modulation data.

20. The gesture synthesizer of claim 17, wherein said first gesture synthesis means further includes at least one threshold detector selected from a group consisting of (i) an upper threshold detector, coupled to an output of said accumulator, that deactivates said summation when said upper threshold is traversed, and (ii) a lower threshold detector, coupled to an output of said accumulator, that deactivates said subtraction when said lower threshold is traversed.

21. The gesture synthesizer of claim 17, wherein said first gesture synthesis means further includes:

at least one scaling means selected from a group consisting of (i) means for scaling amplitude of said forward synthesized control data proportional to modulation data, and (ii) means for scaling amplitude of said reverse synthesized control data proportional to modulation data.

22. The gesture synthesizer of claim 17, wherein said first gesture synthesis means further includes at least one module selected from the group consisting of (i) a salience module, (ii) a time oscillator module, (iii) a flex filter module, (iv) a waveshaper module, (v) a scale module, and (vi) a delay module.

23. The gesture synthesizer of claim [22] *1*, wherein said gesture synthesizer is implemented in a manner selected from a group consisting of (i) said gesture synthesizer is included as part of a stand-alone musical instrument, (ii) said gesture synthesizer is a stand-alone electromechanical device, (iii) said gesture synthesizer is implemented on a machine-readable memory device for use with a host system, and (iv) said gesture synthesizer is implemented on a magnetic storage medium for use in a host system.

24. The gesture synthesizer of claim 1, wherein:

said detection means detects forward and reverse direction deflection of said first GS user-input control device and outputs logic data in accordance with detected said direction;

wherein said first gesture synthesis means includes:

means for generating clock pulses;

[envelope generation means for generating a time envelope representing a period of said clock pulses, wherein said time envelope includes at least one of an attack portion and a release portion;]

envelope generation means for generating, *in* response to data selected from a group consisting of (i) control data and (ii) modulation data, a time envelope representing a period of said clock pulses, wherein said time envelope includes at least one of an attack portion and a release portion;

period modulation means for modifying said period responsive to a signal selected from a group consisting of (i) said time envelope, (ii) said attack portion of said time envelope, (iii) said release portion of said time envelope, and (iv) modulation data from a user-selected modulation source;

at least one counter selected from a group consisting of (i) a forward pulse counter that increments said clock pulses and provides forward synthesized control data responsive to a running count of said clock pulses, and (ii) a reverse pulse counter that decrements said clock pulses and provides reverse synthesized control data responsive to a running count of said clock pulses.

25. The gesture synthesizer of claim 24, wherein said first gesture synthesis means further includes at least one amplitude modulation means for generating an amplitude envelope comprising a series of digital numbers responsive to pulse data selected from the group consisting of (i) forward pulse data and (ii) reverse pulse data, wherein said amplitude envelope has a least one characteristic selected from the group consisting of (i) said amplitude envelope has salience curvature, (ii) said amplitude envelope is varied according to control data (iii) said amplitude envelope is varied according to modulation data, and (iv) said amplitude envelope is varied according to said synthesized control data.

26. The gesture synthesizer of claim 24, wherein said first gesture synthesis means further includes persistently available conversion means for converting said synthesized control data according to a conversion characteristic selected from the group consisting of (i) a muscle emulation model generated conversion characteristic, (ii) a conversion characteristic sampled from an actual musical instrument, (iii) a conversion characteristic sampled from a MIDI-compatible controller, (iv) a conversion characteristic that emulates sampled data, and (v) a conversion characteristic that emulates musical gestures.

27. The gesture synthesizer of claim 24, wherein said first gesture synthesis means further includes at least one threshold detector selected from a group consisting of (i) an upper threshold detector, coupled to an output of said [accumulator] *pulse counter*, that deactivates said incrementation when said upper threshold is traversed, and (ii) a lower threshold detector, coupled to an output of said [detector] *pulse counter*, that deactivates said decrementation when said lower threshold is traversed.

28. The gesture synthesizer of claim 24 wherein said first gesture synthesis means further includes:

at least one scaling means selected from a group consisting of (i) means for scaling amplitude of said forward pulse data proportional to modulation data, and (ii) means for scaling amplitude of said reverse pulse data proportional to modulation data.

29. The gesture synthesizer of claim 24 wherein said first gesture synthesis means further includes at least one means for combining and using modulation data to vary at least one parameter selected from a group consisting of (i) peak amplitude of time-delayed said synthesized control data, (ii) delay time of a time-delayed said synthesized control data, (iii) salience-curvature applied to said synthesized control data, (iv) width of a shaping window applied to said synthesized control data, (v) height of a shaping window applied to said synthesized control data, (vi) start point of a shaping window applied to said synthesized control data, and (vii) stop point of a shaping window applied to said synthesized control data.

30. The method of [claim 29,] *providing* gesture synthesis as in claim [29] *33*, wherein said method is embodied in a medium selected from the group consisting of (i) said method is part of a stand-alone musical instrument, (ii) said method is implemented in a stand-alone electromechanical device, (iii) said method is stored on a machine-readable memory device for use with a host system, and (iv) said method is stored on a magnetic storage medium for use in a host system.

31. The gesture synthesizer of claim 1, wherein said synthesis means includes at least a first and second threshold detection means, for detecting at least one of the group consisting of (i) motion of control data (ii) velocity of control data (iii) acceleration of control data, (iv) motion of synthesized control data (v) velocity of synthesized control data (vi) acceleration of control data and (vii) time between said first and second detection, wherein said first and second threshold detection means output logic data in accordance with said first and second detection and, at least a first and second clock pulse generation means respectively triggered by logic data from said first and second threshold detection means.

32. The gesture synthesizer of claim 1 wherein said synthesis means further includes:

differentiation means for determining the first derivative with respect to time of said control data;

zero detection means for detecting when said first derivative with respect to time is zero and outputting logic data upon said zero detection;

wherein said logic data deactivates said gesture synthesis means.

33. A method for providing gesture synthesis for an electronic sound device, comprising the steps of:

(a) synthesizing in response to control data, a first transfer function based upon a muscle emulation model, [which includes at least one module] selected from the group consisting of (i) a model implementing Hill's equation, (ii) a [module modeling] *model representing* cyclic opposing effects of two force sources representing cyclic opposition action of a muscular system, (iii) a [module] *model* emulating muscular action by representing muscular stimulus response to internal electrical impulses, and (iv) a [module modelling] *model representing* visco-elastic properties of muscle pairs and elasticity of simulated loads, [and generating] *that generates* synthesized control data responsive to said control data; and (b) inputting said synthesized control data to said sound device;

wherein said sound device outputs a sound signal including simulated gestures.

34. The method of claim 33, wherein step (a) includes providing said gesture synthesis with at least one characteristic selected from a group consisting of (i) control data input to said method is MIDI-compatible, (ii) synthesized control data output by said method is MIDI-compatible, (iii) control data input to said method is MIDI-compatible and synthesized control data output by said method is MIDI-compatible.

35. The method of claim 33 that further includes the steps of:

(a) synthesizing in response to control data, a second transfer function based upon a muscle emulation model, and generating synthesized control data responsive to said control data;

(b) controllably combining synthesized control data from said first and second transfer functions by at least one method selected from the group consisting of (i) alternately switching between synthesized control data generated by said first and second transfer functions, and (ii) continuously crossfading between synthesized control data generated by said first and second transfer functions.

36. The method of [claim 33,] *providing* gesture synthesis as in claim [29] *33* wherein step (a) includes:

detecting forward direction and reverse direction of said control data;

outputting first and second logic data corresponding to detected said forward and reverse direction;

bifurcating forward direction and reverse direction of said control data responsive to said first and second logic data; and converting at least one of forward direction and reverse direction control data according to a conversion characteristic selected from the group consisting of (i) a muscle emulation model generated conversion characteristic, (ii) a conversion characteristic sampled from an actual musical instrument, (iii) a conversion characteristic sampled from a MIDI-compatible controller, (iv) a conversion characteristic that emulates sampled data, and (v) a conversion characteristic that emulates musical gestures.

37. The method of [claim 33,] *providing* gesture synthesis as in claim [29] *33* wherein step (a) includes:

detecting forward direction and reverse direction of said control data;

outputting first and second logic data corresponding to detected said forward and reverse direction; and modulating said control data according to modulation data responsive at least in part to a direction of said control data, said direction being determined by said first and second logic data.

38. The method of claim 37, wherein said modulation data includes data selected from a group consisting of (i) a control data signal, (ii) peak amplitude of a control data signal, (iii) said synthesized control data, (iv) substantially constant said modulation data, (v) said modulation data includes a first derivative with respect to time of said positional control data, and (vi) said modulation data includes a second derivative with it respect to time of said positional control data.

39. The method of [claim 33,] *providing* gesture synthesis as in claim [32] *33*, wherein step (a) includes:

detecting forward and reverse direction of additional control data;

outputting logic data [in] according to detected said detection;

bifurcating said forward and reverse direction of said additional control data responsive to said first and second logic data; and modulating said synthesized control data responsive at least in part to said forward and reverse direction of said additional control data.

40. The method of [claim 33,] *providing* gesture synthesis as in claim 33, wherein step (a) includes:

detecting forward and reverse direction of said control data;

outputting first and second logic data corresponding to detected said forward and reverse direction;

bifurcating said control data so as to provide forward control data and reverse control data;

scaling amplitude of said forward control data proportionally to modulation data responsive at least in part to a direction of said control data, said direction being determined by said first and second logic data; and scaling amplitude of said reverse control data proportionally to modulation data responsive at least in part to a direction of said control data, said direction being determined by said first and second logic data.

41. The method of [claim 33,] *providing* gesture synthesis as in claim 33, wherein step a) includes:

detecting forward and reverse direction of said control data;

outputting first and second logic data corresponding to detected said forward and reverse direction;

delaying said control data by an amount of delay determined at least in part by modulation data responsive at least in part to a direction of said control data, said direction being determined by said first and second logic data; and controllably combining additional control data with delayed said control data.

42. The method of [claim 41,] *providing* gesture synthesis as in claim 41 wherein step (a) further includes the step of:

converting said synthesized control data according to a conversion characteristic selected from a group consisting of (i) a conversion characteristic generated from a muscle emulation model, (ii) a conversion characteristic sampled from a musical instrument, (iii) a conversion characteristic sampled from a MIDI-compatible controller, (iv) a conversion characteristic emulating sampled data, and (v) a conversion characteristic emulating musical gestures.

43. The method of [claim 33,] *providing* gesture synthesis as in claim 33, wherein step (a) includes:

detecting forward and reverse direction of said control data;

outputting first and second logic data corresponding to detected said forward and reverse direction; and combining and using modulation data to vary at least one parameter selected from a group consisting of (i) peak amplitude of a time-delayed control data signal, (ii) delay time of a time-delayed control data, (iii) salience-curvature applied to a control data signal, (iv) width of a shaping window applied to control data signal, (v) height of a shaping window applied to control data signal, (vi) start point of a shaping window applied to control data signal, and (vii) stop point of a shaping window applied to control data signal, said modulation data being responsive at least in part to detected direction of said control data, said direction being determined by said first and second logic data.

44. The method of [claim 33,] *providing* gesture synthesis as described in claim 33, wherein step (a) includes:

providing control data having first and second logic data corresponding to forward and reverse direction of said control data;

generating clock pulses in which said clock pulses have an amplitude magnitude that varies according to a filter modulation function having at least one characteristic selected from the group consisting of (i) said filter modulation function has salience-curvature, (ii) said filter modulation function is varied in accordance with control data, (iii) said filter modulation function varied in accordance with modulation data, wherein said modulation data is responsive at least in part to said direction of said first user-input control device, said direction being determined by said first and second logic data, (iv) said filter modulation function is varied responsive to a combination of control data and modulation data, and (v) said filter modulation function is varied responsive to said synthesized control data; and at least one step selected from a group consisting of (i) summing amplitudes of said clock pulses responsive to said first logic data to provide forward synthesized control data responsive to a running sum, and (ii) subtracting said clock pulsed to provide reverse synthesized control data responsive to a running subtraction.

45. The method of [claim 33,] *providing* gesture synthesis as in claim 33 wherein step (a) includes:

providing control data having first and second logic data corresponding to forward and reverse direction of said control data;

generating clock pulses;

accumulating clock pulses upon receipt of said first logic data and providing forward synthesized control data responsive to said accumulation; and accumulating negative clock pulses, upon receipt of said second logic data, from [a] *an initial* data value selected from the group consisting of (i) said data [amount] *value* is a present accumulation and (ii) said data [amount] *value* is a maximum increment, and providing reverse synthesized control data responsive to said accumulation;

wherein said clock pulses have an amplitude magnitude having at least one characteristic selected from the group consisting of (i) said amplitude is substantially constant, (ii) said amplitude is varied responsive to control data, (iii) said amplitude is varied responsive to modulation data, (iv) said amplitude is varied responsive to said logic data, (v) said amplitude corresponds to at least a partial summation of at least two successive said clock pulses, and (vi) said amplitude is varied responsive to a combination of control data and modulation data.

46. The method of [claim 45,] *providing* gesture synthesis as in claim 45 wherein step (a) further includes at least one step selected from the group consisting of (i) scaling amplitude of said forward synthesized control data proportional to modulation data, and (ii) scaling amplitude of said reverse synthesized control data proportional to modulation data.

47. The method of [claim 45,] *providing* gesture synthesis as in claim 45 herein step (a) further includes the step of:

converting said synthesized control data according to a conversion characteristic selected from the group consisting of (i) a muscle emulation model generated conversion characteristic, (ii) a conversion characteristic sampled from an actual musical instrument, (iii) a conversion characteristic sampled from a MIDI-compatible controller, (iv) a conversion characteristic that emulates sampled data, and (v) a conversion characteristic that emulates musical gestures.

48. The method of [claim 47,] *providing* gesture synthesis as in claim 47 wherein step (a) further includes at least one step selected from a group consisting of (i) scaling amplitude of said forward synthesized control data proportional to modulation data, and (ii) scaling amplitude of said reverse synthesized control data proportional to modulation data.

49. The method of [claim 45,] *providing* gesture synthesis as in claim 45 wherein step (a) further includes a method of gesture synthesis performed by at least one module selected from the group consisting of (i) a salience module, (ii) a time oscillator module, (iii) a flex filter module, (iv) a waveshaper module, (v) a scale module, and (vi) a delay module.

50. The method of [claim 33,] *providing* gesture synthesis as in claim 33, wherein step (a) includes providing control data having first and second logic data corresponding to forward and reverse direction of said control data;

generating clock pulses and modulating individual clock pulse amplitudes according to an [amplitude modulation defining an] amplitude envelope, said amplitude envelope having a forward portion and a reverse portion wherein at least one said portions is varied according to a parameter selected a group consisting of (i) a forward direction of a GS user-input control device, (ii) modulation data from a user-selected modulation source whose modulation data has a direction proportional to said logic data, (ii) a combination of control data and modulation data, (iv) said synthesized control data; and controllably combining amplitudes of said clock pulses responsive to digital numbers representing at least one said portion of said amplitude envelope selected from the group consisting of (i) said forward portion, and (ii) said reverse portion.

51. The method of [claim 33,] *providing* gesture synthesis as in claim 33, wherein step (a) includes providing control data having first and second logic data corresponding to forward and reverse direction of said control data;

generating clock pulses;

incrementing said clock pulses upon receipt of said first logic data and providing forward synthesized control data responsive to a running count;

decrementing said clock pulses upon receipt of said second logic data and providing reverse synthesized control data responsive to a running count;

generating in response to data selected from the group consisting of (i) control data and (ii) modulation data, a time envelope comprising a series of digital numbers representing period of said clock pulses, said time envelope including an attack portion and a release portion, said attack portion being responsive to at least one parameter selected from the group consisting of (i)

a forward direction of a user-input control device and (ii) modulation data from a user-selected modulation source, and said release portion being responsive to at least the parameter selected from the group consisting of (i) a reverse direction of a user-input control device and (ii) modulation data from a user-selected modulation source; and modifying said period of said clock pulses responsive to a signal selected from the group consisting of (i) digital numbers representing said time envelope, (ii) digital numbers representing said attack portion of said time envelope, (iii) digital numbers representing said release portion of said time envelope, (iv) modulation data from a user-selected modulation source.

52. The method of [claim 51,] *providing* gesture synthesis of claim 51 wherein step (a) further includes at least one step selected from a group consisting of (i) scaling amplitude of said forward synthesized control data proportional to modulation data, and (ii) scaling amplitude of said reverse synthesized control data proportional to modulation data.

53. The method of [claim 51,] *providing* gesture synthesis of claim 51 wherein step (a) further includes the step of:

converting said synthesized control data according to a conversion characteristic selected from the group consisting of (i) a muscle emulation model generated conversion characteristic, (ii) a conversion characteristic sampled from an actual musical instrument, (iii) a conversion characteristic sampled from a MIDI-compatible controller, (iv) a conversion characteristic that emulates sampled data, and (v) a conversion characteristic that emulates musical gestures.

54. The method of [claim 51,] *providing* gesture synthesis as in claim [51] *53*, wherein step (a) further includes at least one step selected from a group consisting of (i) scaling amplitude of said forward synthesized control data proportional to modulation data, and (ii) scaling amplitude of said reverse synthesized control data proportional to modulation data.

55. The method of [claim 51,] *providing* gesture synthesis as in claim 51, wherein step (a) further includes:

combining and using modulation data to vary at least one least one parameter selected from a group consisting of (i) peak amplitude of time-delayed said synthesized control data, (ii) delay time of a time-delayed said synthesized control data, (iii) salience-curvature applied to said synthesized control data, (iv) width of a shaping window applied to said synthesized control data, (v) height of a shaping window applied to said synthesized control data, (vi) start point of a shaping window applied to said synthesized control data, and (vii) stop point or a shaping window applied to said synthesized control data.

56. The method of [claim 51,] *providing* gesture synthesis [of] *as in* claim 51 wherein step (a) further includes at least one step selected from the group consisting of (i) detecting when an upper threshold is traversed, and then deactivating said incrementing, and (ii) detecting when a lower threshold is traversed and then deactivating said decrementing.

57. The method of [claim 33,] *providing* gesture synthesis as in claim 33 wherein step a) includes:

detecting a first threshold of data selected from the group consisting of (i) motion of control data (ii) velocity of control data (iii) acceleration of control data, (iv) motion of synthesized control data (v) velocity of synthesized control data (vi) acceleration of control data, outputting first logic data in accordance with detection of said first threshold, generating clock pulses responsive to said [fist] *first* logic data, detecting a second threshold of data selected from the group consisting of (i) motion of control data (ii) velocity of control data (iii) acceleration of control data, (iv) motion of synthesized control data (v) velocity of synthesized control data (vi) acceleration of control data, (vii) time from detection of said first threshold, outputting second logic data in accordance with said detection, and generating clock pulses responsive to said second logic data.

58. The gesture synthesizer of claim 1, wherein:

said detection means detects forward and reverse direction of said first GS user-input control device and outputs logic data in accordance with detected said direction;

wherein said synthesis means includes:

means for counting time from detected said forward and reverse direction, and modulation means for modifying said control data with respect to time.

59. The method of gesture synthesis as described in claim 33 wherein step (a) further includes:

detecting forward and reverse direction of said control data;

generating first and second logic data in accordance with detected said forward and reverse direction;

counting time from receipt of said first logic data;

varying forward control data responsive to time;

counting time from receipt of said second logic data; and varying reverse control data responsive to time.

60. The method *of* gesture synthesis as described in claim 33 wherein step (a) further includes:

differentiating control data with respect to time;

detecting when the result of said differentiation is zero;

deactivating said gesture synthesis method upon said detection.

*61. The gesture synthesizer of claim 1 wherein said gesture synthesis means includes at least a first gesture synthesis chain containing a first delay module, and a second gesture synthesis chain containing a second delay module, wherein:*

*synthesized control data output from said first gesture synthesis chains is used as modulation data in another gesture synthesis chain and,*

*synthesized control data output from said second gesture synthesis chains is used as modulation data in another gesture synthesis chain.*

*62. The method of gesture synthesis as described in claim 33 wherein step (a) includes the steps of*

*(a) outputting first synthesized control data from a first gesture synthesis chain which includes at least a first delay module,*

*(b) outputting second synthesized control data from a second gesture synthesis chain which includes a second delay module,*

*(c) inputting said first synthesized control data as modulation data to another gesture synthesis chain, and*

*(d) inputting said second synthesized control data as modulation data to another gesture synthesis chain.*

* * * * *